US012266310B2

(12) United States Patent
Jang et al.

(10) Patent No.: US 12,266,310 B2
(45) Date of Patent: Apr. 1, 2025

(54) DISPLAY DEVICE, DISPLAY CONTROLLER, AND DISPLAY DRIVING METHOD

(71) Applicant: LG Display Co., Ltd., Seoul (KR)

(72) Inventors: Junwoo Jang, Seoul (KR); JungGeun Jo, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/503,998

(22) Filed: Nov. 7, 2023

(65) Prior Publication Data

US 2024/0257758 A1 Aug. 1, 2024

(30) Foreign Application Priority Data

Jan. 27, 2023 (KR) ........................ 10-2023-0011169

(51) Int. Cl.
*G09G 3/3225* (2016.01)
*G09G 3/3258* (2016.01)

(52) U.S. Cl.
CPC ... *G09G 3/3258* (2013.01); *G09G 2300/0842* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 2015/0348506 | A1* | 12/2015 | Ooga | G09G 3/3426 345/205 |
| 2017/0123454 | A1* | 5/2017 | Evans, V | H10K 50/858 |
| 2019/0101792 | A1* | 4/2019 | Yang | G09G 3/3607 |
| 2021/0335292 | A1* | 10/2021 | Huang | G09G 3/3607 |
| 2022/0383807 | A1* | 12/2022 | Cho | G09G 3/3406 |
| 2024/0257758 | A1* | 8/2024 | Jang | G09G 3/3258 |

* cited by examiner

*Primary Examiner* — Carl Adams
(74) *Attorney, Agent, or Firm* — Seed IP Law Group LLP

(57) ABSTRACT

The present disclosure relates to a display device, a display controller, and a display driving method that are capable of reducing a colorfulness perception difference between a normal area including a first driving area and an optical area including a second driving area by controlling at least one of the number of light emitting pixels per unit area, luminance, and saturation of an area between the first driving area and the second driving area, which have different numbers of light emitting pixels per unit area, when a high saturation image is displayed.

20 Claims, 27 Drawing Sheets

Front View Side View Left Side View Front View Right Side View

DISPLAY DEVICE, DISPLAY CONTROLLER, AND DISPLAY DRIVING METHOD

CROSS-REFERENCE TO RELATED APPLICATION

This application claims the priority benefit of Republic of Korea Patent Application No. 10-2023-0011169, filed on Jan. 27, 2023 in the Korean Intellectual Property Office, which is incorporated herein by reference in its entirety.

BACKGROUND

Technical Field

The present disclosure relates to electronic devices, and more particularly, to a display device, a display controller, and a display driving method.

Description of the Related Art

As display technology advances, display devices can provide increased functions, such as an image capture function, a sensing function, and the like, as well as an image display function. To provide these functions, a display device may need to include one or more optical electronic devices, such as a camera, a sensor for detecting an image, and the like.

In order to receive light transmitting through a front surface of a display device, it may be beneficial for such an optical electronic device to be located in an area of the display device where incident light coming from the front surface can be increasingly received and detected. To achieve the foregoing, in a typical display device, an optical electronic device has been designed to be located in a front portion of the display device to allow a camera, a sensor, and/or the like as the optical electronic device to be increasingly exposed to incident light. In order to install an optical electronic device in a display device in this manner, a bezel area of the display device may be increased, or a notch or a hole may be needed to be formed in a display area of an associated display panel.

BRIEF SUMMARY

A display device in the related art often has an optical electronic device to receive or detect incident light or perform an intended function. In doing so, a size of the bezel in the front portion of the display device may be increased, or a substantial disadvantage may be encountered in designing the front portion of the display device. In addition, in examples where an optical electronic device is incorporated into a display device, the quality of images may be unexpectedly decreased and the performance of the optical electronic device may be impaired due to structures of the optical electronic device (e.g., some components of the optical electronic device may cause problems with the components of the display device). For example, when the optical electronic device is a camera, image quality acquired by the camera may be decreased if adjustments are not made to the display at the location of the optical device.

To address these issues, one or more embodiments of the present disclosure may provide a display device including a transmission and display structure in which one or more optical electronic devices required to receive light are disposed under, or at a lower portion of, a display panel, and an area of the display panel overlapping the one or more optical electronic devices (hereinafter, which may be referred to as an optical area) is configured to serve as image displaying, as well as a light transmission path.

One or more embodiments of the present disclosure may provide a display device, a display controller, and a display driving method that are capable of reducing a degree of image disparity by enabling users to notice less colorfulness perception difference (saturation difference) between a normal area and an optical area.

One or more embodiments of the present disclosure may provide a display device, a display controller, and a display driving method that employ a driving technique capable of reducing or minimizing a degree of image disparity by allowing saturation between a normal area and an optical area to be changed to improve colorfulness perception difference due to the optical area having a transmission and display structure.

One or more embodiments of the present disclosure may provide a display device, a display controller, and a display driving method that are capable of improving perceptual image quality by designing an optical area not to be recognized by users.

According to aspects of the present disclosure, a display device can be provided that includes: a substrate including a display area that allows images to be displayed and includes a first driving area and a second driving area, which have different numbers of light emitting pixels per unit area; and a plurality of pixels including a plurality of first pixels disposed in the first driving area and a plurality of second pixels disposed in the second driving area.

At least one of the number of light emitting pixels per unit area, luminance, and saturation of a first boundary driving area between the first driving area and the second driving area may be controlled when an image having a saturation value equal to or greater than a selected threshold value is displayed in the display area. In various embodiments, the display controller controls the variation of at least one of the following parameters: 1) light emitting pixels per unit area, 2) luminance, and 3) saturation.

The second driving area may include one or more transmissive areas allowing light to be transmitted and located between the plurality of second pixels, and the first driving area may not include a transmissive area.

A respective location of at least one light emitting pixel among a plurality of third pixels disposed in the first boundary driving area may be changed as time passes or may be randomly selected.

Only one or more of the plurality of third pixels disposed in the first boundary driving area may emit light when an image having a saturation value equal to or greater than a selected threshold value is displayed in the display area. Accordingly, the number of light emitting pixels per unit area of the first boundary driving area may be greater than the number of light emitting pixels per unit area of the second driving area and be less than the number of light emitting pixels per unit area of the first driving area.

Respective driving luminance of each of light emitting pixels among the plurality of third pixels disposed in the first boundary driving area may be higher than respective driving luminance of each of the plurality of first pixels in the first driving area and be lower than respective driving luminance of each of the plurality of second pixels in the second driving area.

Saturation of an image portion displayed by light emitting pixels among the plurality of third pixels disposed in the first boundary driving area may be lower than saturation of an image portion displayed by the plurality of first pixels in the first driving area and be lower than saturation of an image portion displayed by the plurality of second pixels in the second driving area.

The display area may further include a second boundary driving area between the first boundary driving area and the second driving area. The plurality of pixels may further include a plurality of fourth pixels disposed in the second boundary driving area.

At least one of the number of light emitting pixels per unit area, luminance, and saturation of the second boundary driving area may be controlled differently from at least a corresponding one of the number of light emitting pixels per unit area, luminance, and saturation of the first boundary driving area, when an image having a saturation value equal to or greater than a selected threshold value is displayed in the display area.

The number of light emitting pixels per unit area of the second boundary driving area may be greater than the number of light emitting pixels per unit area of the second driving area and be less than the number of light emitting pixels per unit area of the first boundary driving area.

Respective driving luminance of each of the plurality of fourth pixels disposed in the second boundary driving area may be higher than respective driving luminance of each of the plurality of third pixels in the first boundary driving area and be lower than respective driving luminance of each of the plurality of second pixels in the second driving area.

Saturation of an image portion displayed by light emitting pixels among the plurality of fourth pixels disposed in the second boundary driving area may be lower than saturation of an image portion displayed by the plurality of first pixels in the first driving area and be lower than saturation of an image portion displayed by the plurality of second pixels in the second driving area.

Saturation of an image portion displayed by light emitting pixels among the plurality of third pixels disposed in the first boundary driving area may be higher than saturation of an image portion displayed by light emitting pixels among the plurality of fourth pixels in the second boundary driving area.

The number of light emitting pixels per unit area, luminance, and saturation of the first boundary driving area may not be controlled when an image having a saturation value less than a threshold value is displayed in the display area.

When an image having a saturation value less than a threshold value is displayed in the display area, all of the plurality of third pixels disposed in the first boundary driving area may emit light, or the number of light emitting pixels per unit area of the first boundary driving area may be equal to the number of light emitting pixels per unit area of the first driving area.

The display area may include an optical area allowing light to be transmitted and overlapping one or more optical electronic devices, and a normal area different from the optical area. The first driving area may be included in the normal area, and the second driving area may be included in the optical area. The first boundary driving area may be included in the normal area or an optical bezel area between the normal area and the optical area.

The display device may further include a display controller. The display controller can determine, as a control timing, an instance where it is needed to display an image having a saturation value equal to or greater than a threshold value in the display area. When the control timing is determined, the display controller can change input signals corresponding to the plurality of third pixels disposed in the first boundary driving area into output signals for causing only one or more of the plurality of third pixels to emit light, and output image data based on the changed output signals to a data driving circuit.

The display controller can convert the input signals into a visual perception characteristic signal including a hue value (or a lightness value), a saturation value (or a chroma value), and a value (or a luminance or hue value), determine whether the saturation or chroma value included in the visual perception characteristic signal is greater than or equal to a threshold value, and determine, as a control timing, an instance in which the saturation or chroma value is greater than or equal to the threshold value.

The display controller can determine, as a control timing, an instance where a red signal value, a green signal value, and a blue signal value included in the input signals satisfy a selected RGB condition.

According to aspects of the present disclosure, a display controller can be provided that includes: a determination module configured to determine, as a control timing, an instance where a saturation value of an image to be displayed in a display area including a first driving area and a second driving area, which have different numbers of light emitting pixels per unit area (or different numbers of pixels per unit area), is greater than or equal to a threshold value; and a control module configured to control at least one of the number of light emitting pixels per unit area, luminance, and saturation of an area between the first driving area and the second driving area, when the control timing is determined.

When the control timing is not determined as the saturation value of the image is determined to be less than the threshold value by the determination module, the control module cannot control the number of light emitting pixels, luminance, and saturation for the area between the first driving area and the second driving area.

According to aspects of the present disclosure, a display device can be provided that includes: a display panel including a display area including a first driving area and a second driving area, which have different numbers of light emitting pixels per unit area (or number of pixels per unit area); and a display controller for controlling an image to be displayed in the display area.

The display controller can control at least one of the number of light emitting pixels, luminance, and saturation of an area between the first driving area and the second driving area when a saturation value of an image is equal to or greater than a selected threshold.

The display controller can divide an area between the first driving area and the second driving area into two or more boundary driving areas, and differently control at least one of respective numbers of light emitting pixels, luminance, and saturation of the two or more boundary driving areas.

According to aspects of the present disclosure, a display driving method can be provided that includes: determining, as a control timing, an instance where a saturation value of an image to be displayed in a display area including a first driving area and a second driving area, which have different numbers of light emitting pixels per unit area (or different numbers of pixels per unit area), is greater than or equal to a threshold value; and controlling at least one of the number of light emitting pixels per unit area, luminance, and saturation of an area between the first driving area and the second driving area, when the control timing is determined.

According to one or more embodiments of the present disclosure, a display device may be provided that includes a transmission and display structure in which one or more optical electronic devices configured to receive light are disposed under, or at a lower portion of, a display panel, and an area of the display panel overlapping the one or more optical electronic devices (hereinafter, which may be referred to as an optical area) is configured to serve as image displaying, as well as a light transmission path.

According to one or more embodiments of the present disclosure, a display device, a display controller, and a display driving method may be provided that are capable of reducing a degree of image disparity by enabling users to notice less colorfulness perception difference (saturation difference) by controlling at least one of the number of light emitting pixels, luminance, and saturation of an area between a normal area and an optical area.

According to one or more embodiments of the present disclosure, a display device, a display controller, and a display driving method may be provided that employ a driving technique capable of reducing or minimizing a degree of image disparity by allowing saturation between a normal area and an optical area to be changed to improve colorfulness perception difference due to the optical area having a transmission and display structure.

According to one or more embodiments of the present disclosure, a display device, a display controller, and a display driving method may be provided that are capable of improving perceptual image quality by controlling at least one of the number of light emitting pixels, luminance, and saturation of an area between a normal area and an optical area, and thereby enabling users not to recognize the optical area.

According to one or more embodiments of the present disclosure, a display device, a display controller, and a display driving method may be provided that are capable of reducing a luminance difference between a normal area and an optical area by employing a configuration in which one or more pixels disposed in an area between the normal area and the optical area are not allowed to emit light.

According to one or more embodiments of the present disclosure, a display device, a display controller, and a display driving method may be provided that enable a low-power design for reducing power consumption to be implemented by employing a configuration in which one or more pixels disposed in an area between a normal area and an optical area are not allowed to emit light to reduce a luminance difference between the normal area and the optical area.

According to one or more embodiments of the present disclosure, a display device, a display controller, and a display driving method may be provided that enable light emitting elements of pixels disposed in an area between a normal area and an optical area to have an emission time and a degradation level similar to each other by allowing one or more pixels configured not to emit light in the area between the normal area and the optical area to be changed or randomly selected to reduce a luminance difference between the normal area and the optical area. Thereby, the average lifetime of the light emitting elements of the pixels disposed in the area between the normal area and the optical area can be increased.

Additional features and aspects will be set forth in part in the description which follows and in part will become apparent from the description or may be learned by practice of the inventive concepts provided herein. Other features and aspects of the inventive concepts may be realized and attained by the structure particularly pointed out in, or derivable from, the written description, the claims hereof, and the appended drawings.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the appended claims. Nothing in this section should be taken as a limitation on those claims.

It is to be understood that both the foregoing general description and the following detailed description of the present disclosure are exemplary and explanatory and are intended to provide further explanation of the inventive concepts as claimed.

BRIEF DESCRIPTION OF THE SEVERAL VIEWS OF THE DRAWINGS

The accompanying drawings, which are included to provide a further understanding of the disclosure and are incorporated in and constitute a part of the disclosure, illustrate aspects of the disclosure and together with the description serve to explain principles of the disclosure. In the drawings.

DETAILED DESCRIPTION

Figure 1A:
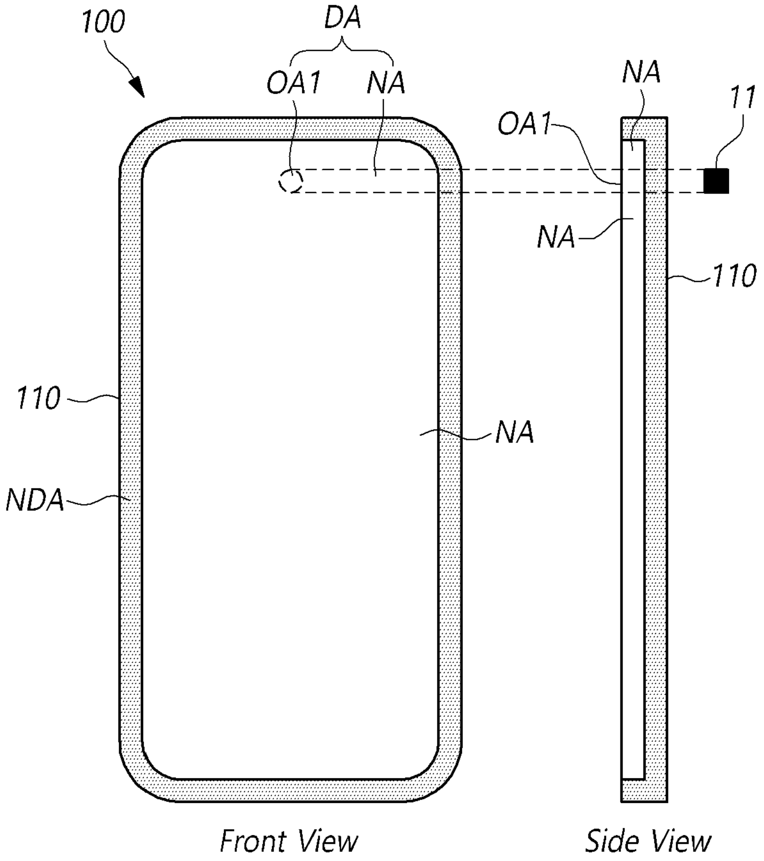
FIGS. 1A, 1B, and 1C illustrate an example display device according to aspects of the present disclosure.

Reference will now be made in detail to embodiments of the present disclosure, examples of which may be illustrated in the accompanying drawings.

In the following description, the structures, embodiments, implementations, methods and operations described herein are not limited to the specific example or examples set forth herein and may be changed as is known in the art, unless otherwise specified. Like reference numerals designate like elements throughout, unless otherwise specified. Names of the respective elements used in the following explanations are selected only for convenience of writing the specification and may thus be different from those used in actual products. Advantages and features of the present disclosure, and implementation methods thereof will be clarified through following example embodiments described with reference to the accompanying drawings. The present disclosure may however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. In the following description, where the detailed description of the relevant known function or configuration may unnecessarily obscure aspects of the present disclosure, a detailed description of such known function or configuration may be omitted. The shapes, sizes, ratios, angles, numbers, and the like, which are illustrated in the drawings to describe various example embodiments of the present disclosure, are merely given by way of example. Therefore, the present disclosure is not limited to the illustrations in the drawings. Where the terms "comprise," "have," "include," "contain," "constitute," "make up of," "formed of," and the like are used, one or more other elements may be added unless the term, such as "only," is used. An element described in the singular form is intended to include a plurality of elements, and vice versa, unless the context clearly indicates otherwise.

Although the terms "first," "second," A, B, (a), (b), and the like may be used herein to describe various elements, these elements should not be interpreted to be limited by these terms as they are not used to define a particular order or precedence. These terms are used only to distinguish one element from another. For example, a first element could be termed a second element, and, similarly, a second element could be termed a first element, without departing from the scope of the present disclosure.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

Where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used. For example, where an element or layer is disposed "on" another element or layer, a third element or layer may be interposed therebetween. Furthermore, the terms "left," "right," "top," "bottom, "downward," "upward," "upper," "lower," and the like refer to an arbitrary frame of reference.

The shapes, sizes, dimensions (e.g., length, width, height, thickness, radius, diameter, area, etc.), ratios, angles, number of elements, and the like illustrated in the accompanying drawings for describing the embodiments of the present disclosure are merely examples, and the present disclosure is not limited thereto.

A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to the accompanying drawings. In addition, for convenience of description, a scale in which each of elements is illustrated in the accompanying drawings may differ from an actual scale. Thus, the illustrated elements are not limited to the specific scale in which they are illustrated in the drawings.

Figure 1B:
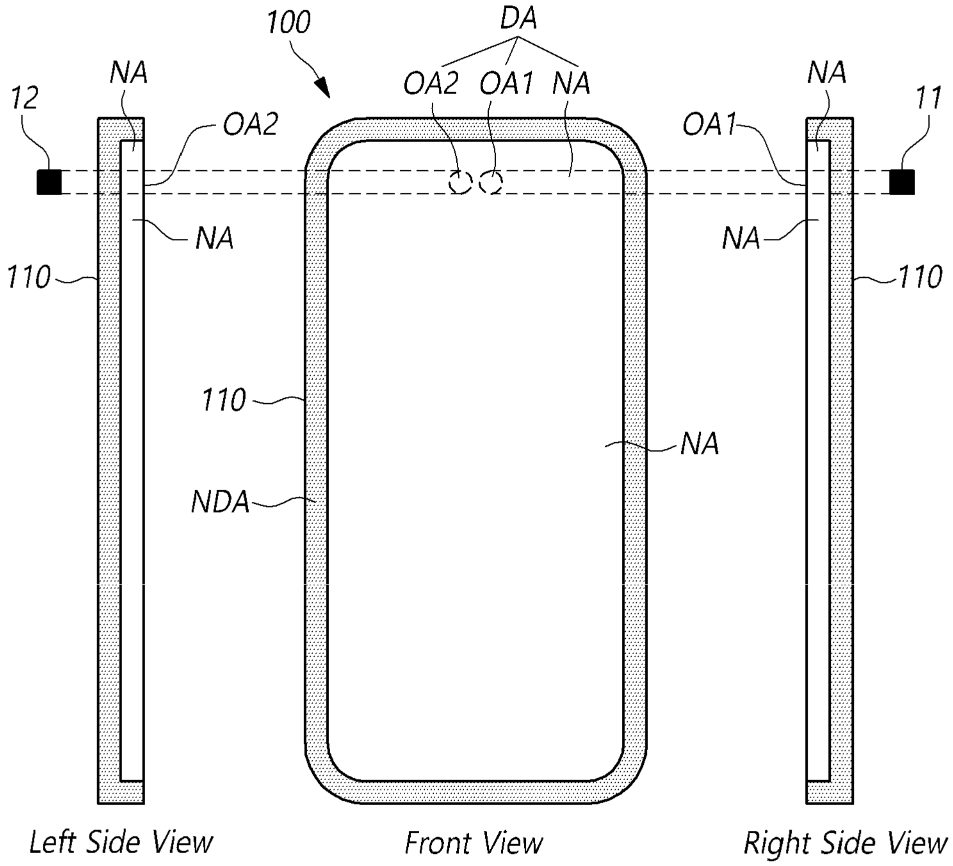
Figure 1C:
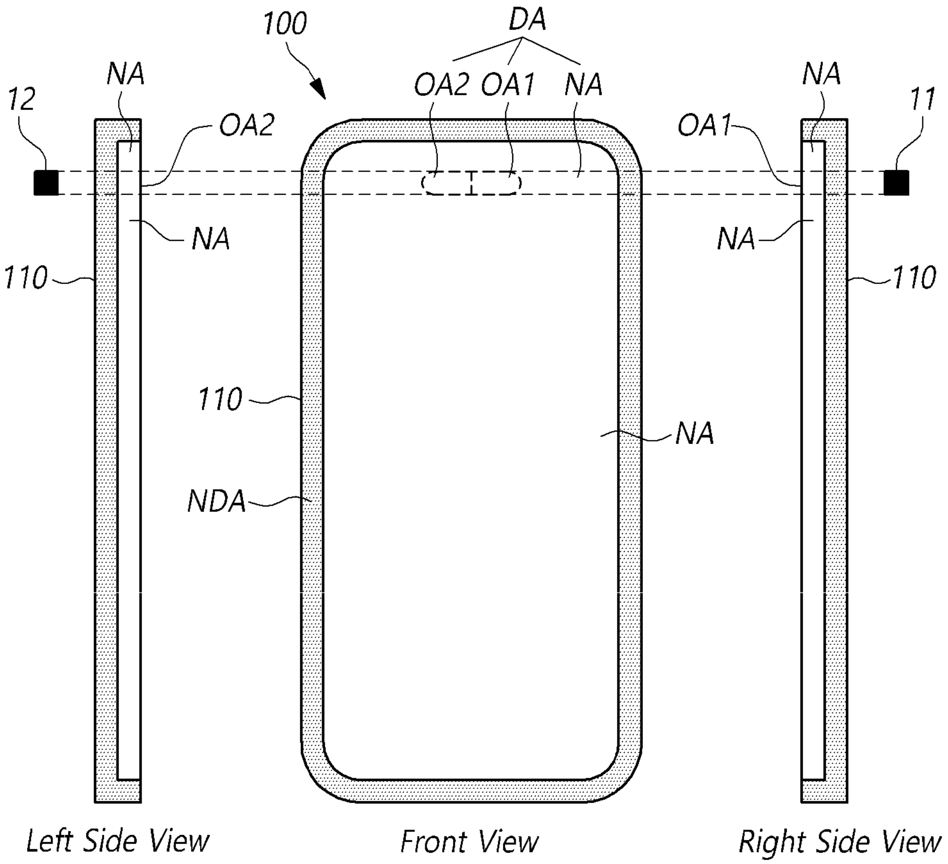

FIGS. 1A, 1B, and 1C illustrate an example display device 100 according to aspects of the present disclosure.

Referring to FIGS. 1A, 1B, and 1C, in one or more embodiments, the display device 100 according to aspects of the present disclosure may include a display panel 110 for displaying one or more images, and one or more optical electronic devices (11 and/or 12). Herein, an optical electronic device may be referred to as a light detector, a light receiver, or a light sensing device. An optical electronic device may include one or more of a camera, a camera lens, a sensor, a sensor for detecting images, or the like.

The display panel 110 may include a display area DA in which one or more images can be displayed and a non-display area NDA in which an image is not displayed. A plurality of subpixels may be arranged in the display area DA, and several types of signal lines for driving the plurality of subpixels may be arranged therein.

The non-display area NDA may refer to an area outside of the display area DA. Several types of signal lines may be arranged in the non-display area NDA, and several types of driving circuits may be connected thereto. At least a portion of the non-display area NDA may be bent to be invisible from the front surface of the display device 100 or may be covered by a case or housing (not shown) of the display device 100. The non-display area NDA may be also referred to as a bezel or a bezel area.

Referring to FIGS. 1A, 1B, and 1C, in one or more embodiments, in the display device 100 according to aspects of the present disclosure, one or more optical electronic devices (11 and/or 12) may be prepared independently of, and installed in, the display panel 110, and be located under, or in a lower portion of, the display panel 110 (an opposite side of a viewing surface thereof).

Light can enter the front surface (the viewing surface) of the display panel 110, pass through the display panel 110, reach one or more optical electronic devices (11 and/or 12) located under, or in the lower portion of, the display panel 110 (the opposite side of the viewing surface). Light transmitting through the display panel 110 may include, for example, visible light, infrared light, or ultraviolet light.

The one or more optical electronic devices (11 and/or 12) may be devices capable of receiving or detecting light transmitting through the display panel 110 and perform a predefined function based on the received light. For example, the one or more optical electronic devices (11 and/or 12) may include one or more of the following: an image capture device such as a camera (an image sensor), and/or the like; or a sensor such as a proximity sensor, an illuminance sensor, and/or the like. Such a sensor may be, for example, an infrared sensor capable of detecting infrared light.

Referring to FIGS. 1A, 1B, and 1C, in one or more embodiments, the display area DA of the display panel 110 according to aspects of the present disclosure may include one or more optical areas (OA1 and/or OA2) and a normal area NA. Herein, the term "normal area" NA may represent an area that while being present in the display area DA, does not overlap one or more optical electronic devices (11 and/or 12) and may also be referred to as a non-optical area. The one or more optical areas (OA1 and/or OA2) may be one or more areas respectively overlapping the one or more optical electronic devices (11 and/or 12) in a cross-sectional view of the display panel 110.

According to an example of FIG. 1A, the display area DA may include a first optical area OA1 and a normal area NA. In this example, at least a portion of the first optical area OA1 may overlap a first optical electronic device 11.

According to an example of FIG. 1B, the display area DA may include a first optical area OA1, a second optical area OA2, and a normal area NA. In this example, a portion of the normal area NA may be present between the first optical area OA1 and the second optical area OA2. At least a portion of the first optical area OA1 may overlap the first optical electronic device 11, and at least a portion of the second optical area OA2 may overlap a second optical electronic device 12.

According to an example of FIG. 1C, the display area DA may include a first optical area OA1, a second optical area OA2, and a normal area NA. In this example, the normal area NA may not be present between the first optical area OA1 and the second optical area OA2. For example, the first optical area OA1 and the second optical area OA2 may contact each other (e.g., directly contact each other). In this example, at least a portion of the first optical area OA1 may overlap the first optical electronic device 11, and at least a portion of the second optical area OA2 may overlap the second optical electronic device 12.

In the display panel 110 or the display device 100 according to aspects of the present disclosure, it may be beneficial that both an image display structure and a light transmission structure are implemented in the one or more optical areas (OA1 and/or OA2). For example, since the one or more optical areas (OA1 and/or OA2) are portions of the display area DA, it may be therefore beneficial that light emitting areas of subpixels for displaying one or more images are disposed in the one or more optical areas (OA1 and/or OA2). Further, to enable light to be transmitted through the one or more optical electronic devices (11 and/or 12), it may be beneficial that a light transmission structure is implemented in the one or more optical areas (OA1 and/or OA2).

It should be noted that even though the one or more optical electronic devices (11 and/or 12) are devices that need to receive light, the one or more optical electronic devices (11 and/or 12) may be located on the back of the display panel 110 (e.g., on an opposite side of the viewing surface thereof), and thereby, can receive light that has passed through the display panel 110. For example, the one or more optical electronic devices (11 and/or 12) may not be exposed in the front surface (viewing surface) of the display panel 110 or the display device 100. Accordingly, when a user faces the front surface of the display device 110, the one or more optical electronic devices (11 and/or 12) are located so that they cannot be visible to the user.

The first optical electronic device 11 may be, for example, a camera, and the second optical electronic device 12 may be, for example, a sensor. The sensor may be a proximity sensor, an illuminance sensor, an infrared sensor, and/or the like. In one or more embodiments, the camera may be a camera lens, an image sensor, or a unit including at least one of the camera lens and the image sensor, and the sensor may be an infrared sensor capable of detecting infrared light. In another embodiment, the first optical electronic device 11 may be a sensor, and the second optical electronic device 12 may be a camera.

Hereinafter, for convenience of descriptions related to the optical electronic devices (11 and 12), the first optical electronic device 11 is considered to be a camera, and the second optical electronic device 12 is considered to be an infrared sensor. It should be, however, understood that the scope of the present disclosure includes examples where the first optical electronic device 11 is an infrared sensor, and the second optical electronic device 12 is a camera. The camera may be, for example, a camera lens, an image sensor, or a unit including at least one of the camera lens and the image sensor.

In an example where the first optical electronic device 11 is a camera, this camera may be located on the back of (e.g., under, or in a lower portion of) the display panel 110, and be a front camera capable of capturing objects or images in a front direction of the display panel 110. Accordingly, the user can capture an image or object through the camera that is invisible on the viewing surface while looking at the viewing surface of the display panel 110.

Although the normal area NA and the one or more optical areas (OA1 and/or OA2) included in the display area DA in each of FIGS. 1A, 1B, and 1C are areas where images are allowed to be displayed, the normal area NA is an area where a light transmission structure need not be implemented, but the one or more optical areas (OA1 and/or OA2) are areas where a light transmission structure need be implemented. Thus, in one or more embodiments, the normal area NA is an area where a light transmission structure is not implemented or included, and the one or more optical areas (OA1 and/or OA2) are areas in which a light transmission structure is implemented or included.

Accordingly, the one or more optical areas (OA1 and/or OA2) can have a transmittance greater than or equal to a selected level, e.g., a relatively high transmittance, and the normal area NA can have a transmittance less than the selected level or not have light transmittance.

For example, the one or more optical areas (OA1 and/or OA2) may have a resolution, a subpixel arrangement structure, a number of subpixels per unit area, an electrode structure, a line structure, an electrode arrangement structure, a line arrangement structure, and/or the like different from that/those of the normal area NA.

In one embodiment, the number of subpixels per unit area in the one or more optical areas (OA1 and/or OA2) may be less than the number of subpixels per unit area in the normal area NA. For example, the resolution of the one or more optical areas (OA1 and/or OA2) may be lower than that of the normal area NA. In this example, the number of subpixels per unit area may have the same meaning as a resolution, a pixel density, or a degree of integration of pixels. For example, the unit of the number of subpixels per unit area may be pixels per inch (PPI), which represents the number of pixels within 1 inch.

In the examples of FIGS. 1A, 1B, and 1C, the number of subpixels per unit area in the first optical areas OA1 may be less than the number of subpixels per unit area in the normal area NA. In the examples of FIGS. 1B and 1C, the number of subpixels per unit area in the second optical areas OA2 may be greater than or equal to the number of subpixels per unit area in the first optical areas OA1, and be less than the number of subpixels per unit area in the normal area NA.

In one or more embodiments, as a method for increasing respective transmittance of at least one of the first optical area OA1 and the second optical area OA2, a pixel density differentiation design scheme as described above may be applied in which a difference in densities of pixels (or subpixels) or in degrees of integration of pixels (or subpixels) between the first optical area OA1, the second optical area OA2, and the normal area NA can be produced. According to the pixel density differentiation design scheme, in an embodiment, the display panel 110 may be configured or designed such that the number of subpixels per unit area of at least one of the first optical area OA1 and the second optical area OA2 is greater than the number of subpixels per unit area of the normal area NA.

In one or more embodiments, as another method for increasing respective transmittance of at least one of the first optical area OA1 and the second optical area OA2, a pixel size differentiation design scheme may be applied in which a difference in sizes of pixels (or subpixels) between the first optical area OA1, the second optical area OA2, and the normal area NA can be produced. According to the pixel size differentiation design scheme, the display panel PNL may be configured or designed such that while the number of subpixels per unit area of at least one of the first optical area OA1 and the second optical area OA2 is equal to or similar to the number of subpixels per unit area of the normal area NA, a size of each subpixel (e.g., a size of a corresponding light emitting area) disposed in at least one of the first optical area OA1 and the second optical area OA2 is smaller than a size of each subpixel (e.g., a size of a corresponding light emitting area) disposed in the normal area NA.

In one or more aspects, for convenience of description, discussions that follow are provided based on the pixel density differentiation design scheme of the two schemes (e.g., the pixel density differentiation design scheme and the pixel size differentiation design scheme) for increasing respective transmittance of at least one of the first optical area OA1 and the second optical area OA2, unless explicitly stated otherwise. It should be therefore understood that in descriptions that follow, a small number of subpixels per unit area may be considered as corresponding to a small size of subpixel, and a large number of subpixels per unit area may be considered as corresponding to a large size of subpixel.

In the examples of FIGS. 1A, 1B, and 1C, the first optical area OA1 may have various shapes, such as a circle, an ellipse, a quadrangle, a hexagon, an octagon or the like. In the examples of FIGS. 1B and 1C, the second optical area OA2 may have various shapes, such as a circle, an ellipse, a quadrangle, a hexagon, an octagon or the like. The first optical area OA1 and the second optical area OA2 may have the same or substantially or nearly the same shape, or different shapes.

Referring to FIG. 1C, in the example where the first optical area OA1 and the second optical area OA2 contact each other (e.g., directly contact each other), the entire optical area including the first optical area OA1 and the second optical area OA2 may also have various shapes, such as a circle, an ellipse, a quadrangle, a hexagon, an octagon or the like. Hereinafter, for convenience of descriptions related to shapes of the optical areas (OA1 and OA2), each of the first optical area OA1 and the second optical area OA2 is considered to have a circular shape. It should be, however, understood that the scope of the present disclosure includes examples where at least one of the first optical area OA1 and the second optical area OA2 have a shape other than a circular shape.

According to one or more aspects of the present disclosure, when the display device 100 has a structure in which the first optical electronic device 11 such as a camera, and the like is located under, or in a lower portion of, the display panel 100 without being exposed to the outside, such a display device may be referred to as a display in which an under-display camera (UDC) technology is implemented.

The display device 100 in which such an under-display camera (UDC) technology is implemented can provide an advantage of preventing a reduction of an area or size of the display area DA because a notch or a camera hole for exposing a camera need not be formed in the display panel 110. Indeed, since a notch or a camera hole for camera exposure need not be formed in the display panel 110, the display device 100 can provide further advantages of reducing the size of a bezel area, and improving the degree of freedom in design because such limitations to the design are removed.

Although the one or more optical electronic devices (11 and/or 12) are located on the back of (e.g., under, or in a lower portion of) the display panel 110 of the display device 100 (e.g., hidden or not exposed to the outside), it is beneficial that the one or more optical electronic devices (11 and/or 12) are able to perform their normal predefined functionalities by receiving or detecting light.

Further, although one or more optical electronic devices (11 and/or 12) are located on the back of (e.g., under, or in a lower portion of) the display panel 110 to be hidden and thus located to overlap the display area DA, it is beneficial that the display device 100 is able to normally display one or more images in the one or more optical areas (OA1 and/or OA2) overlapping the one or more optical electronic devices (11 and/or 12) in the display area DA. Thus, even though one or more optical electronic devices (11 and/or 12) are located on the back of the display panel, the display device 100 according to aspects of the present disclosure can be configured to display images in a normal manner (e.g., without reduction in image quality) in the one or more optical areas (OA1 and/or OA2) overlapping the one or more optical electronic devices (11 and/or 12) in the display area DA.

Since the foregoing first optical area OA1 is configured or designed as an optically transmissive area, the quality of image display in the first optical area OA1 may be different from the quality of image display in the normal area NA.

Further, when designing the first optical area OA1 for the purpose of improving the quality of image display, there may be caused a situation that the transmittance of the first optical area OA1 is reduced.

To address these issues, in one or more aspects, the first optical area OA1 included in the display device 100 or the display panel may be configured with, or include, a structure capable of preventing a difference (e.g., non-uniformity) in image quality between the first optical area OA1 and the normal area NA from being caused, and improving the transmittance of the first optical area OA1.

Further, not only the first optical area OA1, but the second optical area OA2 included in the display device 100 or the display panel 110 according to aspects of the present disclosure may be configured with, or include, a structure capable of improving the image quality of the second optical area OA2, and improving the transmittance of the second optical area OA2.

It should be also noted that the first optical area OA1 and the second optical area OA2 included in the display device 100 or the display panel 110 according to aspects of the present disclosure may be differently implemented or have different utilization examples while having a similarity in terms of optically transmissive areas. Taking account of such a distinction, the structure of the first optical area OA1 and the structure of the second optical area OA2 in the display device 100 according to aspects of the present disclosure may be configured or designed differently from each other.

Figure 2:
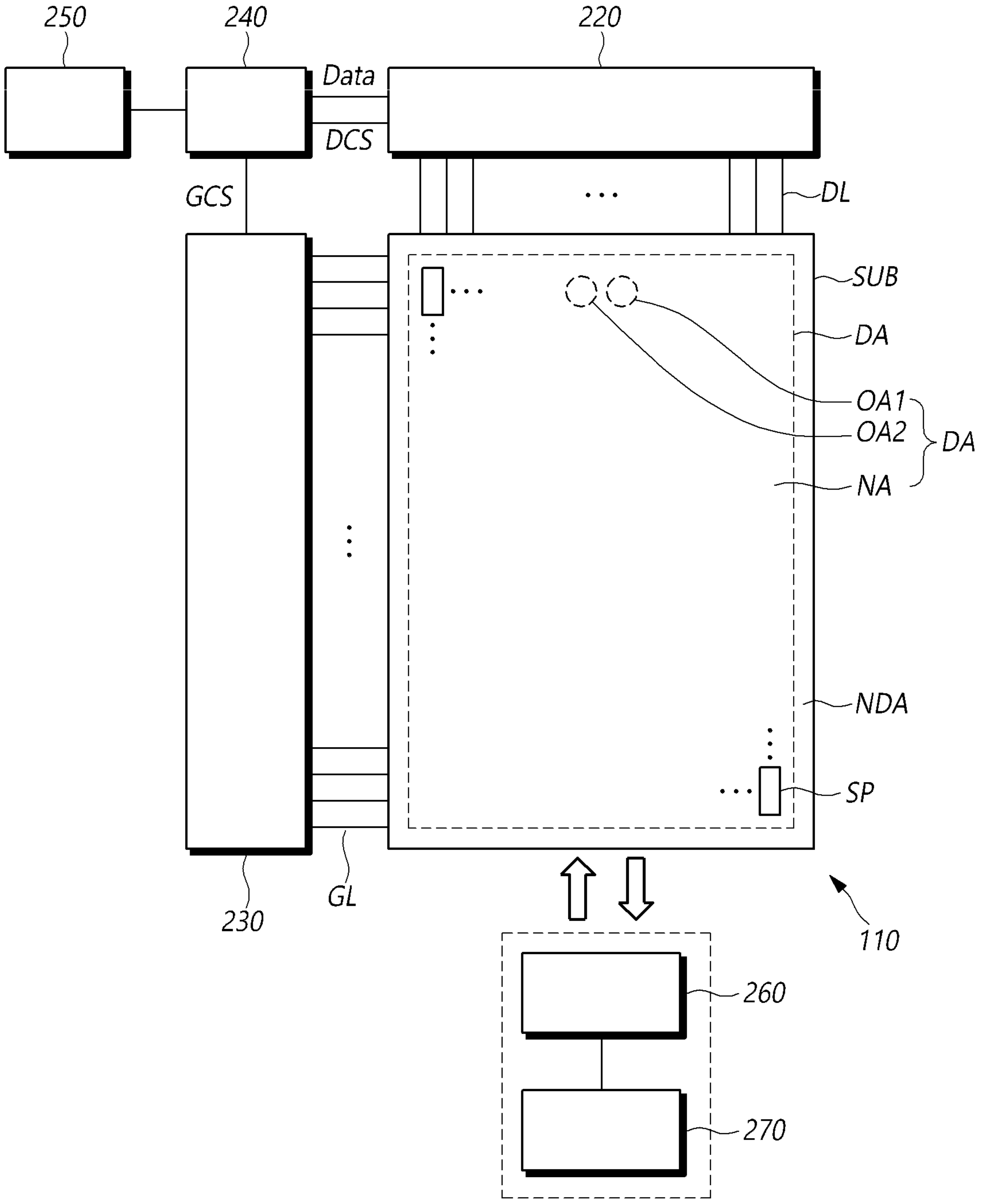
FIG. 2 illustrates an example system configuration of the display device according to aspects of the present disclosure.

FIG. 2 illustrates an example system configuration of the display device 100 according to aspects of the present disclosure.

Referring to FIG. 2, the display device 100 may include the display panel 110 and a display driving circuit as components for displaying one or more images.

The display driving circuit may be a circuit for driving the display panel 110, and include a data driving circuit 220, a gate driving circuit 230, a display controller 240, and other circuit components.

The display panel 110 may include a display area DA in which one or more images can be displayed and a non-display area NDA in which an image is not displayed. The non-display area NDA may be an area outside of the display area DA, and may also be referred to as an edge area or a bezel area. All or at least a portion of the non-display area NDA may be an area visible from the front surface of the display device 100, or an area that is bent and invisible from the front surface of the display device 100. The display panel 110 may include a substrate SUB and a plurality of subpixels SP disposed on the substrate SUB. The display panel 110 may further include various types of signal lines to drive the plurality of subpixels SP.

In one or more embodiments, the display device 100 according to aspects of the present disclosure may be a liquid crystal display device, or the like, or a self-emission display device in which light is emitted from the display panel 110 itself. In examples where the display device 100 according to aspects of the present disclosure is implemented as a self-emission display device, each of the plurality of subpixels SP may include a light emitting element. For example, the display device 100 according to aspects of the present disclosure may be an organic light emitting display device implemented with one or more organic light emitting diodes (OLED). In another example, the display device 100 according to aspects of the present disclosure may be an inorganic light emitting display device implemented with one or more inorganic material-based light emitting diodes. In further another example, the display device 100 according to aspects of the present disclosure may be a quantum dot display device implemented with quantum dots, which are self-emission semiconductor crystals.

The structure of each of the plurality of subpixels SP may be differently configured or designed according to types of the display devices 100. For example, in an example where the display device 100 is a self-emission display device including self-emission subpixels SP, each subpixel SP may include a self-emission light emitting element, one or more transistors, and one or more capacitors.

In one or more embodiments, various types of signal lines arranged in the display device 100 may include, for example, a plurality of data lines DL for carrying data signals (which may be referred to as data voltages or image signals), a plurality of gate lines GL for carrying gate signals (which may be referred to as scan signals), and the like.

The plurality of data lines DL and the plurality of gate lines GL may overlap one another. Each of the plurality of data lines DL may extend in a first direction. Each of the plurality of gate lines GL may extend in a second direction different from the first direction. For example, the first direction may be a column or vertical direction, and the second direction may be a row or horizontal direction. In another example, the first direction may be the row or horizontal direction, and the second direction may be the column or vertical direction.

The data driving circuit 220 may be a circuit for driving the plurality of data lines DL, and can supply data signals to the plurality of data lines DL. The gate driving circuit 230 may be a circuit for driving the plurality of gate lines GL, and can supply gate signals to the plurality of gate lines GL.

The display controller 240 may be a device for controlling the data driving circuit 220 and the gate driving circuit 230, and can control driving times for the plurality of data lines DL and driving times for the plurality of gate lines GL.

The display controller 240 can supply a data driving control signal DCS to the data driving circuit 220 to control the data driving circuit 220, and supply a gate driving control signal GCS to the gate driving circuit 230 to control the gate driving circuit 230.

The display controller 240 can receive input image data (which may be referred to as an image signal) from a host system 250 and supply image data Data to the data driving circuit 220 based on the input image data.

For example, an input image data (or an image signal) received by the display controller 240 from the host system 250 may include a red signal value, a green signal value, and a blue signal value.

The data driving circuit 220 can receive digital image data Data from the display controller 240, convert the received image data Data into analog data signals, and output the resulting analog data signals to the plurality of data lines DL.

The gate driving circuit 230 can receive a first gate voltage corresponding to a turn-on level voltage and a second gate voltage corresponding to a turn-off level voltage along with various gate driving control signals GCS, generate gate signals, and supply the generated gate signals to the plurality of gate lines GL.

In one or more embodiments, the data driving circuit 220 may be connected to the display panel 110 in a tape automated bonding (TAB) type, or connected to a conductive pad such as a bonding pad of the display panel 110 in a chip on glass (COG) type or a chip on panel (COP) type, or connected to the display panel 110 in a chip on film (COF) type.

In one or more embodiments, the gate driving circuit 230 may be connected to the display panel 110 in the tape automated bonding (TAB) type, or connected to a conductive pad such as a bonding pad of the display panel 110 in the chip on glass (COG) type or the chip on panel (COP) type, or connected to the display panel 110 in the chip on film (COF) type. In another embodiment, the gate driving circuit 230 may be disposed in the non-display area NDA of the display panel 110 in a gate in panel (GIP) type. The gate driving circuit 230 may be disposed on the substrate, or connected to the substrate. That is, in the case of the GIP type, the gate driving circuit 230 may be disposed in the non-display area NDA of the substrate. In the case of the chip on glass (COG) type, the chip on film (COF) type, or the like, the gate driving circuit 230 may be connected to the substrate.

In one or more embodiments, at least one of the data driving circuit 220 and the gate driving circuit 230 may be disposed in the display area DA of the display panel 110. For example, at least one of the data driving circuit 220 and the gate driving circuit 230 may be disposed such that it does not overlap subpixels SP, or disposed such that it overlaps one or more, or all, of the subpixels SP, or at least respective one or more portions of one or more subpixels.

The data driving circuit 220 may be located in, and/or electrically connected to, but not limited to, only one side or portion (e.g., an upper edge or a lower edge) of the display panel 110. In one or more embodiments, the data driving circuit 220 may be located in, and/or electrically connected to, but not limited to, two sides or portions (e.g., an upper edge and a lower edge) of the display panel 110 or at least two of four sides or portions (e.g., the upper edge, the lower edge, a left edge, and a right edge) of the display panel 110 according to driving schemes, panel design schemes, or the like.

The gate driving circuit 230 may be located in, and/or electrically connected to, but not limited to, only one side or portion (e.g., a left edge or a right edge) of the display panel 110. In one or more embodiments, the gate driving circuit 230 may be located in, and/or electrically connected to, but not limited to, two sides or portions (e.g., a left edge and a right edge) of the panel 110 or at least two of four sides or portions (e.g., an upper edge, a lower edge, the left edge, and the right edge) of the panel 110 according to driving schemes, panel design schemes, or the like.

The display controller 240 may be implemented in a separate component from the data driving circuit 220, or incorporated in the data driving circuit 220 and thus implemented in an integrated circuit.

The display controller 240 may be a timing controller used in the typical display technology or a controller or a control device capable of performing other control functions in addition to the function of the typical timing controller. In one or more embodiments, the display controller 140 may be a controller or a control device different from the timing controller, or a circuitry or a component included in the controller or the control device. The display controller 240 may be implemented with various circuits or electronic components such as an integrated circuit (IC), a field programmable gate array (FPGA), an application specific integrated circuit (ASIC), a processor, and/or the like.

The display controller 240 may be mounted on a printed circuit board, a flexible printed circuit, and/or the like and be electrically connected to the gate driving circuit 220 and the data driving circuit 230 through the printed circuit board, flexible printed circuit, and/or the like.

The display controller 240 may transmit signals to, and receive signals from, the data driving circuit 220 via one or more predefined interfaces. For example, such interfaces may include a low voltage differential signaling (LVDS) interface, an embedded clock point-point interface (EPI), a serial peripheral interface (SPI), and the like.

In one or more embodiments, in order to further provide a touch sensing function, as well as an image display function, the display device 100 according to aspects of the present disclosure may include at least one touch sensor, and a touch sensing circuit capable of detecting whether a touch event occurs by a touch object such as a finger, a pen, or the like, or of detecting a corresponding touch position (or touch coordinates), by sensing the touch sensor.

The touch sensing circuit may include: a touch driving circuit 260 capable of generating and providing touch sensing data by driving and sensing the touch sensor; a touch controller 270 capable of detecting the occurrence of a touch event or detecting a touch position (or touch coordinates) using the touch sensing data; and one or more other components.

The touch sensor may include a plurality of touch electrodes. The touch sensor may further include a plurality of touch lines for electrically connecting the plurality of touch electrodes to the touch driving circuit 260.

The touch sensor may be implemented in the form of a touch panel outside of the display panel 110 or be integrated inside of the display panel 110. In the example where the touch sensor is implemented in the form of the touch panel outside of the display panel 110, such a touch sensor may be referred to as an add-on type. In the example where the add-on type of touch sensor is disposed in the display device 100, the touch panel and the display panel 110 may be separately manufactured and combined in an assembly process. The add-on type of touch panel may include a touch panel substrate and a plurality of touch electrodes on the touch panel substrate.

In the example where the touch sensor is integrated inside of the display panel 110, the touch sensor may be formed on the substrate SUB together with signal lines and electrodes related to display driving during a process of manufacturing the display panel 110.

The touch driving circuit 260 can supply a touch driving signal to at least one of a plurality of touch electrodes, and sense at least one of the plurality of touch electrodes to generate touch sensing data.

The touch sensing circuit can perform touch sensing using a self-capacitance sensing technique or a mutual-capacitance sensing technique.

In the example where the touch sensing circuit performs touch sensing using the self-capacitance sensing technique, the touch sensing circuit can perform touch sensing based on capacitance between each touch electrode and a touch object (e.g., a finger, a pen, and the like). According to the self-capacitance sensing technique, each of the plurality of touch electrodes can serve as both a driving touch electrode and a sensing touch electrode. The touch driving circuit 260 can drive all, or one or more, of the plurality of touch electrodes and sense all, or one or more, of the plurality of touch electrodes.

In the example where the touch sensing circuit performs touch sensing using the mutual-capacitance sensing technique, the touch sensing circuit can perform touch sensing based on capacitance between touch electrodes. According to the mutual-capacitance sensing technique, the plurality of touch electrodes are divided into driving touch electrodes and sensing touch electrodes. The touch driving circuit 260 can drive the driving touch electrodes and sense the sensing touch electrodes.

The touch driving circuit 260 and the touch controller 270 included in the touch sensing circuit may be implemented in separate devices or in a single device. Further, the touch driving circuit 260 and the data driving circuit 220 may be implemented in separate devices or in a single device.

The display device 100 may further include a power supply circuit for supplying various types of power to the display driving circuit and/or the touch sensing circuit.

The display device 100 according to aspects of the present disclosure may represent, but not limited to, a mobile terminal such as a smart phone, a tablet, or the like, a monitor, a television (TV), or the like. Embodiments of the present disclosure are not limited thereto. In one or more embodiments, the display device 100 may be display devices, or include displays, of various types, sizes, and shapes for displaying information or images.

As described above, the display area DA of the display panel 110 may include the normal area NA and the one or more optical areas (OA1 and/or OA2) as illustrated in FIGS. 1A, 1B, and 1C. The normal area NA and the one or more optical areas (OA1 and/or OA2) may be areas where images can be displayed. It should be noted here that the normal NA may be an area in which a light transmission structure need not be implemented, and the one or more optical areas (OA1 and/or OA2) may be areas in which it is beneficial to have a light transmission structure be implemented.

As discussed above with respect to the examples of FIGS. 1A, 1B, and 1C, even though the display area DA of the display panel 110 may include the one or more optical areas (OA1 and/or OA2) together with the normal area NA, for convenience of description, discussions that follow will be provided based on examples where the display area DA includes both the first and second optical areas OA1 and OA2 (e.g., the first optical area OA1 of FIGS. 1A, 1B, and 1C, and the second optical area OA2 of FIGS. 1B and 1C) and the normal area NA (e.g., the normal area NA of FIGS. 1A, 1B, and 1C).

Figure 3:
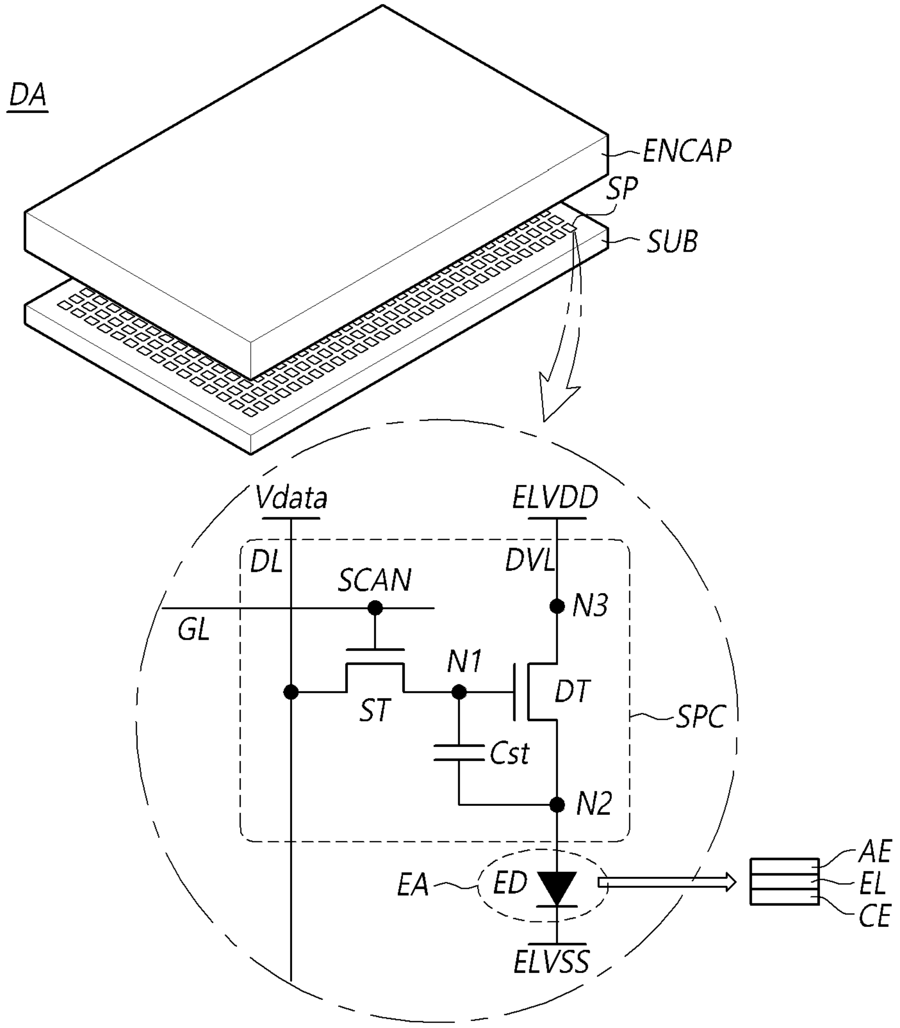
FIG. 3 illustrates an example display panel according to aspects of the present disclosure.

FIG. 3 illustrates an example system configuration of the display device 110 according to aspects of the present disclosure.

Referring to FIG. 3, a plurality of subpixels SP may be disposed in the display area DA of the display panel 110. The plurality of subpixels SP may be disposed in a normal area (e.g., the normal area of FIGS. 1A, 1B, and 1C), a first optical area (e.g., the first optical area OA1 of FIGS. 1A, 1B, and 1C), and a second optical area (e.g., the second optical area OA2 of FIGS. 1B and 1C) included in the display area DA of the display panel 110.

Each of the plurality of subpixels SP may include a light emitting element ED and a pixel circuit SPC configured to drive the light emitting element ED. The pixel circuit SPC may include a driving transistor DT for driving the light emitting element ED, a scan transistor ST for transferring a data voltage Vdata to a first node N1 of the driving transistor DT, a storage capacitor Cst for maintaining a voltage at an approximate constant level during one frame, and the like.

The driving transistor DT may include the first node N1 to which a data voltage is applied, a second node N2 electrically connected to the light emitting element ED, and a third node N3 to which a driving voltage ELVDD through a driving voltage line DVL is applied. In the driving transistor DT, the first node N1 may be a gate node, the second node N2 may be a source node or a drain node, and the third node N3 may be the drain node or the source node. For convenience of description, descriptions that follow will be provided based on examples where the first, second and third nodes (N1, N2 and N3) of the driving transistor DT are gate, source and drain nodes, respectively, unless explicitly stated otherwise. However, it should be understood that the scope of the present disclosure includes examples where the first, second and third nodes (N1, N2 and N3) of the driving transistor DT are gate, drain and source nodes, respectively.

The light emitting element ED may include an anode electrode AE, an emission layer EL, and a cathode electrode CE. The anode electrode AE may represent a pixel electrode disposed in each subpixel SP, and may be electrically connected to the second node N2 of the driving transistor DT of each subpixel SP. The cathode electrode CE may represent a common electrode being disposed in the plurality of subpixels SP in common, and a base voltage ELVSS such as a low-level voltage, a ground voltage, or the like may be applied to the cathode electrode CE.

For example, the anode electrode AE may be a pixel electrode, and the cathode electrode CE may be a common electrode. In another example, the anode electrode AE may be a common electrode, and the cathode electrode CE may be a pixel electrode. For convenience of description, discussions that follow will be provided based on examples where the anode electrode AE is a pixel electrode, and the cathode electrode CE is a common electrode unless explicitly stated otherwise. However, it should be understood that the scope of the present disclosure includes examples where the anode electrode AE is a common electrode, and the cathode electrode CE is a pixel electrode.

The light emitting element ED may include a light emitting area EA having a selected size or area. The light emitting area EA of the light emitting element ED may be defined as, for example, an area in which the anode electrode AE, the emission layer EL, and the cathode electrode CE overlap one another.

The light emitting element ED may be, for example, an organic light emitting diode (OLED), an inorganic light emitting diode, a quantum dot light emitting element, or the like. In the example where an organic light emitting diode (OLED) is used as the light emitting element ED, the emission layer EL thereof may include an organic emission layer including an organic material.

The scan transistor ST can be turned on and off by a scan signal SCAN, which is a gate signal applied through a gate line GL, and be electrically connected between the first node N1 of the driving transistor DT and a data line DL.

The storage capacitor Cst may be electrically connected between the first node N1 and the second node N2 of the driving transistor DT.

The pixel circuit SPC may be configured with two transistors (2T: DRT and SCT) and one capacitor (1C: Cst) (which may be referred to as a "2T1C structure") as shown in FIG. 3, and in one or more implementations, may further include one or more transistors, and/or further include one or more capacitors.

In one or more embodiments, the storage capacitor Cst, which may be present between the first node N1 and the second node N2 of the driving transistor DT, may be an external capacitor intentionally configured or designed to be located outside of the driving transistor DT, other than internal capacitors, such as parasitic capacitors (e.g., a gate-to-source capacitance Cgs, a gate-to-drain capacitance Cgd, and the like). Each of the driving transistor DT and the scan transistor ST may be an n-type transistor or a p-type transistor.

Since circuit elements (in particular, a light emitting element ED implemented with an organic light emitting diode including an organic material) included in each subpixel SP are vulnerable to external moisture or oxygen, an encapsulation layer ENCAP may be disposed in the display panel 110 in order to prevent external moisture or oxygen from penetrating into such circuit elements. The encapsulation layer ENCAP may be disposed such that it covers the light emitting element ED.

Hereinafter, for convenience of description, the term "optical area OA" is used instead of distinctly describing the first optical area OA1 and the second optical area OA2 described above. Thus, it should be noted that an optical area described below may represent any one or both of the first and second optical area OA1 and OA2 described above, unless explicitly stated otherwise.

Likewise, for convenience of description, the term "optical electronic device" is used instead of distinctly describing the first optical electronic device 11 and the second optical electronic device 12 described above. Thus, it should be noted that an optical electronic device described below may represent any one or both of the first and second optical electronic device 11 and 12 described above, unless explicitly stated otherwise.

Hereinafter, an example first type of optical area OA will be described with reference to FIGS. 4 to 9, and an example second type of optical area OA will be described with reference to FIGS. 10 to 12.

The first type of optical area OA and the second type of optical area OA are briefly described as follows.

In the case of the first type of optical area OA, one or more pixel circuits SPC for driving one or more light emitting elements ED disposed in the optical area OA may be disposed in an area outside of the optical area OA without being in the optical area OA.

In the case of the second type of optical area OA, one or more pixel circuits SPC for driving one or more light emitting elements ED disposed in the optical area OA may be disposed the optical area OA.

Figure 4:
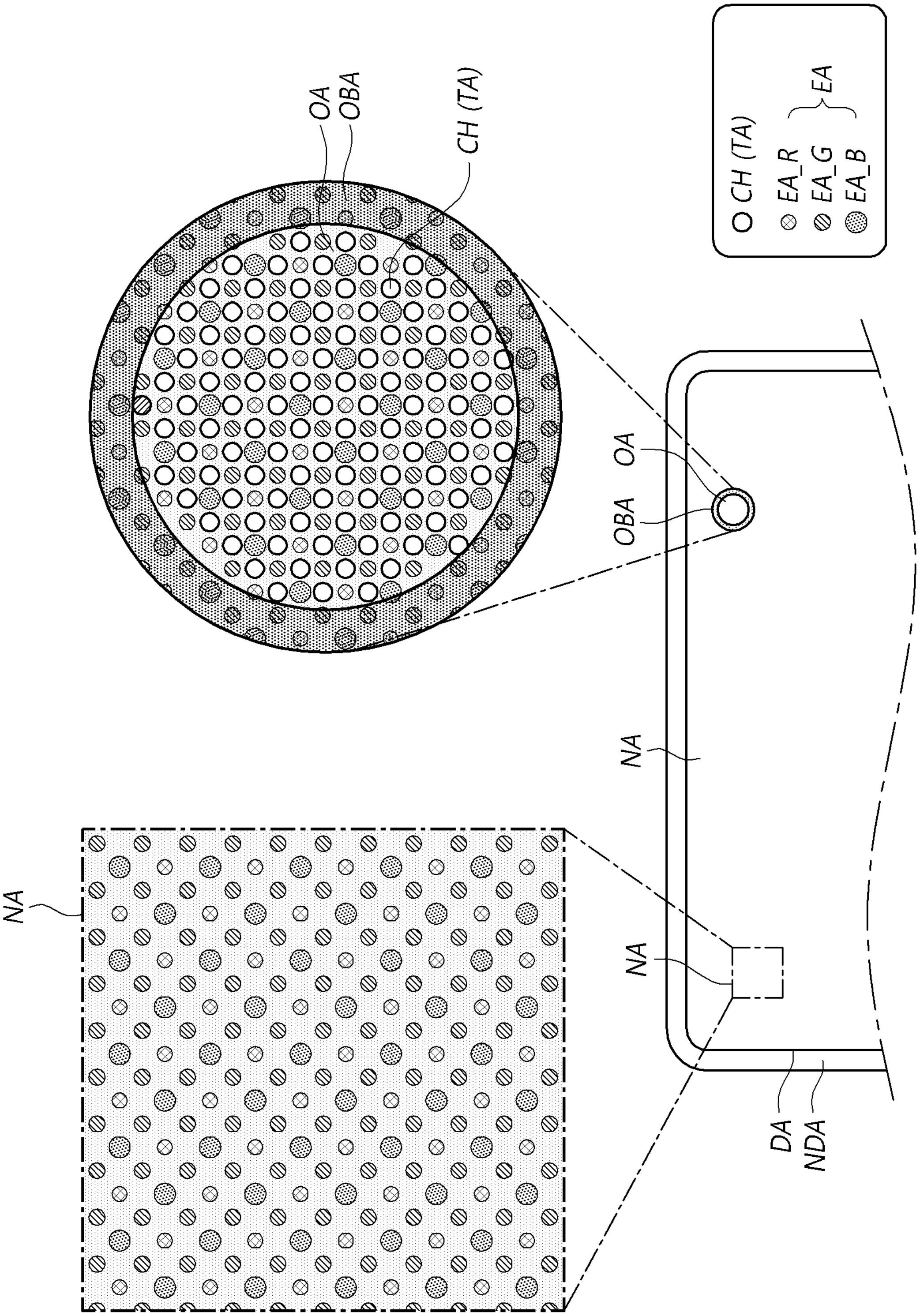
FIG. 4 schematically illustrates an example first type of optical area and an example normal area around the first type of optical area in the display panel according to aspects of the present disclosure.

FIG. 4 schematically illustrates an example first type of optical area OA and an example normal area NA around the first type of optical area OA in the display panel 110 according to aspects of the present disclosure.

Referring to FIG. 4, in one or more embodiments, the display panel 110 according to aspects of the present disclosure may include a display area (e.g., the display area DA of figures described above) where one or more images can be displayed and a non-display area (e.g., the non-display area NDA of figures described above) where an image is not displayed.

Referring to FIG. 4, the display area DA may include an optical area OA through which light can be transmitted, and a normal area NA around the optical area OA. The optical area OA may have the structure of a first type. Thus, in an example where the optical area OA is implemented in the first type, an optical bezel area OBA may be disposed outside of the optical area OA. In one or more embodiments, the optical bezel area OBA may represent a part of the normal area NA.

In other words, when the optical area OA is implemented in the first type, the display area DA may include the optical area OA, the normal area NA located outside of the optical area OA, and the optical bezel area OBA between the optical area OA and the normal area NA.

Referring to FIG. 4, the optical area OA may be an area overlapping an optical electronic device and be a transmissive area through which light used for operation of the optical electronic device can be transmitted. The light transmitting through the optical area OA may include light of a single wavelength band or light of various wavelength bands. For example, the optical area OA may be configured to allow, but not limited to, at least one of visible light, infrared light, ultraviolet light, and the like to be transmitted.

An optical electronic device disposed in the optical area OA can receive light transmitting through the optical area OA and perform a predefined operation using the received light. The light received by the optical electronic device through the optical area OA may include at least one of visible light, infrared light, and ultraviolet light.

For example, in an example where the optical electronic device is a camera, the light used for the predefined operation of the optical electronic device, which has passed through the optical area OA, may include visible light. In another example, in an example where the optical electronic device is an infrared sensor, the light used for the predefined operation of the optical electronic device, which has passed through the optical area OA, may include infrared (also referred to as infrared light).

Referring to FIG. 4, the optical bezel area OBA may represent an area located outside of the optical area OA. The normal area NA may represent an area located outside of the optical bezel area OBA. The optical bezel area OBA may be disposed between the optical area OA and the normal area NA.

For example, the optical bezel area OBA may be disposed outside of only a portion of an edge of the optical area OA, or disposed outside of the entire edge of the optical area OA.

In the example where the optical bezel area OBA is disposed outside of the entire edge of the optical area OA, the optical bezel area OBA may have a ring shape surrounding the optical area OA. For example, the optical area OA may have various shapes such as a circular shape, an elliptical shape, a polygonal shape, an irregular shape, or the like. The optical bezel area OBA may have various ring shapes (e.g., a circular ring shape, an elliptical ring shape, a polygonal ring shape, an irregular ring shape, or the like) surrounding the optical area OA having various shapes.

Referring to FIG. 4, the display area DA may include a plurality of light emitting areas EA. Since the optical area OA, the optical bezel area OBA, and the normal area NA are areas included in the display area DA, each of the optical area OA, the optical bezel area OBA, and the normal area NA may include a plurality of light emitting areas EA.

For example, the plurality of light emitting areas EA may include one or more first color light emitting areas emitting light of a first color, one or more second color light emitting areas emitting light of a second color, and one or more third color light emitting areas emitting light of a third color.

At least one of the first color light emitting area, the second color light emitting area, and the third color light emitting area may have a different area or size from the remaining one or more light emitting areas.

The first color, the second color, and the third color may be different colors from one another, and may be various colors. For example, the first color, second color, and third color may be or include red, green, and blue, respectively.

Hereinafter, for convenience of description, the first color, the second color, and the third color are considered to be red, green, and blue, respectively. However, embodiments of the present disclosure are not limited thereto.

In the example where the first color, the second color, and the third color are red, green, and blue, respectively, an area of a blue light emitting area EA_B may be greater than an area of a red light emitting area EA_R and an area of a green light emitting area EA_G.

A light emitting element ED disposed in the red light emitting area EA_R may include an emission layer EL emitting red light. A light emitting element ED disposed in the green light emitting area EA_G may include an emission layer EL emitting green light. A light emitting element ED disposed in the blue light emitting area EA_B may include an emission layer EL emitting blue light.

An organic material included in the emission layer EL emitting blue light may be more easily degraded in terms of material than respective organic materials included in the emission layer EL emitting red light and the emission layer EL emitting green light.

In one or more embodiments, as the blue light emitting area EA_B is configured or designed to have the largest area or size, current density supplied to the light emitting element ED disposed in the blue light emitting area EA_B may be the least. Therefore, a degradation degree of a light emitting element ED disposed in the blue light emitting area EA_B may be similar to a degradation degree of a light emitting element ED disposed in the red light emitting area EA_R and a degradation degree of a light emitting element ED disposed in the green light emitting area EA_G.

In consequence, a difference in degradation between the light emitting element ED disposed in the red light emitting area EA_R, the light emitting elements ED disposed in the green light emitting area EA_G, and the light emitting elements ED disposed in the blue light emitting area EA_B cannot be produced or can be reduced, and therefore, the display device 100 or the display panel 110 according to aspects of the present disclosure can provide an advantage of improving image quality. In addition, as a difference in degradation between the light emitting element ED disposed in the red light emitting area EA_R, the light emitting elements ED disposed in the green light emitting area EA_G, and the light emitting elements ED disposed in the blue light emitting area EA_B is eliminated or reduced, the display device 100 or the display panel 110 according to aspects of the present disclosure can therefore provide an advantage of reducing a difference in lifespan between the light emitting element ED disposed in the red light emitting area EA_R, the light emitting elements ED disposed in the green light emitting area EA_G, and the light emitting elements ED disposed in the blue light emitting area EA_B.

Referring to FIG. 4, it is beneficial that the optical area OA, which is an optically transmissive area, has high transmittance. To meet this requirement, a cathode electrode (e.g., the cathode electrode CE of FIG. 3) may include a plurality of cathode holes CH in the optical area OA. That is, in the optical area OA, the cathode electrode CE may include a plurality of cathode holes CH.

Referring to FIG. 4, in one or more embodiments, the cathode electrode CE may not include a cathode hole CH in the normal area NA. That is, in the normal area NA, the cathode electrode CE may not include a cathode hole CH.

In one or more embodiments, the cathode electrode CE may not include a cathode hole CH in the optical bezel area OBA. That is, in the optical bezel area OBA, the cathode electrode CE may not include a cathode hole CH.

In the optical area OA, the plurality of cathode holes CH formed in the cathode electrode CE may be referred to as a plurality of transmissive areas TA or a plurality of openings. Although FIG. 4 illustrates that each cathode hole CH has a respective circular shape, one or more cathode holes CH may have various shapes other than the circular shape, such as an elliptical shape, a polygonal shape, an irregular shape or the like.

Figure 5:
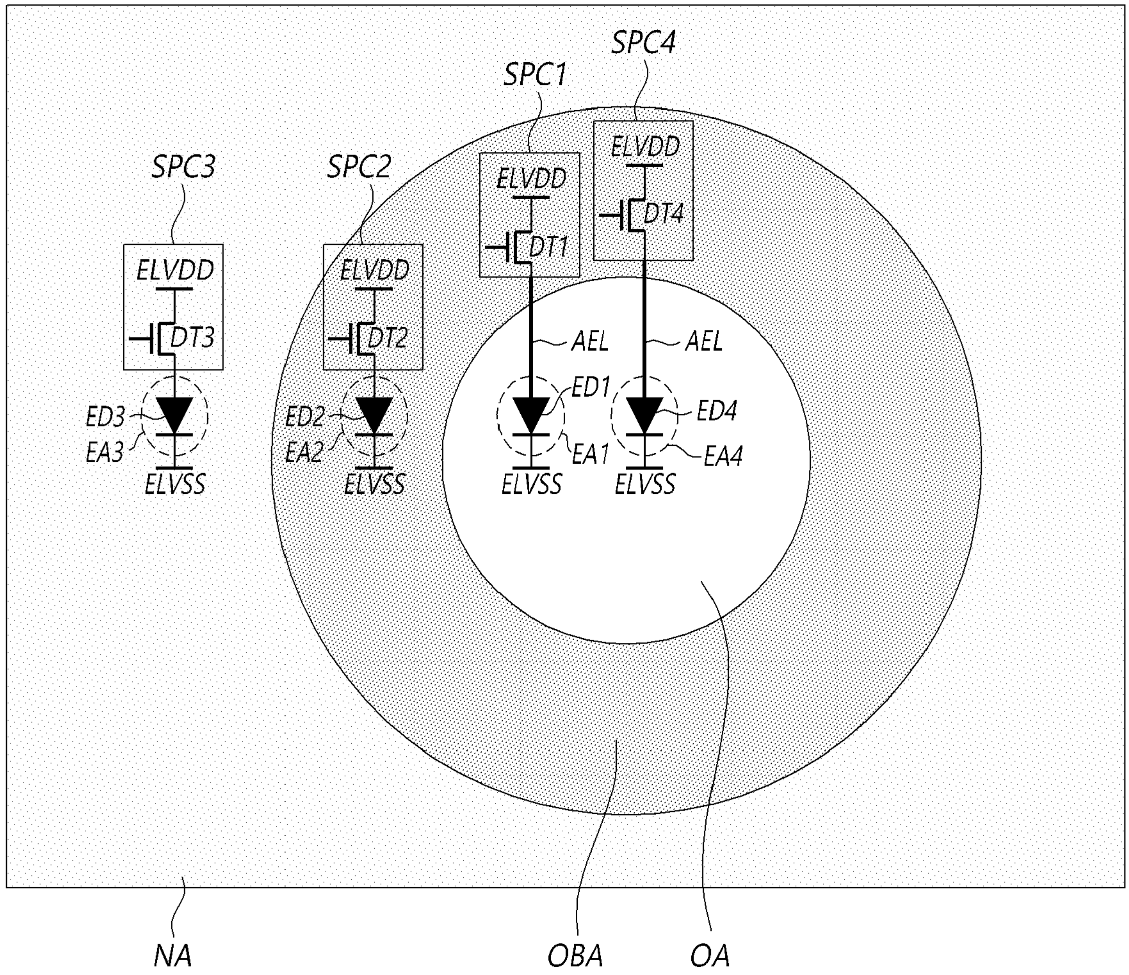
FIGS. 5 and 6 illustrate example light emitting elements and example pixel circuits for driving the light emitting elements, which are disposed in a normal area, an optical bezel area, and an optical area in the display panel according to aspects of the present disclosure.

FIG. 5 illustrates an example configuration of the display panel 110 according to aspects of the present disclosure. As illustrated in FIG. 5, the display panel 110 may include light emitting elements (ED1, ED2, ED3, and ED4) disposed in the normal area NA, the optical bezel area OBA, and the optical area OA, and pixel circuits (SPC1, SPC2, SPC3, and SPC4) for driving the light emitting elements (ED1, ED2, ED3, and ED4).

It should be understood here that each of the pixel circuits (SPC1, SPC2, SPC3, and SPC4) may include transistors (DT and ST), a storage capacitor Cst, and the like as shown in FIG. 3. However, it should be noted that for convenience of explanation, each of the pixel circuits (SPC1, SPC2, SPC3, and SPC4) is simply expressed as only a respective driving transistor (DT1, DT2, DT3, and DT4).

Referring to FIG. 5, the normal area NA, the optical area OA, and the optical bezel area OBA may have structural differences as well as positional differences.

As one example of such structural differences, one or more pixel circuits (SPC1, SPC2, SPC3, and/or SPC4) may be disposed in the optical bezel area OBA and the normal area NA, but a pixel circuit may not be disposed in the optical area OA. For example, the optical bezel area OBA and the normal area NA may be configured to allow one or more transistors (DT1, DT2, DT3, and/or DT4) to be disposed therein, but the optical area OA may be configured not to allow a transistor to be disposed therein.

Transistors and storage capacitors included in the pixel circuits (SPC1, SPC2, SPC3, and SPC4) may be components causing transmittance to be reduced. Thus, since a pixel circuit (e.g., SPC1, SPC2, SPC3, or SPC4) is not disposed in the optical area OA, the transmittance of the optical area OA can be more improved.

In one or more embodiments, although the pixel circuits (SPC1, SPC2, SPC3, and SPC4) may be disposed only in the normal area NA and the optical bezel area OBA, the light emitting elements (ED1, ED2, ED3, and ED4) may be disposed in the normal area NA, the optical bezel area OBA, and the optical area OA.

Referring to FIG. 5, although a first light emitting element ED1 may be disposed in the optical area OA, a first pixel circuit SPC1 for driving the first light emitting element ED1 may not be located in the optical area OA.

Referring to FIG. 5, the first pixel circuit SPC1 for driving the first light emitting element ED1 disposed in the optical area OA may be disposed in the optical bezel area OBA, not in the optical area OA.

Hereinafter, the normal area NA, the optical area OA, and the optical bezel area OBA will be described in more detail.

Referring to FIG. 5, in one or more embodiments, the plurality of light emitting areas EA included in the display panel 110 according to aspects of the present disclosure may include a first light emitting area EA1, a second light emitting area EA2, and a third light emitting area EA3. In these embodiments, the first light emitting area EA1, the second light emitting area EA2, and the third light emitting area EA3 may be included in the optical area OA, the optical bezel area OBA, and the normal area NA, respectively. Hereinafter, it is assumed that the first light emitting area EA1, the second light emitting area EA2, and the third light emitting area EA3 are areas emitting light of a same color.

Referring to FIG. 5, in one or more embodiments, the display panel 110 according to aspects of the present disclosure may include: a first light emitting element ED1 disposed in the optical area OA1 and having the first light emitting area EA1; a second light emitting element ED2 disposed in the optical bezel area OBA1 and having the second light emitting area EA2; and a third light emitting element ED3 disposed in the normal area NA and having the third light emitting area EA3.

Referring to FIG. 5, in one or more embodiments, the display panel 110 according to aspects of the present disclosure may further include a first pixel circuit SPC1 configured to drive the first light emitting element ED1, a second pixel circuit SPC2 configured to drive the second light emitting element ED2, and a third pixel circuit SPC3 configured to drive the third light emitting element ED3.

Referring to FIG. 5, the first pixel circuit SPC1 may include a first driving transistor DT1. The second pixel circuit SPC2 may include a second driving transistor DT2. The third pixel circuit SPC3 may include a third driving transistor DT3.

Referring to FIG. 5, in one or more embodiments, in the display panel 110 according to aspects of the present disclosure, the second pixel circuit SPC2 may be located in the optical bezel area OBA where the second light emitting element ED2 corresponding to the second pixel circuit SPC2 is disposed, and the third pixel circuit SPC3 may be located in the normal area NA where the third light emitting element ED3 corresponding to the third pixel circuit SPC3 is disposed.

Referring to FIG. 5, in one or more embodiments, in the display panel 110 according to aspects of the present disclosure, the first pixel circuit SPC1 may not be located in the optical area OA where the first light emitting element ED1 corresponding to the first pixel circuit SPC1 is disposed. Instead, the first pixel circuit SPC1 may be located in the optical bezel area OBA located outside of the optical area OA. As a result, the transmittance of the optical area OA can be improved.

Referring to FIG. 5, in one or more embodiments, the display panel 110 according to aspects of the present disclosure may further include an anode extension line AEL electrically connecting the first light emitting element ED1 disposed in the optical area OA to the first pixel circuit SPC1 disposed in the optical bezel area OBA.

The anode extension line AEL may electrically extend or connect an anode electrode AE of the first light emitting element ED1 to a second node N2 of the first driving transistor DT1 in the first pixel circuit SPC1.

As described above, in the display panel 110 according to aspects of the present disclosure, the first pixel circuit SPC1 for driving the first light emitting element ED1 disposed in the optical area OA may be disposed in the optical bezel area OBA, not in the optical area OA. Such a structure may be referred to as an anode extension structure. Likewise, the first type of the optical area OA may be also referred to as an anode extension type.

In an embodiment where the display panel 110 according to aspects of the present disclosure has such an anode extension structure, all or at least a portion of the anode extension line AEL may be disposed in optical area OA, and the anode extension line AEL may include a transparent material, or be or include a transparent line. Accordingly, even when the anode extension line AEL for connecting the first pixel circuit SPC1 to the first light emitting element ED1 is disposed in the optical area OA, the display device or the display panel 110 according to aspects of the present disclosure can prevent the transmittance of the optical area OA from being reduced.

Referring to FIG. 5, a plurality of light emitting areas EA may further include a fourth light emitting area EA4 emitting light of the same color as the first light emitting area EA1 and included in the optical area OA.

Referring to FIG. 5, the fourth light emitting area EA4 may be disposed adjacent to the first light emitting area EA1 in a row direction or a column direction.

Referring to FIG. 5, in one or more embodiments, the display panel 110 according to aspects of the present disclosure may further include a fourth light emitting element ED4 disposed in the optical area OA and having the fourth light emitting area EA4, and a fourth pixel circuit SPC4 configured to drive the fourth light emitting element ED4.

Referring to FIG. 5, the fourth pixel circuit SPC4 may include a fourth driving transistor DT4. For convenience of description, a scan transistor ST and a storage capacitor Cst included in the fourth pixel circuit SPC4 are omitted from FIG. 5.

Referring to FIG. 5, although the fourth pixel circuit SPC4 is a circuit for driving the fourth light emitting element ED4 disposed in the optical area OA, the fourth pixel circuit SPC4 may be disposed in the optical bezel area OBA.

Referring to FIG. 5, in one or more embodiments, the display panel 110 according to aspects of the present disclosure may further include an anode extension line AEL for electrically connecting the fourth light emitting element ED4 to the fourth pixel circuit SPC4.

All or at least a portion of the anode extension line AEL may be disposed in the optical area OA, and the anode extension line AEL may include a transparent material, or be or include a transparent line.

As described above, the first pixel circuit SPC1 disposed in the optical bezel area OBA may be configured to drive one light emitting element ED1 disposed in the optical area OA. Such a circuit connection scheme may be referred to as a one-to-one (1:1) circuit connection scheme.

As a result, the number of pixel circuits SPC disposed in the optical bezel area OBA may be increased significantly. Further, the structure of the optical bezel area OBA may become complicated, and an open area of the optical bezel area OBA may be reduced. Herein, the open area may be referred to as a light emitting area, and may also be referred to as an open ratio or an aperture ratio.

In order to increase an open area of the optical bezel area OBA while having an anode extension structure, in one or more embodiments, the display device 100 according to aspects of the present disclosure may be configured in a 1:N (where N is 2 or more) circuit connection scheme.

According to the 1:N circuit connection scheme, the first pixel circuit SPC1 disposed in the optical bezel area OBA may be configured to drive two light emitting elements ED disposed in the optical area OA concurrently or together.

Figure 6:
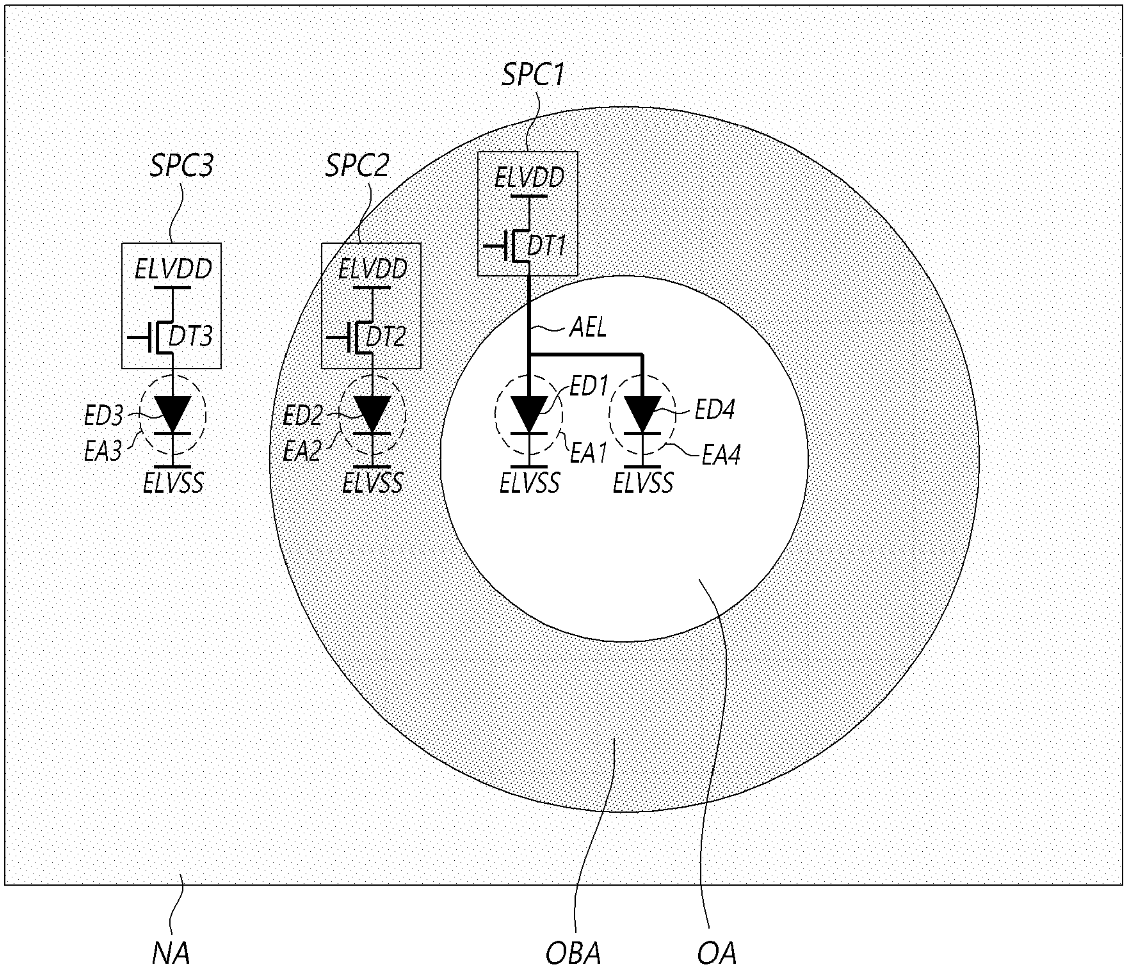

FIG. 6 illustrates a 1:2 circuit connection scheme as an example for convenience of description. In this example, a first pixel circuit SPC1 disposed in the optical bezel area OBA may be configured to drive two or more light emitting elements (ED1 and ED4) disposed in the optical area OA concurrently or together.

In one or more embodiments, referring to FIG. 6, light emitting elements (ED1, ED2, ED3, and ED4) disposed in the normal area NA, the optical bezel area OBA, and the optical area OA, and pixel circuits (SPC1, SPC2, and SPC3) for driving the light emitting elements (ED1, ED2, ED3, and ED4) may be disposed in the display panel 110.

Referring to FIG. 6, a fourth light emitting element ED4 disposed in the optical area OA can be driven by the first pixel circuit SPC1 for driving a first light emitting element ED1 located in the optical area OA. That is, the first pixel circuit SPC1 disposed in the optical bezel area OBA may be configured to drive the first light emitting element ED1 and the fourth light emitting element ED4 disposed in the optical area OA together or substantially concurrently.

Accordingly, even when the display panel 110 has an anode extension structure, the number of pixel circuits SPC disposed in the optical bezel area OBA can be significantly reduced, and thereby, an open area and a light emitting area of the optical bezel area OBA can be increased.

In the example of FIG. 6, the first light emitting element ED1 and the fourth light emitting element ED4 driven together by the first pixel circuit SPC1 disposed in the optical bezel area OBA may be light emitting elements that emit light of a same color, and are adjacent to each other in a row direction or a column direction.

Referring to FIG. 6, an anode extension line AEL may connect the first light emitting element ED1 and the fourth light emitting element ED4 disposed in the optical area OA to the first pixel circuit SPC1 disposed in the optical bezel area OBA.

Figure 7:
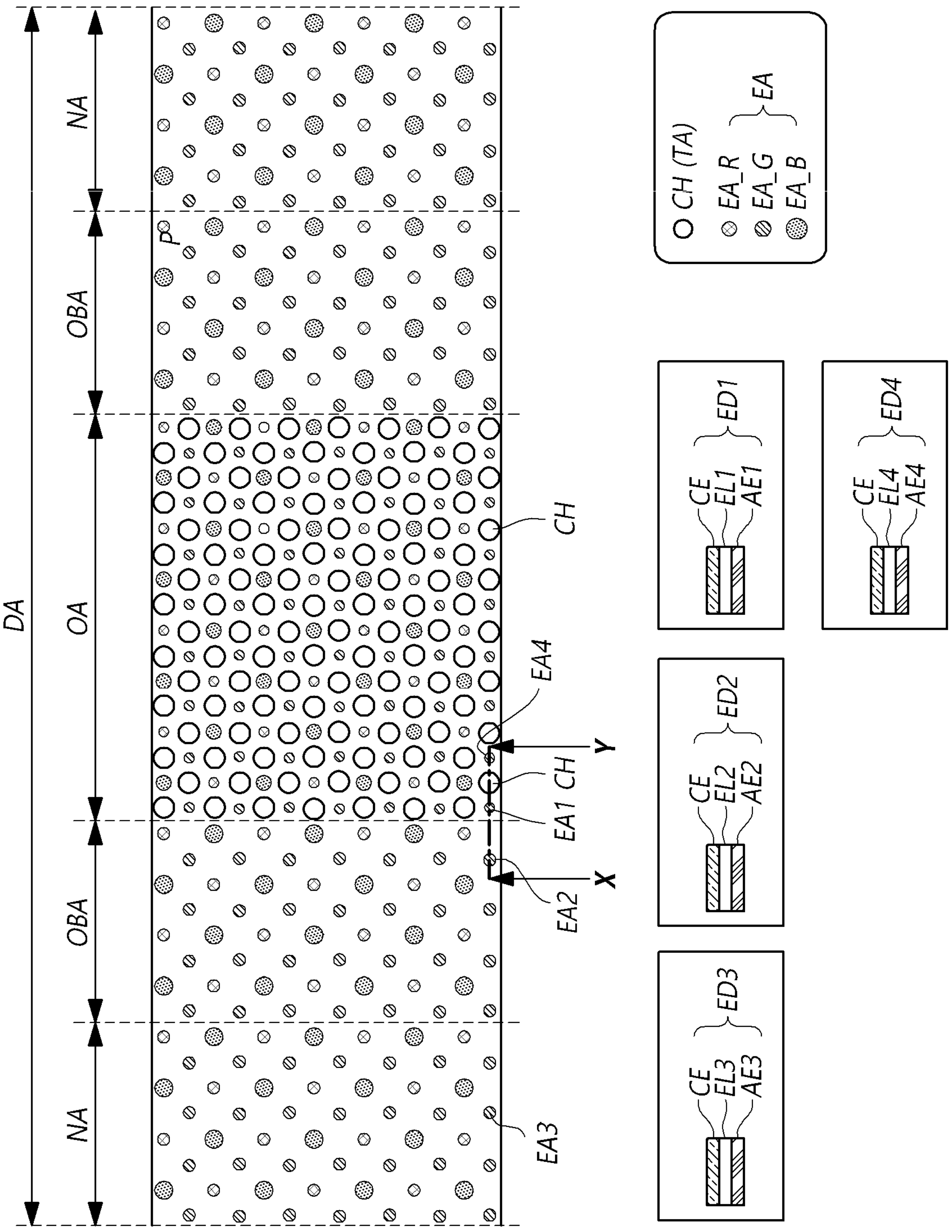
FIG. 7 is an example plan view of the normal area, the optical bezel area, and the optical area included in the display panel according to aspects of the present disclosure.

FIG. 7 is an example plan view of the normal area NA, the optical bezel area OBA, and the optical area OA in the display panel 110 according to aspects of the present disclosure.

Referring to FIG. 7, in one or more embodiments, in the display panel 110 according to aspects of the present disclosure, a plurality of light emitting areas EA disposed in each of the normal area NA, the optical bezel area OBA, and the optical area OA may include one or more red light emitting areas EA_R, one or more green light emitting areas EA_G, and one or more blue light emitting areas EA_B.

Referring to FIG. 7, in one or more embodiments, in the display panel 110 according to aspects of the present disclosure, a cathode electrode (e.g., the cathode electrode CE of FIG. 3) may be commonly disposed in the normal area NA, the optical bezel area OBA, and the optical area OA.

The cathode electrode CE may include a plurality of cathode holes CH, and the plurality of cathode holes CH of the cathode electrode CE may be disposed in the optical area OA.

The normal area NA and the optical bezel area OBA may be areas allowing light not to be transmitted, and the optical area OA may be an area allowing light to be transmitted. Accordingly, the transmittance of the optical area OA may be higher than respective transmittance of the optical bezel area OBA and the normal area NA.

For example, all of the optical area OA may be an area through which light can be transmitted, and the plurality of cathode holes CH of the optical area OA may be transmissive areas TA through which light can be transmitted more effectively. That is, the remaining area except for the plurality of cathode holes CH in the optical area OA may be an area through which light can be transmitted, and respective transmittance of the plurality of cathode holes CH in the optical area OA may be higher than the transmittance of the remaining area except for the plurality of cathode holes (CH) in the optical area OA.

In another example, the plurality of cathode holes CH in the optical area OA may be transmissive areas TA through which light can be transmitted, and the remaining area except for the plurality of cathode holes CH in the optical area OA may be an area through which light cannot be transmitted.

Referring to FIG. 7, the arrangement of light emitting areas EA in the optical area OA, the arrangement of light emitting areas EA in the optical bezel area OBA, and the arrangement of light emitting areas EA in the normal area NA may be the same as one another.

Referring to FIG. 7, a plurality of light emitting areas EA may include one or more first light emitting areas EA1 included in the optical area OA, one or more second light emitting areas EA2 included in the optical bezel area OBA and emitting light of the same color as the one or more first light emitting areas EA1, and one or more third light emitting areas EA3 included in the normal area NA and emitting light of the same color as the one or more first light emitting areas EA1.

Referring to FIG. 7, the plurality of light emitting areas EA may further include one or more fourth light emitting area EA4 included in the optical area OA and emitting light of the same color as the one or more first light emitting areas EA1.

Referring to FIG. 7, in one or more embodiments, the display panel 110 according to aspects of the present disclosure may include one or more first anode electrodes AE1 disposed in the optical area OA, one or more second anode electrodes AE2 disposed in the optical bezel area OBA, one or more third anode electrodes AE3 disposed in the normal area NA, and one or more fourth anode electrodes AE4 disposed in the optical area OA.

In one or more embodiments, the display panel 110 according to aspects of the present disclosure may further include a cathode electrode (e.g., the cathode electrode CE in FIG. 3) commonly disposed in the normal area NA, the optical bezel area OBA, and the optical area OA.

In one or more embodiments, the display panel 110 according to aspects of the present disclosure may include one or more first emission layers EL1 disposed in the optical area OA, one or more second emission layers EL2 disposed in the optical bezel area OBA, one or more third emission layers EL3 disposed in the normal area NA, and one or more fourth emission layers EL4 disposed in the optical area OA.

The first to fourth emission layers EL4 may be emission layers emitting light of a same color. In these embodiments, the first to fourth emission layers EL1 to EL4 may be disposed as separate emission layers or be integrated into a single emission layer.

Referring to FIG. 7, light emitting elements of the display panel 110 according to aspects of the present disclosure may be configured such that: the first light emitting element ED1 is configured with the first anode electrode AE1, the first emission layer EL1, and the cathode electrode CE; the second light emitting element ED2 is configured with the second anode electrode AE2, the second emission layer EL2, and the cathode electrode CE; the third light emitting element ED3 is configured with the third anode electrode AE3, the third emission layer EL3, and the cathode electrode CE; and the fourth light emitting element ED4 is configured with the fourth anode electrode AE4, the fourth emission layer EL4, and the cathode electrode CE.

Hereinafter, a cross-sectional structure taken along line X-Y of FIG. 7 will be discussed in more detail with reference to FIGS. 8 and 9.

A portion indicated by line X-Y in FIG. 7 includes a portion of the optical bezel area OBA1 and a portion of the optical area OA1 with respect to the boundary between the optical bezel area OBA1 and the optical area OA1.

The portion indicated by line X-Y in FIG. 7 may include the first light emitting area EA1 and the fourth light emitting area EA4 included in the optical area OA, and the second light emitting area EA2 included in the optical bezel area OBA. The first light emitting area EA1, the fourth light emitting area EA4, and the second light emitting area EA2 may represent light emitting areas EA emitting light of a same color.

Figure 8:
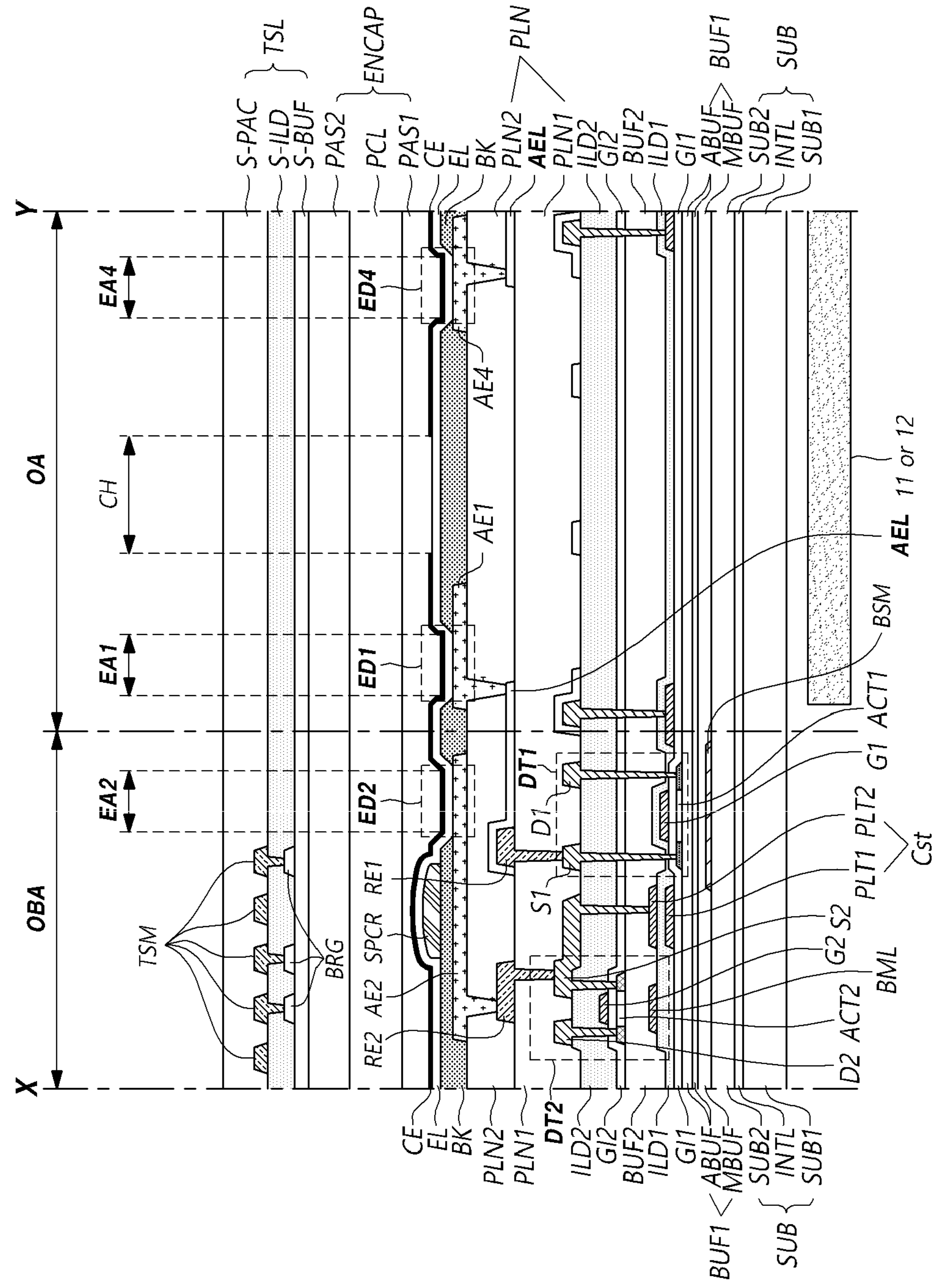
FIGS. 8 and 9 are example cross-sectional views of the display panel according to aspects of the present disclosure, and cross-sectional views of the optical bezel area and the optical area of the display panel.

FIG. 8 illustrates an example cross-sectional view of the display panel 110 according to aspects of the present disclosure, and more specifically, illustrates example cross-sectional views in the optical bezel area OBA and the optical area OA of the display panel 110. It should be noted here that FIG. 8 illustrates cross-sectional views based on the application of a 1:1 circuit connection scheme, as in FIG. 5.

Referring to FIG. 8, in terms of stackup configuration, the display panel 110 may include a transistor forming part, a light emitting element forming part, and an encapsulation part.

The transistor forming part may include a substrate SUB, a first buffer layer BUF1 on the substrate SUB, various types of transistors DT1 and DT2 formed on the first buffer layer BUF, a storage capacitor Cst, and various electrodes and signal lines.

The substrate SUB may include, for example, a first substrate SUB1 and a second substrate SUB2, and may include an intermediate layer INTL interposed between the first substrate SUB1 and the second substrate SUB2. In this example, the intermediate layer INTL may be an inorganic layer and can serve to prevent moisture permeation.

A lower shield metal BSM may be disposed over the substrate SUB. The lower shield metal BSM may be located under a first active layer ACT1 of a first driving transistor DT1.

The first buffer layer BUF1 may include a stack of a single layer or a stack of a multilayer. In an example where the first buffer layer BUF1 includes a stack of a multilayer, the first buffer layer BUF1 may include a multi-buffer layer MBUF and an active buffer layer ABUF.

Various types of transistors (DT1, DT2, and the like), at least one storage capacitor Cst, and various electrodes or signal lines may be disposed on the first buffer layer BUF1.

For example, the transistors DT1 and DT2 formed on the first buffer layer BUF1 may include a same material, and be located in one or more same layers. In another example, as shown in FIG. 8, the first driving transistor DT1 and a second driving transistor DT2 among the transistors (DT1, DT2, and the like) may include different materials and be located in different layers.

Referring to FIG. 8, the first driving transistor DT1 may represent a driving transistor DT for driving the first light emitting element ED1 included in the optical area OA, and the second driving transistor DT2 may represent a driving transistor DT for driving the second light emitting element ED2 included in the optical bezel area OBA.

For example, the first driving transistor DT1 may represent a driving transistor included in the first pixel circuit SPC1 for driving the first light emitting element ED1 included in the optical area OA, and the second driving transistor DT2 may represent a driving transistor included in the second pixel circuit SPC2 for driving the second light emitting element ED2 included in the optical bezel area OBA.

Stackup configurations of the first driving transistor DT1 and the second driving transistor DT2 will be described below.

The first driving transistor DT1 may include the first active layer ACT1, a first gate electrode G1, a first source electrode S1, and a first drain electrode D1.

The second driving transistor DT2 may include a second active layer ACT2, a second gate electrode G2, a second source electrode S2, and a second drain electrode D2.

The second active layer ACT2 of the second driving transistor DT2 may be located in a higher location in the stackup configuration than the first active layer ACT1 of the first driving transistor DT1.

The first buffer layer BUF1 may be disposed under the first active layer ACT1 of the first driving transistor DT1, and the second buffer layer BUF2 may be disposed under the second active layer ACT2 of the second driving transistor DT2.

For example, the first active layer ACT1 of the first driving transistor DT1 may be located on the first buffer layer BUF1, and the second active layer ACT2 of the second driving transistor DT2 may be located on the second buffer layer BUF2. In this case, the second buffer layer BUF2 may be placed in a higher location than the first buffer layer BUF.

The first active layer ACT1 of the first driving transistor DT1 may be disposed on the first buffer layer BUF1, and a first gate insulating layer GI1 may be disposed on the first active layer ACT1 of the first driving transistor DT1. The first gate electrode G1 of the first driving transistor DT1 may be disposed on the first gate insulating layer GI1, and a first interlayer insulating layer ILD1 may be disposed on the first gate electrode G1 of the first driving transistor DT1.

In this implementation, the first active layer ACT1 of the first driving transistor DT1 may include a first channel region overlapping the first gate electrode G1, a first source connection region located on one side of the first channel region, and a first drain connection region located on the other side of the first channel region.

The second buffer layer BUF2 may be disposed on the first interlayer insulating layer ILD1.

The second active layer ACT2 of the second driving transistor DT2 may be disposed on the second buffer layer BUF2, and a second gate insulating layer GI2 may be disposed on the second active layer ACT2. The second gate electrode G2 of the second driving transistor DT2 may be disposed on the second gate insulating layer GI2, and a second interlayer insulating layer ILD2 may be disposed on the second gate electrode G2.

In this implementation, the second active layer ACT2 of the second driving transistor DT2 may include a second channel region overlapping the second gate electrode G2, a second source connection region located on one side of the second channel region, and a second drain connection region located on the other side of the second channel region.

The first source electrode S1 and the first drain electrode D1 of the first driving transistor DT1 may be disposed on the second interlayer insulating layer ILD2. The second source electrode S2 and the second drain electrode D2 of the second driving transistor DT2 may be also disposed on the second interlayer insulating layer ILD2.

The first source electrode S1 and the first drain electrode D1 of the first driving transistor DT1 may be respectively connected to the first source connection region and the first drain connection region of the first active layer ACT1 through through-holes formed in the second interlayer insulating layer ILD2, the second gate insulating layer GI2, the second buffer layer BUF2, the first interlayer insulating layer ILD1, and the first gate insulating layer GI1.

The second source electrode S2 and the second drain electrode D21 of the second driving transistor DT2 may be respectively connected to the second source connection region and the second drain connection region of the second active layer ACT2 through through-holes formed in the second interlayer insulating layer ILD2 and the second gate insulating layer GI2.

It should be understood that FIG. 8 illustrates only the second driving transistor DT2 and a storage capacitor Cst among circuit components included in the second pixel circuit SPC2, and other components such as one or more transistors, and the like are omitted. It should be also understood that FIG. 8 illustrates only the first driving transistor DT1 among circuit components included in the first pixel circuit SPC1, and other components such as one or more transistors, a storage capacitor, and the like are omitted.

Referring to FIG. 8, the storage capacitor Cst included in the second pixel circuit SPC2 may include a first capacitor electrode PLT1 and a second capacitor electrode PLT2.

The first capacitor electrode PLT1 may be electrically connected to the second gate electrode G2 of the second driving transistor DT2, and the second capacitor electrode PLT2 may be electrically connected to the second source electrode S2 of the second driving transistor DT2.

In one or more embodiments, referring to FIG. 8, a lower metal BML may be disposed under the second active layer ACT2 of the second driving transistor DT2. This lower metal BML may overlap all or at least a portion of the second active layer ACT2.

The lower metal BML may be electrically connected to, for example, the second gate electrode G2. In another example, the lower metal BML can serve as a light shield for shielding light traveling from a lower location than the lower metal BML. In this implementation, the lower metal BML may be electrically connected to the second source electrode S2.

Even though the first driving transistor DT1 is a transistor for driving the first light emitting element ED1 disposed in the optical area OA, the first driving transistor DT1 may be disposed in the optical bezel area OBA, not the optical area OA.

The second driving transistor DT2, which is a transistor for driving the second light emitting element ED2 disposed in the optical bezel area OBA, may be disposed in the optical bezel area OBA.

Referring to FIG. 8, the display panel 110 may include at least one planarization layer PLN disposed on the first driving transistor DT1 and the second driving transistor DT2.

Referring to FIG. 8, for example, the at least one planarization layer PLN may include a first planarization layer PLN1. For example, the first planarization layer PLN1 may be disposed on the first source electrode S1 and the first drain electrode D1 of the first driving transistor DT1 and the second source electrode S2 and the second drain electrode D2 of the second driving transistor DT2.

Referring to FIG. 8, a first relay electrode RE1 and a second relay electrode RE2 may be disposed on the first planarization layer PLN1.

The first relay electrode RE1 may represent an electrode for relaying an electrical interconnection between the first source electrode S1 of the first driving transistor DT1 and a first anode electrode AE1 of the first light emitting element ED1. The second relay electrode RE2 may represent an electrode for relaying an electrical interconnection between the second source electrode S2 of the second driving transistor DT2 and a second anode electrode AE2 of the second light emitting element ED2.

The first relay electrode RE1 may be electrically connected to the first source electrode S1 of the first driving transistor DT1 through a hole formed in the first planarization layer PLN1. The second relay electrode RE2 may be electrically connected to the second source electrode S2 of the second driving transistor DT2 through another hole formed in the first planarization layer PLN1.

Referring to FIG. 8, the first relay electrode RE2 and the second relay electrode RE2 may be disposed in the optical bezel area OBA.

Referring to FIG. 8, an anode extension line AEL may be connected to the first relay electrode RE1 and extend from the optical bezel area OBA to the optical area OA.

In one or more embodiments, referring to FIG. 8, the anode extension line AEL may be a metal layer disposed on the first relay electrode RE1 and include a transparent material.

Referring to FIG. 8, the at least one planarization layer PLN disposed on the display panel 110 may further include a second planarization layer PLN2 on the first planarization layer PLN1.

For example, the second planarization layer PLN2 may be disposed such that the second planarization layer PLN2 covers the first relay electrode RE1, the second relay electrode RE2, and the anode extension line AEL located on the first planarization layer PLN1.

Although FIG. 8 illustrates the example where the at least one planarization layer PLN includes the first planarization layer PLN1 and the second planarization layer PLN2, but embodiments of the present disclosure are not limited thereto. For example, the planarization layer PLN may further include at least one planarization layer PLN.

Referring to FIG. 8, the light emitting element forming part may be located on the second planarization layer PNL2.

Referring to FIG. 8, the light emitting element forming part may include the first light emitting element ED1, the second light emitting element ED2, and the fourth light emitting element ED4, which are disposed on the second planarization layer PNL2.

Referring to FIG. 8, the first light emitting element ED1 and the fourth light emitting element ED4 may be disposed in the optical area OA, and the second light emitting element ED2 may be disposed in the optical bezel area OBA.

In the example of FIG. 8, the first light emitting element ED1, the second light emitting element ED2, and the fourth light emitting element ED4 may be light emitting elements emitting light of a same color. Respective emission layers EL of the first light emitting element ED1, the second light emitting element ED2, and the fourth light emitting element ED4 may be formed independently of one another. However, in discussions that follow, for convenience of explanation, it is assumed that respective emission layers EL of the first light emitting element ED1, the second light emitting element ED2, and the fourth light emitting element ED4 are commonly formed as one common emission layer.

Referring to FIG. 8, the first light emitting element ED1 may be configured (e.g., made up) in an area where the first anode electrode AE1, the emission layer EL, and the cathode electrode CE overlap one another. The second light emitting element ED2 may be configured (e.g., made up) in an area where the second anode electrode AE2, the emission layer EL, and the cathode electrode CE overlap one another. The fourth light emitting element ED4 may be configured (e.g., made up) in an area where the fourth anode electrode AE4, the emission layer EL, and the cathode electrode CE overlap one another.

Referring to FIG. 8, the first anode electrode AE1, the second anode electrode AE2, and the fourth anode electrode AE4 may be disposed on the second planarization layer PLN2.

The second anode electrode AE2 may be connected to the second relay electrode RE2 through a hole formed in the second planarization layer PLN2.

The first anode electrode AE1 may be connected to an anode extension line AEL extending from the optical bezel area OBA to the optical area OA through another hole formed in the second planarization layer PLN2.

The fourth anode electrode AE4 may be connected to another anode extension line AEL extending from the optical bezel area OBA to the optical area OA through further another hole formed in the second planarization layer PLN2.

Referring to FIG. 8, a bank BK may be disposed on the first anode electrode AE1, the second anode electrode AE2, and the fourth anode electrode AE4.

The bank BK may include a plurality of bank holes, and respective portions of the first anode electrode AE1, the second anode electrode AE2, and the fourth anode electrode AE4 may be exposed through respective bank holes. That is, the plurality of bank holes formed in the bank BK may respectively overlap the respective portions of the first anode electrode AE1, the second anode electrode AE2, and the fourth anode electrode AE4.

Referring to FIG. 8, the emission layer EL may be disposed on the bank BK. The emission layer EL may contact the respective portions of the first anode electrode AE1, the second anode electrode AE2, and the fourth anode electrode AE4 through the plurality of bank holes.

Referring to FIG. 8, at least one spacer SPCR may be disposed between the emission layer EL and the bank BK.

Referring to FIG. 8, the cathode electrode CE may be disposed on the emission layer EL. The cathode electrode CE may include a plurality of cathode holes CH. The plurality of cathode holes CH formed in the cathode electrode CE may be disposed in the optical area OA.

One cathode hole CH illustrated in FIG. 8 may represent a cathode hole located between the first light emitting area EA1 and the fourth light emitting area EA4.

Referring to FIG. 8, the encapsulation part may be located on the cathode electrode CE. The encapsulation part may include an encapsulation layer ENCAP disposed on the cathode electrode CE.

Referring to FIG. 8, the encapsulation layer ENCAP can serve to prevent penetration of moisture or oxygen into the light emitting elements (ED1, ED2, and ED4) disposed under the encapsulation layer ENCAP. In particular, the encapsulation layer ENCAP may include an organic material or film and can serve to prevent penetration of moisture or oxygen into the emission layer EL. In one or more embodiments, the encapsulation layer ENCAP may include a stack of a single layer or a stack of a multilayer.

Referring to FIG. 8, the encapsulation layer ENCAP may include a first encapsulation layer PAS1, a second encapsulation layer PCL, and a third encapsulation layer PAS2.

For example, the first encapsulation layer PAS1 and the third encapsulation layer PAS2 may be inorganic material layers, and the second encapsulation layer PCL may be an organic material layer. Since the second encapsulation layer PCL is implemented using an organic material, the second encapsulation layer PCL can serve as a planarization layer.

In one or more embodiments, a touch sensor may be integrated into the display panel 110 according to aspects of the present disclosure. In these embodiments, the display panel 110 according to aspects of the present disclosure may include a touch sensor layer TSL disposed on the encapsulation layer ENCAP.

Referring to FIG. 8, the touch sensor layer TSL may include one or more touch sensor metals TSM and one or more bridge metals BRG, and may further include one or more insulating layers such as a sensor buffer layer S-BUF, a sensor interlayer insulating layer S-ILD, a sensor protective layer S-PAC, and the like. For example, the sensor interlayer insulating layer S-ILD may include one or more insulating layers.

The sensor buffer layer S-BUF may be disposed on the encapsulation layer ENCAP. The one or more bridge metals BRG may be disposed on the sensor buffer layer S-BUF, and the sensor interlayer insulating layer S-ILD may be disposed on the one or more bridge metals BRG.

The one or more touch sensor metals TSM may be disposed on the sensor interlayer insulating layer S-ILD. One or more of the touch sensor metals TSM may be connected to one or more respective bridge metals BRG among the bridge metals BRG through one or more respective holes formed in the sensor interlayer insulating layer S-ILD.

Referring to FIG. 8, the one or more touch sensor metals TSM and the one or more bridge metals BRG may be disposed in the optical bezel area OBA. The one or more touch sensor metals TSM and the one or more bridge metals BRG may be disposed not to overlap the second light emitting area EA2 of the optical bezel area OBA.

A plurality of touch sensor metals TSM may be configured as one touch electrode (or one touch electrode line). For example, the plurality of touch sensor metals TSM may be arranged in a mesh pattern and therefore electrically connected to one another. One or more of the touch sensor metals TSM and the remaining one or more touch sensor metals TSM may be electrically connected through one or more respective bridge metals BRG, and thereby, be configured as one touch electrode (or one touch electrode line).

The sensor protective layer S-PAC may be disposed such that it covers the one or more touch sensor metals TSM and the one or more bridge metals BRG.

In an embodiment where a touch sensor is integrated into the display panel 110, at least one of the touch sensor metals TSM, or at least a portion of at least one of the touch sensor metals TSM, located on the encapsulation layer ENCAP may extend along an inclined surface formed in an edge of the encapsulation layer ENCAP, and be electrically connected to a pad located in an edge of the display panel 110 that is further away from the inclined surface of the edge of the encapsulation layer ENCAP. The pad may be disposed in the non-display area NDA and may be a metal pattern to which the touch driving circuit 260 is electrically connected.

The display panel 110 according to aspects of the present disclosure may include the bank BK disposed on the first anode electrode AE1 and having a bank hole exposing a portion of the first anode electrode AE1, and the emission layer EL disposed on the bank BK and contacting the portion of the first anode electrode AE1 exposed through the bank hole.

The bank hole formed in the bank BK may not overlap a plurality of cathode holes CH. For example, the bank BK may not be depressed or perforated (e.g., remained in a flat state) at places where the plurality of cathode holes CH are present. Thus, at places where the plurality of cathode holes CH are present, the second planarization layer PLN and the first planarization layer PLN1 located under the bank BK may not be depressed or perforated as well (e.g., remained in a flat state).

The flat state of the respective portion of the upper surface of the bank BK located under any one of the plurality of cathode holes CH may mean that one or more insulating layers or one or more metal patterns (e.g., one or more electrode, one or more lines, and/or the like), or the emission layers EL located under any one of the plurality of cathode holes CH have not been damaged by the process of forming the plurality of cathode holes CH in the cathode electrode CE.

A brief description for the process of forming cathode holes CH in the cathode electrode CE is as follows. A specific mask pattern can be deposited at respective locations where the cathode holes CH are to be formed, and then, a cathode electrode material can be deposited thereon. Accordingly, the cathode electrode material can be deposited only in an area where the specific mask pattern is not located, and thereby, the cathode electrode CE including the cathode holes CH can be formed. The specific mask pattern may include, for example, an organic material. The cathode electrode material may include a magnesium-silver (Mg—Ag) alloy.

In one or more embodiments, after the cathode electrode CE having the cathode holes CH is formed, the display panel 110 may be in a situation in which the specific mask pattern is completely removed, partially removed (where a portion of the specific mask pattern remains), or not removed (where all of the specific mask pattern remains without being removed).

In one or more embodiments, the display panel 110 according to aspects of the present disclosure may include the first driving transistor DT1 disposed in the optical bezel area OBA to drive the first light emitting element ED1 disposed in the optical area OA, and the second driving transistor DT2 disposed in the optical bezel area OBA to drive the second light emitting element ED2 disposed in the optical bezel area OBA.

In one or more embodiments, the display panel 110 according to aspects of the present disclosure may further include the first planarization layer PLN1 disposed on the first driving transistor DT1 and the second driving transistor DT2, the first relay electrode RE1 disposed on the first planarization layer PLN1 and electrically connected to the first source electrode S1 of the first driving transistor DT1 through a hole formed in the first planarization layer PLN1, the second relay electrode RE2 disposed on the first planarization layer PLN1 and electrically connected to the second source electrode S2 of the second driving transistor DT2 through another hole formed in the first planarization layer PLN1, and the second planarization layer PLN2 disposed on the first relay electrode RE1 and the second relay electrode RE2.

In one or more embodiments, the display panel 110 according to aspects of the present disclosure may further include an anode extension line (e.g., the anode extension line AEL) interconnecting the first relay electrode RE1 and the first anode electrode AE1, and located on the first planarization layer PLN1.

The second anode electrode AE2 may be electrically connected to the second relay electrode RE2 through a hole formed in the second planarization layer PLN2, and the first anode electrode AE1 may be electrically connected to the anode extension line AEL through another hole formed in the second planarization layer PLN2.

All or at least a portion of the anode extension line AEL may be disposed in the optical area OA, and the anode extension line AEL may include a transparent material, or be or include a transparent line.

The first pixel circuit SPC1 may include the first driving transistor DT1 for driving the first light emitting element ED1, and the second pixel circuit SPC2 may include the second driving transistor DT2 for driving the second light emitting element ED2.

The first active layer ACT1 of the first driving transistor DT1 may be located in a different layer from the second active layer ACT2 of the second driving transistor DT2.

In one or more embodiments, the display panel 110 according to aspects of the present disclosure may further include the substrate SUB, the first buffer layer BUF1 disposed between the substrate SUB and the first driving transistor DT1, and the second buffer layer BUF2 disposed between the first driving transistor DT1 and the second driving transistors DT2.

The first active layer ACT1 of the first driving transistor DT1 may include a different semiconductor material from the second active layer ACT2 of the second driving transistor DT2.

For example, the second active layer ACT2 of the second driving transistor DT2 may include an oxide semiconductor material. For example, such an oxide semiconductor material may include indium gallium zinc oxide (IGZO), indium gallium zinc tin oxide (IGZTO), zinc oxide (ZnO), cadmium oxide (CdO), indium oxide (InO), zinc tin oxide (ZTO), zinc indium tin oxide (ZITO), and/or the like.

For example, the first active layer ACT1 of the first driving transistor DT1 may include a different semiconductor material from the second active layer ACT2 of the second driving transistor DT2.

For example, the first active layer ACT1 of the first driving transistor DT1 may include a silicon-based semiconductor material. For example, the silicon-based semiconductor material may include low-temperature polycrystalline silicon (LTPS) or the like.

In one or more embodiments, the display panel 110 according to aspects of the present disclosure may further include the encapsulation layer ENCAP located on the first light emitting element ED1, the second light emitting element ED2, and the third light emitting element ED3, and touch sensor metals TSM located on the encapsulation layer ENCAP.

The touch sensor metals TSM may be disposed in the normal area NA and the optical bezel area OBA. For example, the touch sensor metals TSM may not be disposed in the optical area OA. In another example, the touch sensor metals TSM may be disposed in the optical area OA, the normal area NA and the optical bezel area OBA such that the optical area OA has a lower touch sensor metal density than each of the normal area NA and the optical bezel area OBA.

Referring to FIG. 8, the optical area OA may overlap an optical electronic device. The optical bezel area OBA may not overlap an optical electronic device. One or more embodiments, a portion of the optical bezel area OBA may overlap an optical electronic device.

The optical electronic device overlapping the optical area OA may be the first optical electronic device 11 and/or the second optical electronic device 12 in FIGS. 1A, 1B and 1C discussed above. For example, the optical electronic device may include a camera, an infrared sensor, an ultraviolet sensor, and/or the like. For example, the optical electronic device may be a device capable of receiving visible light and performing a selected operation, or a device capable of receiving light (e.g., infrared light, and/or ultraviolet light) different from visible light and performing a selected operation.

Referring to FIG. 8, a cross-sectional structure of the normal area NA may be substantially or nearly the same as that of the optical bezel area OBA. It should be noted here that the first pixel circuit SPC1 disposed in the optical bezel area OBA to drive the first light emitting element ED1 disposed in the optical area OA may not be disposed in the normal area NA.

Figure 9:
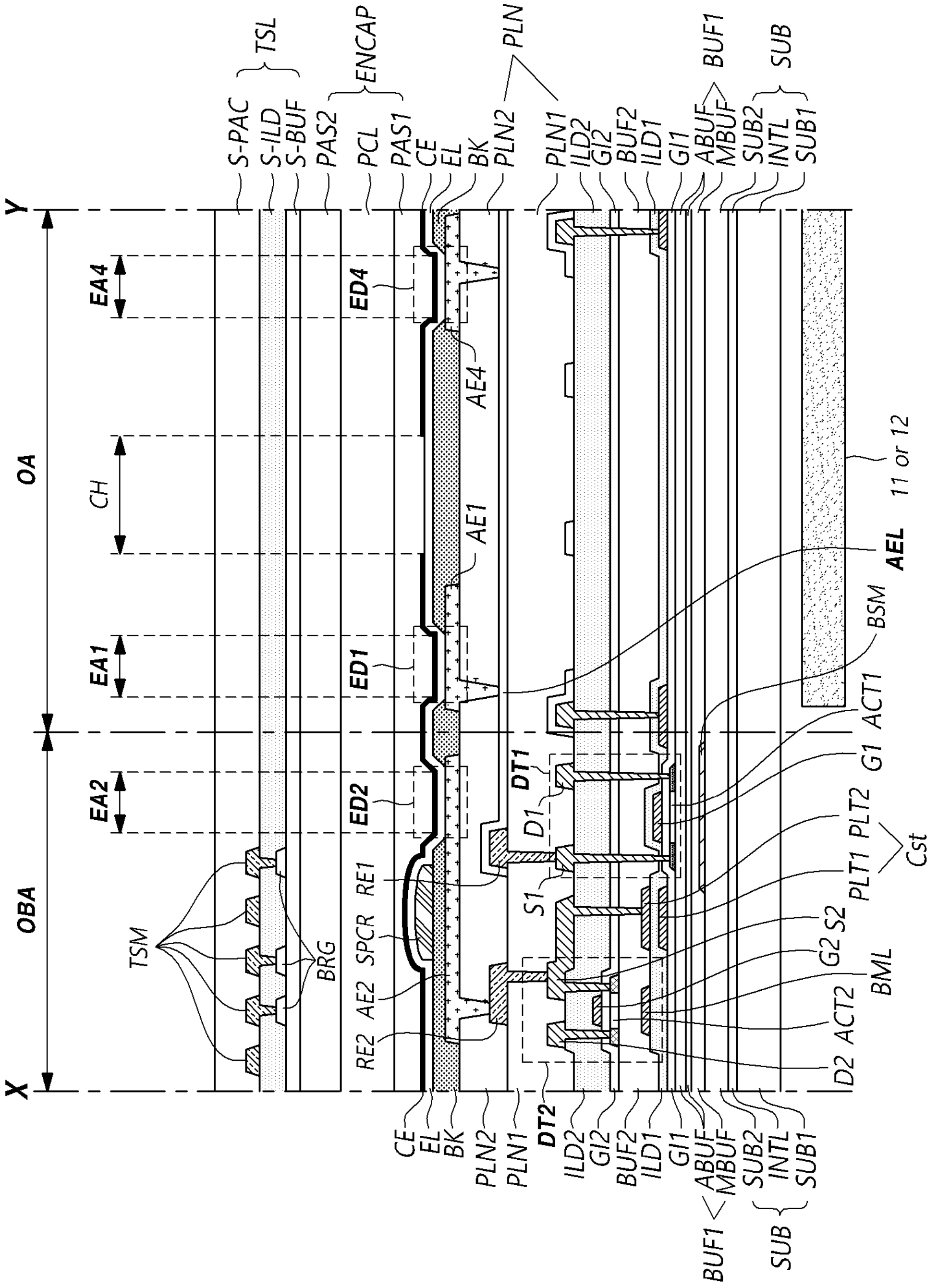

FIG. 9 illustrates an example cross-sectional view of the display panel 110 according to aspects of the present disclosure, and more specifically, illustrates example cross-sectional views in the optical bezel area OBA and the optical area OA of the display panel 110. It should be noted here that FIG. 9 illustrates an example cross-sectional view based on the application of a 1:2 circuit connection scheme, as in FIG. 6.

The cross-sectional view of FIG. 9 is basically the same as the cross-sectional view of FIG. 8. It should be noted here that one difference between the cross-sectional views of FIGS. 8 and 9 is that while FIG. 8 employs the 1:1 circuit connection scheme as in FIG. 5, FIG. 9 employs the 1:2 circuit connection scheme as in FIG. 6. Taking account of the similarity between them, hereinafter, descriptions on the cross-sectional structure of FIG. 9 will be provided by focusing on features different from the cross-sectional structure of FIG. 8.

Referring to FIG. 9, the first light emitting element ED1 and the fourth light emitting element ED4 disposed in the optical area OA may be driven the first driving transistor DT1 disposed in the optical bezel area OBA together or substantially concurrently.

Accordingly, as illustrated in FIG. 9, an anode extension line AEL (e.g., the anode extension line AEL of FIG. 8) may be further electrically connected to the fourth anode electrode AE4 different from the first anode electrode AE1, as well as the first anode electrode AE1. Thus, the anode extension line AEL may be electrically connected to both the first anode electrode AE1 of the first light emitting element ED1 and the fourth anode electrode AE4 of the fourth light emitting element ED4.

Referring to FIG. 9, the anode extension line AEL may overlap a cathode hole CH located between the first light emitting element ED1 and the fourth light emitting element ED4 among a plurality of cathode holes CH.

Referring to FIG. 9, the first light emitting area EA1 configured by the first light emitting element ED1 and the fourth light emitting area EA4 configured by the fourth light emitting element ED4 may be light emitting areas emitting light of a same color.

For example, in the optical area OA, an area except for a plurality of cathode holes CH, which are transmissive areas TA, may be an area through which light cannot be transmitted. In another example, in the optical area OA, the area except for the plurality of cathode holes CH, which are transmissive areas TA, may be an area through which light can be transmitted with a low transmittance (or a low transmissivity).

Thus, in the optical area OA, the transmittance (or transmissivity) of the area except for the plurality of cathode holes CH may be lower than that of the plurality of cathode holes CH. In one or more embodiments, the transmittance (or transmissivity) of the area except for the plurality of cathode holes CH in the optical area OA may be higher than that of the normal area NA.

Figure 10:
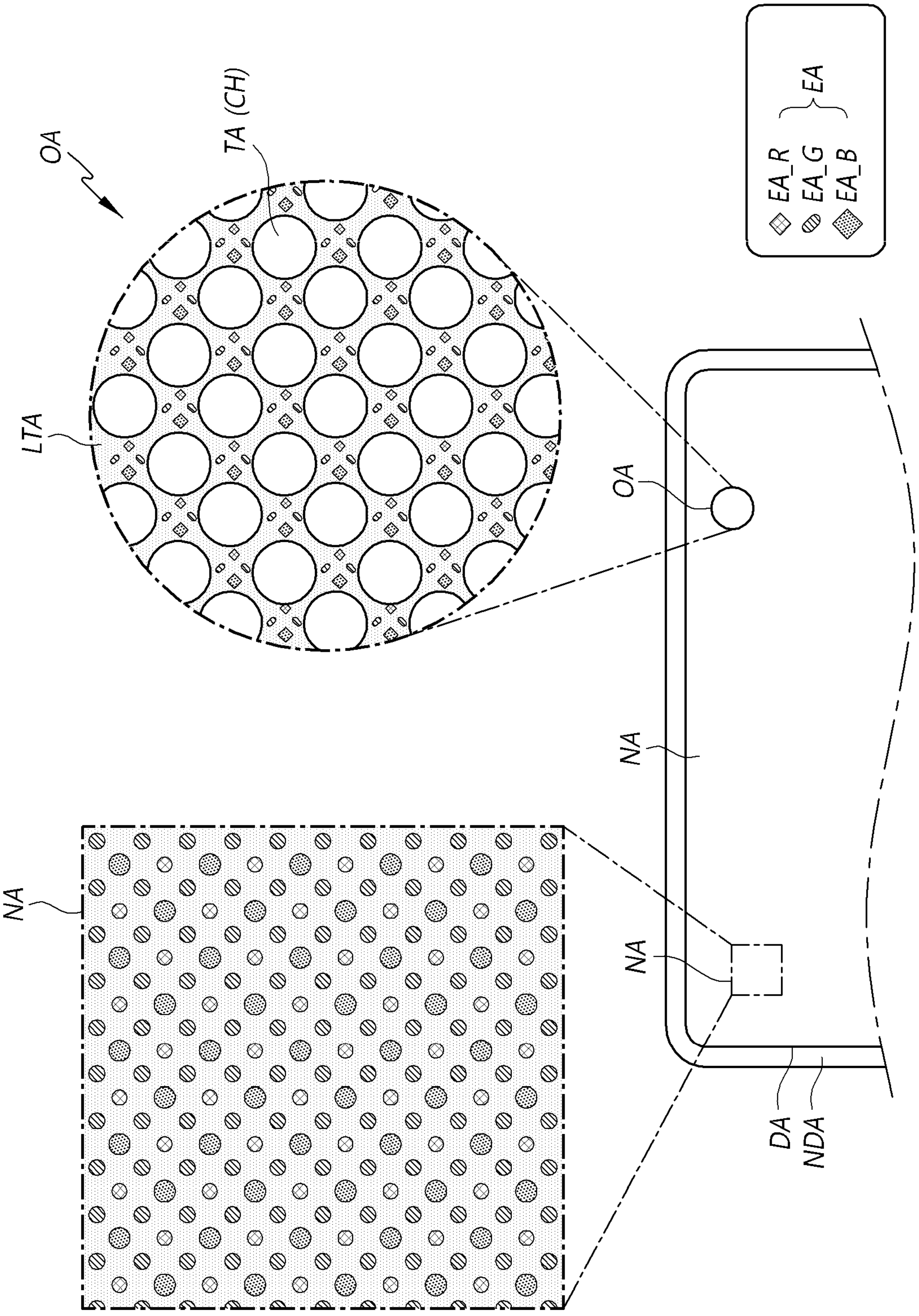
FIG. 10 illustrates an example second type of optical area and an example normal area around the second type of optical area included in the display panel according to aspects of the present disclosure.

FIG. 10 schematically illustrates an example second type of optical area OA and an example normal area NA around the second type of optical area OA in the display panel 110 according to aspects of the present disclosure.

Referring to FIG. 10, the display area DA may include an optical area OA. The optical area OA may have the structure of a second type. In the example where the optical area OA is implemented in the second type, the optical area OA may include a plurality of transmissive areas TA and a low-transmissive area LTA. The second type may be referred to as a hole type.

Referring to FIG. 10, in the optical area OA, the low-transmissive area LTA except for the plurality of transmissive areas TA may include a plurality of light emitting areas EA. In the optical area OA, a plurality of light emitting elements ED for the plurality of light emitting areas EA may be disposed in the low-transmissive area LTA except for the plurality of transmissive areas TA.

Further, a plurality of pixel circuits SPC for driving the plurality of light emitting elements ED may be disposed in the low-transmittable area LTA. That is, the plurality of pixel circuits SPC may be disposed in the optical area OA. This is different from the first type (e.g., the anode extension type) of the optical area OA in the examples of FIGS. 4 to 9 in which that the plurality of pixel circuits SPC are not disposed in the optical area OA.

In one embodiment, the low-transmissive area LTA in the optical area OA may be an area through which light cannot be transmitted. In another embodiment, the low-transmissive area LTA in the optical area OA may be an area through which light can be transmitted with a low transmittance (or a low transmissivity).

In the optical area OA, the transmittance (or transmissivity) of the low-transmissive area LTA may be lower than that of the transmissive area TA. In one or more embodiments, the transmittance (or transmissivity) of the low-transmissive area LTA in the optical area OA may be higher than that of the normal area NA.

Referring to FIG. 10, the arrangement of light emitting areas EA in the optical area OA may be the same as the arrangement of light emitting areas EA in the normal area NA.

One or more embodiments, referring to FIG. 10, a respective area of each of a plurality of light emitting areas EA included in the optical area OA may be the same or substantially or nearly the same as, or be different within a selected range from, a respective area of each of a plurality of light emitting areas EA included in the normal area NA.

Further, the area of each of the plurality of light emitting areas EA included in the optical area OA may be the same or substantially or nearly the same as, or be different from each other within a selected range.

A cathode electrode (e.g., the cathode electrode CE in FIG. 3) may be commonly disposed in the normal area NA and the optical area OA, and may include a plurality of cathode holes CH in the optical area OA. The plurality of cathode holes CH of the cathode electrode CE may respectively correspond to the transmissive areas TA of the optical area OA.

Since the optical area OA includes the plurality of transmissive areas TA, the optical area OA may have higher transmittance than the normal area NA.

All or at least a portion of the optical area OA may overlap an optical electronic device.

The optical electronic device overlapping the optical area OA may be the first optical electronic device 11 and/or the second optical electronic device 12 in FIGS. 1A, 1B and 1C discussed above. For example, the optical electronic device may include a camera, an infrared sensor, an ultraviolet sensor, and/or the like. For example, the optical electronic device may be a device capable of receiving visible light and performing a selected operation, or a device capable of receiving light (e.g., infrared light, and/or ultraviolet light) different from visible light and performing a selected operation.

Figure 11:
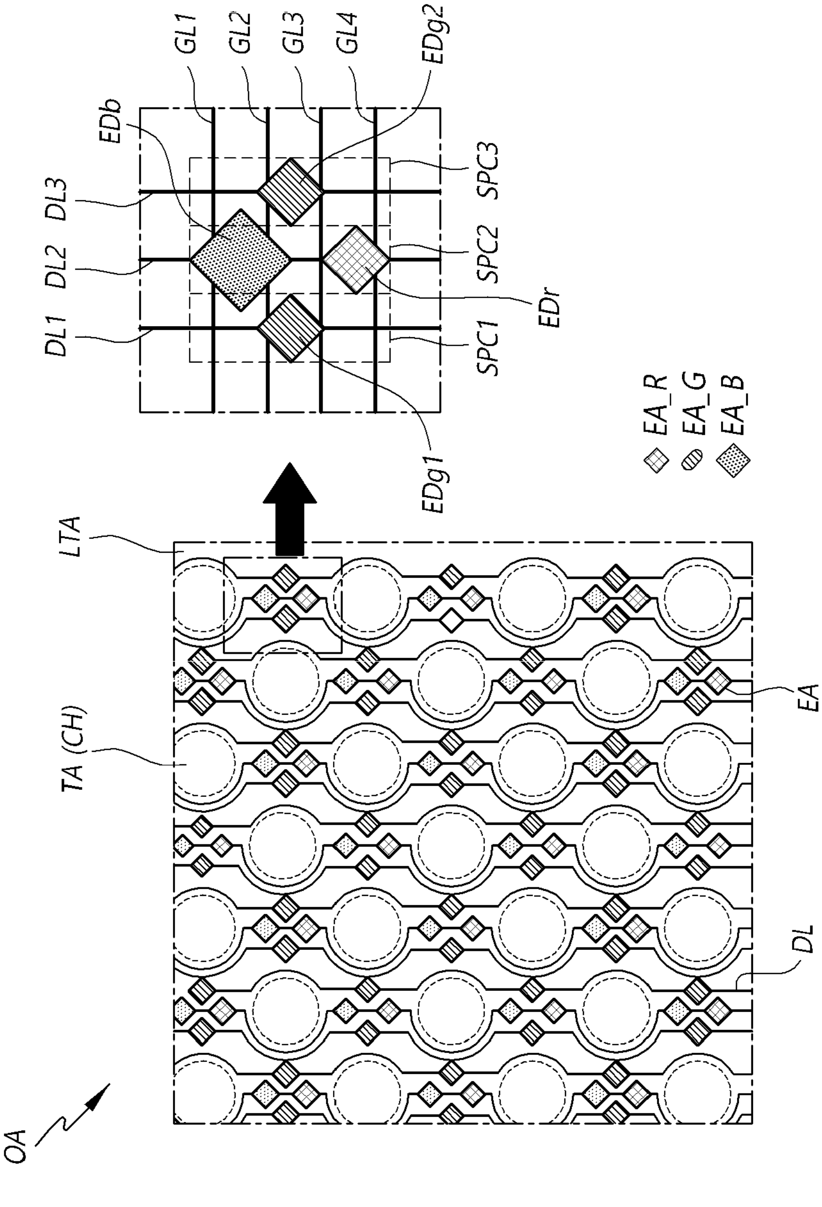
FIG. 11 is an example plan view of the second type of optical area in the display panel according to aspects of the present disclosure.

FIG. 11 is an example plan view of the second type of optical area OA (e.g., as in the configuration of the FIG. 10) in the display panel 110 according to aspects of the present disclosure.

Referring to FIG. 11, in an example where the optical area OA is implemented in the second type, the optical area OA may include one or more transmissive areas TA and a low-transmissive area LTA except for the one or more transmissive areas.

The low-transmissive area LTA may include a plurality of light emitting areas EA.

A respective light emitting element ED may be disposed in each of the plurality of light emitting areas EA.

A plurality of pixel circuits SPC for driving the plurality of light emitting elements ED may be disposed in the low-transmissive area LTA.

In the second type of optical area OA, the light emitting elements ED and the pixel circuits SPC may partially overlap one another.

In the case of the second type of optical area OA, data lines (DL1, DL2 and DL3) and gate lines (GL1, GL2, GL3, and GL4) may run across the optical area OA.

In the optical area OA, the data lines (DL1, DL2 and DL3) may be arranged in a row direction (or a column direction) while avoiding one or more transmissive areas TA, which correspond to one or more respective cathode holes CH.

In the optical area OA, the gate lines (GL1, GL2, GL3, and GL4) may be arranged in the column direction (or the row direction) while avoiding one or more transmissive areas TA, which correspond to one or more respective cathode holes CH.

The data lines (DL1, DL2 and DL3) and the gate lines (GL1, GL2, GL3, and GL4) may be connected to pixel circuits (SPC1, SPC2, and SPC3) disposed in the optical area OA.

For example, four light emitting elements (EDr, EDg1, EDg2, and EDb) may be disposed in a portion of the low-transmissive area LTA between four adjacent transmissive areas TA. The four light emitting elements (EDr, EDg1, EDg2, and EDb) may include one red light emitting element EDr, two green light emitting elements EDg1 and EDg2, and one blue light emitting element EDb.

For example, a pixel circuit SPC1 for driving the one red light emitting element EDR may be connected to a first data line DL1 and a first gate line GL1. A pixel circuit SPC2 for driving the two green light emitting elements EDg1 and EDg2 may be connected to a second data line DL2, a second gate line GL2, and a third gate line GL3. A pixel circuit SPC3 for driving the one blue light emitting element EDb may be connected to a third data line DL3 and a fourth gate line GL4.

Figure 12:
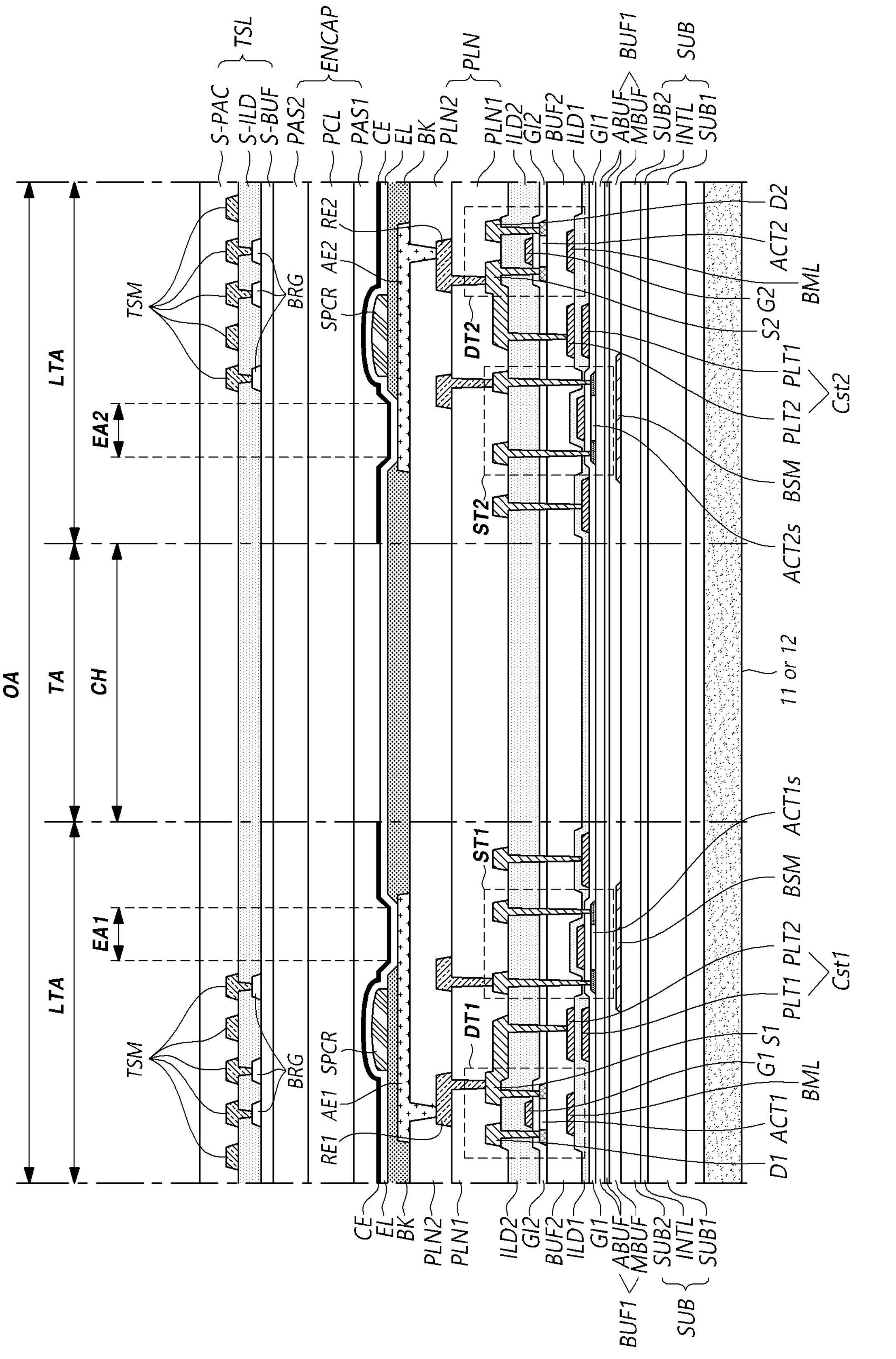
FIG. 12 is an example cross-sectional view of the second type of optical area in the display panel according to aspects of the present disclosure.

FIG. 12 is an example cross-sectional view of the second type of optical area OA (e.g., as in the configuration of FIGS. 10 and 11) in the display panel 110 according to aspects of the present disclosure.

Metal layers and insulating layers in the cross-sectional structure of FIG. 12 may be the same, or substantially or nearly the same, as the metal layers and insulating layers in the cross-sectional structures of FIGS. 8 and 9. Taking account of the similarity between them, discussions on the cross-sectional structure of FIG. 12 will be provided by focusing on features different from those of the cross-sectional structures of FIGS. 8 and 9.

Referring to FIG. 12, an optical electronic device may be disposed such that it overlaps all or at least a portion of the optical area OA. The optical electronic device may be the first optical electronic device 11 and/or the second optical electronic device 12 in FIGS. 1A, 1B and 1C discussed above.

Referring to FIG. 12, a first light emitting element ED1 and a second light emitting element ED2 may be disposed in the optical area OA. A first light emitting area EA1 configured by the first light emitting element ED1 and a second light emitting area EA2 configured by the second light emitting element ED2 may be light emitting areas emitting light of a same color.

Referring to FIG. 12, an area where the first light emitting element ED1 and the second light emitting element ED2 are disposed may be a low-transmissive area LTA, and a transmissive area TA may be located between the first light emitting element ED1 and the second light emitting element ED2. That is, the transmissive area TA may be located between the first light emitting area EA1 configured by the first light emitting element ED1 and the second light emitting area EA2 configured by the second light emitting element ED2.

A pixel circuit SPC can be configured to drive the first light emitting element ED1, and may be disposed to overlap all or at least a portion of the first light emitting element ED1 in the optical area OA.

Referring to FIG. 12, the pixel circuit SPC for driving the first light emitting element ED1 may include a first driving transistor DT1, a first scan transistor ST1, and a first storage capacitor Cst1.

A pixel circuit SPC can be configured to drive the second light emitting element ED2, and may be disposed to overlap all or at least a portion of the second light emitting element ED2 in the optical area OA.

Referring to FIG. 12, the pixel circuit SPC for driving the second light emitting element ED2 may include a second driving transistor DT2, a second scan transistor ST2, and a second storage capacitor Cst2.

Referring to FIG. 12, the first driving transistor DT1 may include a first active layer ACT1, a first gate electrode G1, a first source electrode S1, and a first drain electrode D1.

The first light emitting element ED1 may be configured (e.g., made up) in an area where a first anode electrode AE1, an emission layer (e.g., the emission layer EL discussed above), and a cathode electrode (e.g., the cathode electrode CE discussed above) overlap one another.

The first source electrode S1 of the first driving transistor DT1 may be connected to the first anode electrode AE1 through a first relay electrode RE1.

The first storage capacitor Cst1 may include a first capacitor electrode PLT1 and a second capacitor electrode PLT2.

The first source electrode S1 of the first driving transistor DT1 may be connected to the second capacitor electrode PLT2 of the first storage capacitor Cst1.

The first gate electrode G1 of the first driving transistor DT1 may be connected to the first capacitor electrode PLT1 of the first storage capacitor Cst1.

The active layer ACT1s of the first scan transistor ST1 may be located on the first buffer layer BUF1 and be located in a lower location than the first active layer ACT1 of the first driving transistor DT1.

A semiconductor material included in the active layer ACT1s of the first scan transistor ST1 may be different from a semiconductor material included in the first active layer ACT1 of the first driving transistor DT1. For example, the semiconductor material included in the first active layer ACT1 of the first driving transistor DT1 may be an oxide semiconductor material, and the semiconductor material included in the active layer ACT1s of the first scan transistor ST1 may be a silicon-based semiconductor material (e.g., a low-temperature polycrystalline silicon (LTPS)).

Referring to FIG. 12, the second driving transistor DT2 may include a second active layer ACT2, a second gate electrode G2, a second source electrode S2, and a second drain electrode D2.

The second light emitting element ED2 may be configured (e.g., made up) in an area where a second anode electrode AE2, the emission layer EL, and the cathode electrode CE overlap one another.

The second source electrode S2 of the second driving transistor DT2 may be connected to the second anode electrode AE2 through a second relay electrode RE2.

The second storage capacitor Cst2 may include a first capacitor electrode PLT1 and a second capacitor electrode PLT2.

The second source electrode S2 of the second driving transistor DT1 may be connected to the second capacitor electrode PLT2 of the second storage capacitor Cst2.

The second gate electrode G2 of the second driving transistor DT2 may be connected to the first capacitor electrode PLT1 of the second storage capacitor Cst2.

An active layer ACT2s of the second scan transistor ST2 may be located on the first buffer layer BUF1 and be located in a lower location than the second active layer ACT2 of the second driving transistor DT2.

A semiconductor material included in the active layer ACT2s of the second scan transistor ST2 may be different from a semiconductor material included in the second active layer ACT2 of the second driving transistor DT2. For example, the semiconductor material included in the second active layer ACT2 of the second driving transistor DT2 may be an oxide semiconductor material, and the semiconductor material included in the active layer ACT2s of the second scan transistor ST2 may be a silicon-based semiconductor material (e.g., a low-temperature polycrystalline silicon (LTPS)).

The cathode electrode CE may not include a cathode hole CH or may include a plurality of cathode holes CH.

In an example where the cathode electrode CE includes a plurality of cathode holes CH, the cathode holes CH formed in the cathode electrode CE may be located to correspond to respective transmissive areas TA of the optical area OA.

A bank hole formed in the bank BK may not overlap any one of the cathode holes CH.

An upper surface of the bank BK located in a lower location than the cathode holes CH may be flat without being depressed or etched. For example, the bank BK may not be depressed or perforated (e.g., remained in the flat state) at places where cathode holes CH are present. Thus, at places where cathode holes CH are present, the second planarization layer PLN2 and the first planarization layer PLN1 located in a lower location than the bank BK may not be depressed or perforated as well (e.g., remained in a flat state).

The flat state of the respective portions of the upper surface of the bank BK located under the cathode holes CH may mean that one or more insulating layers or one or more metal patterns (e.g., one or more electrode, one or more lines, and/or the like), or the emission layer EL located under the cathode electrode CE have not been damaged by the process of forming the cathode holes CH in the cathode electrode CE.

A brief description for the process of forming cathode holes CH in the cathode electrode CE is as follows. A specific mask pattern can be deposited at respective locations where the cathode holes CH are to be formed, and then, a cathode electrode material can be deposited thereon. Accordingly, the cathode electrode material can be deposited only in an area where the specific mask pattern is not located, and thereby, the cathode electrode CE including the cathode holes CH can be formed.

The specific mask pattern may include, for example, an organic material. The cathode electrode material may include a magnesium-silver (Mg—Ag) alloy.

In one or more embodiments, after the cathode electrode CE having the cathode holes CH is formed, the display panel 110 may be in a situation in which the specific mask pattern is completely removed, partially removed (where a portion of the specific mask pattern remains), or not removed (where all of the specific mask pattern remains without being removed).

As discussed above, while transistors (e.g., DT and/or ST) and a storage capacitor Cst may not be disposed in the optical area OA configured in the first type (e.g., the anode extension type) as in the examples of FIGS. 4 to 9, transistors (e.g., DT and/or ST) and one or more storage capacitors Cst may be disposed in the optical area OA configured in the second type (e.g., the hole type) as in the examples of FIGS. 10 to 12.

In the first type (e.g., the anode extension type) of FIGS. 4 to 9, two or more light emitting elements ED may be disposed in the optical area OA, and two or more light emitting elements ED may be also disposed in the optical bezel area OBA, which is an area located outside of the optical area OA. Further, in the first type (e.g., the anode extension type), transistors (e.g., DT and/or ST) and a storage capacitor Cst may not be disposed in the optical area OA, and transistors (e.g., DT and/or ST) and one or more storage capacitors Cst may be disposed in the optical bezel area OBA located outside of the optical area OA.

Referring to FIGS. 10 to 12, in the second type (e.g., the hole type), two or more light emitting elements ED may be disposed in the optical area OA. That is, in the optical area OA of the second type (e.g., the hole type), two or more light emitting elements ED may be disposed in the low-transmissive area LTA of the optical area OA. Further, in the second type (e.g., the hole type), transistors (e.g., DT and/or ST) and one or more storage capacitors Cst may be disposed in the optical area OA. That is, in the optical area OA of the second type (e.g., the hole type), transistors (e.g., DT and/or ST) and one or more storage capacitors Cst may be disposed in the low-transmissive area LTA of the optical area OA.

Figure 13:
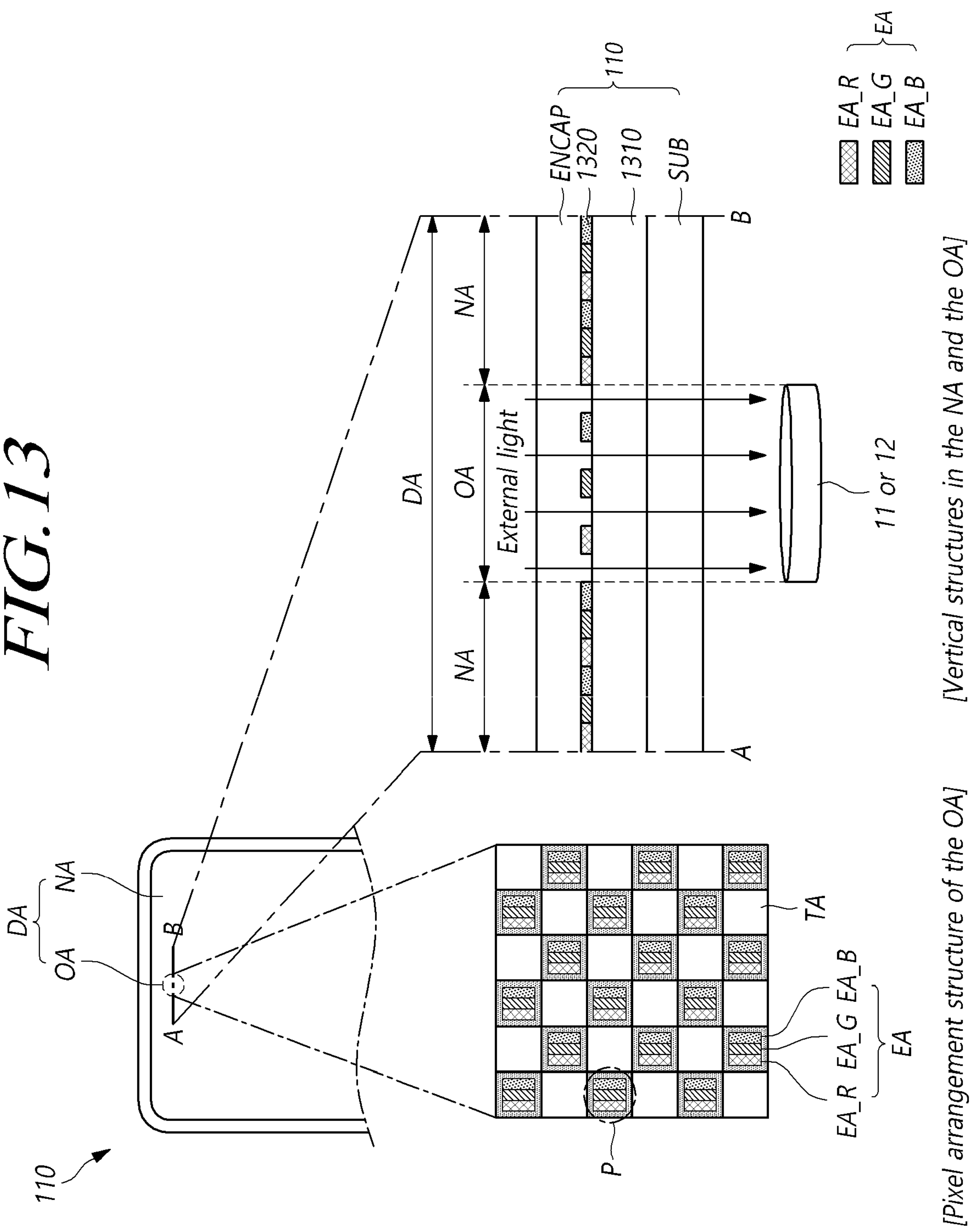
FIG. 13 illustrates an example structure of the display device according to aspects of the present disclosure.
Figure 14:
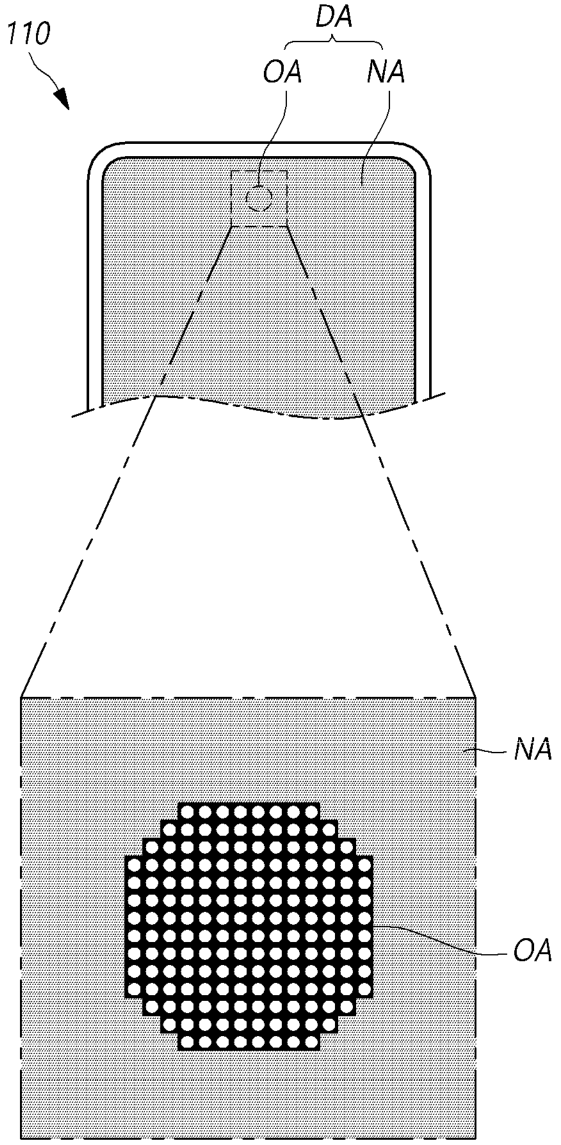
FIG. 14 illustrates example display characteristics of the optical area of the display device according to aspects of the present disclosure.

FIG. 13 illustrates example structural characteristics of the display device 100 according to aspects of the present disclosure. FIG. 14 illustrates example display characteristics of the optical area OA of the display device 100 according to aspects of the present disclosure.

Referring to FIG. 13, in one or more embodiments, in the display device 100 according to aspects of the present disclosure, one or more optical electronic devices (11 and/or 12), which is configured to receive external light (e.g., visible light, infrared light, ultraviolet light, and/or the like) for performing a predefined operation, may be located under, or in a lower portion of, the display panel 110, and be located to overlap the optical area OA, which is a partial area of the display area DA of the display panel 110. In these embodiments, by receiving external light transmitting through the optical area OA, the one or more optical electronic devices (11 and/or 12) can perform a predefined operation (e.g., a camera operation, a sensing operation, and the like) based on the received light (e.g., visible light, infrared light, ultraviolet light, and/or the like).

Referring to FIG. 13, although the one or more optical electronic devices (11 and/or 12) are placed at a specific location of the display device 100, the one or more optical electronic devices (11 and/or 12) are configured to normally receive external light through the display panel 110. In addition, even when the one or more optical electronic devices (11 and/or 12) are disposed to overlap the optical area OA, which is a partial area of the display area DA of the display panel 110, the display panel 110 is configured to normally perform image displaying.

Accordingly, the optical area OA in the display area DA of the display panel 110 is configured to have a light transmission and display structure. In one or more embodiments, a boundary area adjacent to the optical area OA in the normal area NA of the display area DA of the display panel 110 may have a light transmission and display structure.

A stackup configuration of the display panel 110 will be briefly described with reference to FIG. 13. The display panel 110 may include a substrate SUB, a thin film transistor forming layer 1310, a light emitting element forming layer 1320, an encapsulation layer ENCAP, and the like.

The thin film transistor forming layer 1310 may be located on the substrate SUB, and may be a vertical area (e.g., include a stack of one or more layers) in which a plurality of thin film transistors (TFT) and a plurality of capacitors are disposed. The plurality of thin film transistors (TFT) may include transistors (DT and ST) disposed in each subpixel SP. The plurality of capacitors may include a storage capacitor Cst disposed in each subpixel SP.

The thin film transistor forming layer 1310 may include at least one metal layer, at least one semiconductor material layer (which may be also referred to as an active layer), and a plurality of insulating layers.

The light emitting element forming layer 1320 may be located on the thin film transistor forming layer 1310, and may be a vertical area (e.g., include a stack of one or more layers) in which a plurality of light emitting elements ED are disposed.

The light emitting element forming layer 1320 may include a plurality of anode electrodes AE, at least one emission layer EL, and a cathode electrode CE. One light emitting area EA may be formed in an area where one anode electrode AE overlaps the emission layer EL and the cathode electrode CE.

A plurality of light emitting areas EA may be formed in the light emitting element forming layer 1320. The plurality of light emitting areas EA may include one or more red light emitting areas EA_R for emitting red light, one or more green light emitting areas EA_G for emitting green light, and one or more blue light emitting area EA_B for emitting blue light.

Referring to FIG. 13, a plurality of light emitting areas EA may be densely disposed in the normal area NA of the display area DA. In contrast, in the optical area OA of the display area DA, a plurality of light emitting areas EA may not be densely disposed. Accordingly, the number of pixels per unit area in the optical area OA may be less than the number of pixels per unit area in the normal area NA.

The reason why a plurality of light emitting areas EA are not densely disposed in the optical area OA of the display area DA is to provide a space for helping light be effectively transmitted.

In the optical area OA of the display area DA, a space in which light emitting areas EA are not disposed may be a space for light transmission. The space for the light transmission may be also referred to as a transmission area TA. A metal, which may not allow light to be transmitted, may not be disposed in the transmission area TA. In one or more embodiments, one or more of insulating layers may be partially etched in the transmission area TA to increase the light transmittance.

Referring to FIG. 13, in the optical area OA of the display area DA, pixels P, each of which includes subpixels grouped together from a plurality of subpixels SP, may be spaced apart from each other, and transmission areas TA may be disposed between the pixels P.

The plurality of subpixels SP may include one or more red subpixels SP for emitting red light, one or more green subpixels SP for emitting green light, and one or more blue subpixels SP for emitting blue light.

For example, one pixel P may include one red subpixel SP, one green subpixel SP, and one blue subpixel SP.

For another example, one pixel P may include one red subpixel SP, two green subpixels SP, and one blue subpixel SP.

Herein, a light emitting area EA may also be described as a subpixel SP, and a red light emitting area EA_R, a green light emitting area EA_G, and a blue light emitting area EA_B may be described as a red subpixel SP, a green subpixel SP, and a blue subpixel, respectively. In addition, all of light emitting areas EA of subpixels SP included in a pixel P may be collectively described as one pixel P.

In one or more embodiments, the display panel 110 according to aspects of the present disclosure may further include a color filter layer. The color filter layer may include color filters disposed on a plurality of light emitting elements ED and a black matrix BM disposed between the color filters.

In the example where the color filter layer is added in the display panel 110, the plurality of light emitting elements ED may emit light of a same color. For example, when the color filter layer is added, the plurality of light emitting elements ED may emit same white light. In another example, the plurality of light emitting elements ED may emit same blue light.

For example, the color filters may include a red color filter, a green color filter, and a blue color filter. In another example, the color filters may include a red color filter and a green color filter, but may not include a blue color filter.

For example, the color filter layer may be disposed on an encapsulation layer ENCAP.

For example, the color filter layer may be disposed on a touch sensor layer TSL located on the encapsulation layer ENCAP. In another example, the color filters and the black matrix BM may be disposed between the encapsulation layer ENCAP and the touch sensor layer TSL.

In one or more embodiments, the display panel 110 according to aspects of the present disclosure may further include a color conversion layer. The color conversion layer may be disposed under or over the color filter layer. For example, the color conversion layer may include quantum dots.

As described above, since the display panel 110 of the display device 100 according to aspects of the present disclosure has a light transmission and display structure in the optical area OA, even when one or more optical electronic device (11 and/or 12) are located under the substrate SUB of the display panel 110 and overlap the optical area OA, the one or more optical electronic device (11 and/or 12) can normally receive light transmitting through the optical area OA and perform normal operations based on the received light.

Referring to FIGS. 13 and 14, in the display device 100 according to aspects of the present disclosure, since the number of pixels per unit area in the optical area OA may be less than the number of pixels per unit area in the normal area NA, thereby, there may occur an image disparity between the normal area NA and the optical area OA. In particular, such an image disparity may be conspicuously perceived in a boundary area between the normal area NA and the optical area OA.

For example, referring to FIGS. 13 and 14, when a color image is displayed in the display area DA, since one or more transmissive areas TA of the optical area OA, which are non-light emitting areas, are located between respective light emitting areas EA of pixels P, thereby, the display device 100 may have display characteristics other than a display device not including such a transmissive areas TA.

For example, a color image (e.g., a light emitting portion) by light emitting areas EA of pixels P and a black portion (e.g., a non-light emitting portion) by the transmissive area TA may be present by being mixed together in the optical area OA of the display area DA of the display panel 110 of the display device 100 according to aspects of the present disclosure. As the black portion is mixed with the color image, the resulting image displayed in the optical area OA may visually appear to have low saturation (chroma).

As the image displayed in the optical area OA of the display area DA visually appears to have low saturation, there may be caused a difference in saturation between an image displayed in the normal area NA and the image displayed in the optical area OA.

The phenomenon in which the image displayed in the optical area OA visually appears to have low saturation may cause a colorfulness perception difference (or a saturation difference, or a visual color difference) between the normal area NA and the optical area OA. As a result, satisfaction of users with image quality may be lowered.

To address these issues, one or more embodiments of the present disclosure may provide the display device 100, the display controller 240, and a display driving method that are capable of reducing a degree of image disparity by enabling users to notice less colorfulness perception difference (or saturation difference) between the normal area NA and the optical area OA.

One or more embodiments of the present disclosure may provide a driving technique for reducing or minimizing colorfulness perception difference (which may be referred to as a colorfulness perception difference improvement driving technique) by changing saturation of the normal area NA and the optical area OA to improve the colorfulness perception difference due to the optical area OA having a transmission and display structure.

According to one or more embodiments of the present disclosure, perceptual image quality can be improved by designing the optical area not to be recognized by users.

Hereinafter, the display device 100, the display controller 240, and the display driving method to which the colorfulness perception difference improvement driving technique according to embodiments of the present disclosure is applied will be described. Prior to detailed description, first, an example pixel arrangement for colorfulness perception difference improvement driving is described with reference to FIG. 15.

Figure 15:
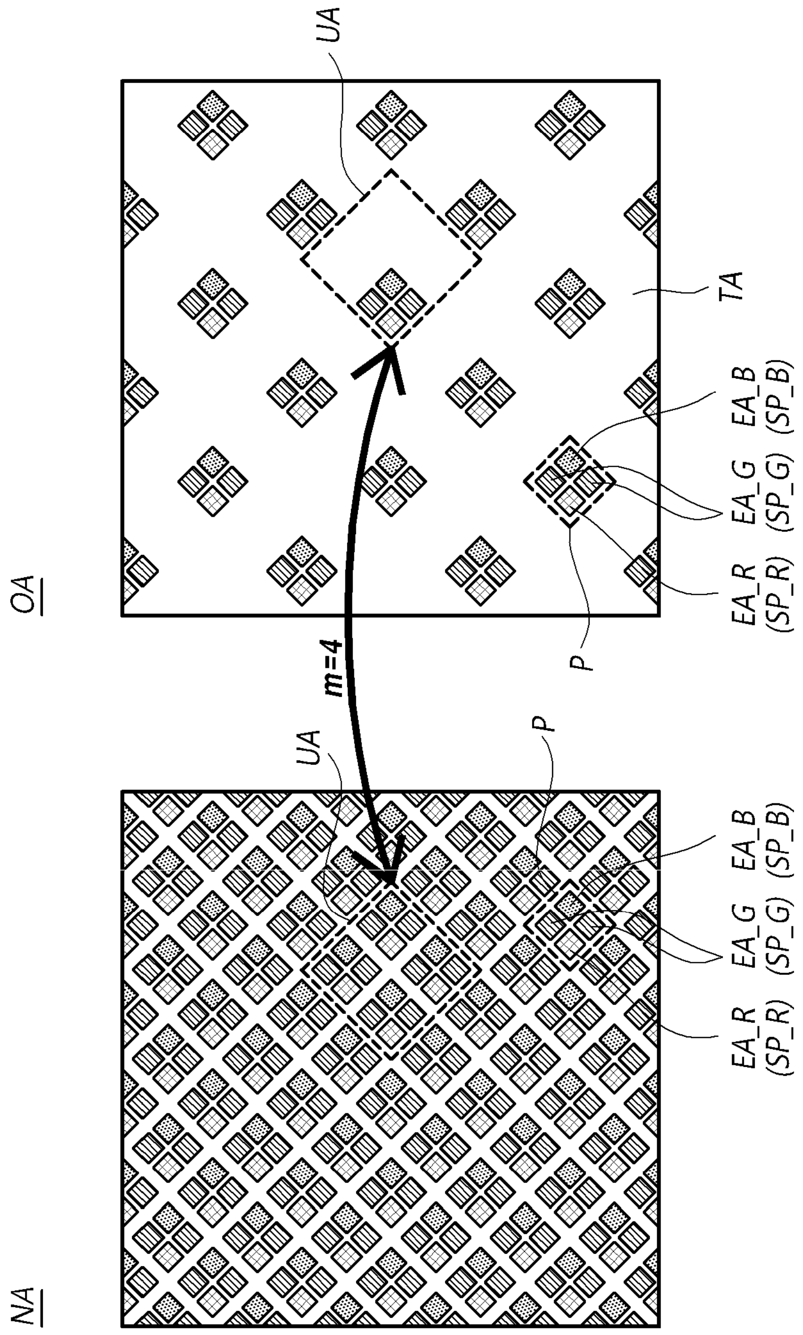
FIG. 15 illustrates example respective pixel arrangements in each of the normal area and the optical area in the display device according to aspects of the present disclosure.

FIG. 15 illustrates example respective pixel arrangements in each of the normal area NA and the optical area OA in the display device 100 according to aspects of the present disclosure.

Referring to FIG. 15, one pixel P may include one red subpixel SP_R, two green subpixels SP_G, and one blue subpixel SP_B.

Referring to FIG. 15, a light emitting area of one pixel P may include one red light emitting area EA_R of one red subpixel SP_R, two green light emitting areas EA_G of two green subpixels SP_G, and one blue light emitting area EA_B of one blue subpixel SP_B.

In the configuration of FIG. 15, the number of pixels per unit area UA in the normal area NA may be 4, and the number of pixels per unit area UA in the optical area OA may be 1. Thus, the ratio of the number of pixels per unit area UA in the normal area NA to the number of pixels per unit area UA in the optical area OA may be 4:1.

A light emitting area ratio m between the normal area NA and the optical area OA may be a value obtained by dividing the number of pixels per unit area UA in the normal area NA by the number of pixels per unit area UA in the optical area OA. Accordingly, the light emitting area ratio m in the example of FIG. 15 is 4.

Figure 16:
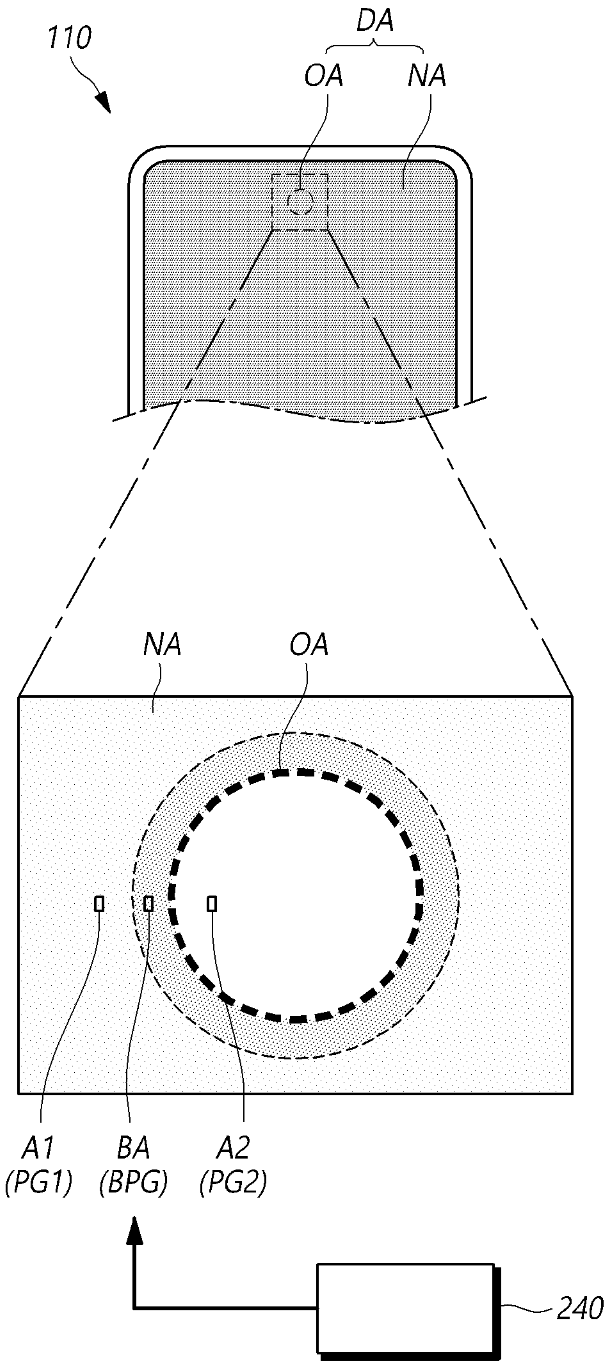
FIG. 16 illustrates an example first driving area, an example second driving area, and an example boundary driving area for explaining a driving technique for improving colorfulness perception difference in the display device according to aspects of the present disclosure.

FIG. 16 illustrates an example first driving area A1, an example second driving area A2, and an example boundary driving area BA for explaining a colorfulness perception difference improvement driving technique applied to the display device 100 according to aspects of the present disclosure.

Referring to FIG. 16, in one or more embodiments, the display panel 110 of the display device 100 according to aspects of the present disclosure may include a display area DA in which the first driving area A1 and the second driving area A2 are included, which have different numbers of pixels per unit area.

The number of pixels per unit area in the second driving area A2 may be less than the number of pixels per unit area in the first driving area A1. In the configuration of FIG. 15, the number of pixels per unit area in the second driving area A2 may be 1, and the number of pixels per unit area in the first driving area A1 may be 4.

Referring to FIG. 16, the display area DA may include a boundary driving area BA, which is an area between the first driving area A1 and the second driving area A2.

The display controller 240 can control an image to be displayed in the display area DA.

Referring to FIG. 16, when a saturation value of the image is equal to or greater than a selected threshold value, the display controller 240 can control at least one of the number of light emitting pixels, luminance, and saturation of the boundary driving area BA, which is an area between the first driving area A1 and the second driving area A2.

Referring to FIG. 16, the display controller 240 can divide the boundary driving area BA, which is an area between the first driving area A1 and the second driving area A2, into two or more boundary driving areas, and differently control at least one of respective numbers of light emitting pixels, luminance, and saturation of the divided two or more boundary driving areas.

For example, when a saturation value of an image is equal to or greater than a selected threshold value, at least one of the number of light emitting pixels, luminance, and saturation of a first boundary driving area BA1 between the first driving area A1 and the second driving area A2 can be controlled by the display controller 240.

In this example, at least one of the number of light emitting pixels, luminance, and saturation of a second boundary driving area BA2 between the first boundary driving area BA1 and the second driving area A2 can be controlled to be different from at least a corresponding one of the number of light emitting pixels, luminance, and saturation of the first boundary driving area BA1. That is, at least one of the number of light emitting pixels per unit area, luminance, and saturation of the second boundary driving area BA2 may be different from at least a corresponding one of the number of light emitting pixels per unit area, luminance, and saturation of the first boundary driving area BA1. When an image having a saturation value less than a threshold value is displayed in the display area DA, the display controller 240 may not control the number of light emitting pixels per unit area, luminance, and saturation of the boundary driving area BA.

Referring to FIG. 16, the display area DA may include an optical area OA allowing light to be transmitted and a normal area NA, which is an area different from the optical area OA.

Referring to FIG. 16, the first driving area A1 may be included in the normal area NA, and the second driving area A2 may be included in the optical area OA.

Referring to FIG. 16, the boundary driving area BA, which is an area between the first driving area A1 and the second driving area A2, may be included in the normal area NA. In this case, the boundary driving area BA may be a portion of the normal area NA closest to the optical area OA. Hereinafter, an area between the first driving area A1 and the second driving area A2 may also be referred to as a boundary driving area BA.

Figure 17:
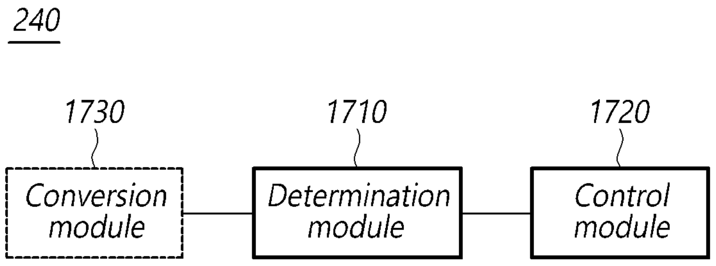
FIG. 17 is an example block diagram of a display controller of the display device according to aspects of the present disclosure.

FIG. 17 is an example block diagram of the display controller 240 of the display device 100 according to aspects of the present disclosure.

Referring to FIG. 17, in one or more embodiments, the display controller 240 of the display device 100 according to aspects of the present disclosure may include a determination module 1710 and a control module 1720.

The term "module" may include any electrical circuitry, features, components, an assembly of electronic components or the like. That is, "module" may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term "module."

In some embodiments, the various modules described herein may be included in or otherwise implemented by processing circuitry such as a microprocessor, microcontroller, or the like. Accordingly, a determination module 1710 may also be referred to as a determination circuit 1710, a control module 1720 may also be referred to as a control circuit 1720, a conversion module 1730 may 1730 may also be referred to as a conversion circuitry 1730.

The determination module 1710 can determine, as a control timing, an instance (or a point in time) where a saturation value of an image to be displayed in the display area including the first driving area A1 and the second driving area A2, which have different numbers of pixels per unit area, is greater than or equal to a selected threshold value.

When the control timing is determined, the control module 1720 can control at least one of the number of light emitting pixels per unit area, luminance, and saturation of an area BA between the first driving area A1 and the second driving area A2, When the control timing is not determined as the saturation value of the image is determined to be less than the threshold value by the determination module 1710, the control module 1720 may 1720 may not control the number of light emitting pixels, luminance, and saturation for the area BA between the first driving area A1 and the second driving area A2.

In one or more embodiments, the determination module 1710 of the display controller 240 according to aspects of the present disclosure can determine the control timing using one of a first determination method and a second determination method.

When the determination module 1710 of the display controller 240 determines a control timing using the first determination method, the determination module 1710 can determine the control timing based on a visual perception characteristic signal.

More specifically, the determination module 1710 can determine whether a saturation value included in a visual perception characteristic signal is greater than or equal to a selected threshold value, and if the saturation value is greater than or equal to the threshold value, determine this instance as a control timing.

The visual perception characteristic signal may be a signal converted from input signals (R, G, and B). The input signals (R, G, and B) are image signals received by the display controller 240 from the host system 250 and may include a red signal value, a green signal value, and a blue signal value. The input signals are also referred to as image signals or input image data.

The visual perception characteristic signal may include a hue value (or a lightness value), a saturation value (or a chroma value), and a value (or a luminance or hue value). The red signal value, the green signal value, and the blue signal value may be converted into a hue value (or a lightness value), a saturation value (or a chroma value), and a value (or a luminance or hue value) by a selected conversion equation. For example, the visual perception characteristic signal may be one of a hue-saturation-value (HSV) signal, a hue-saturation-luminance (HSL) signal, and a lightness-chroma-hue (LCH) signal.

In one or more embodiments, in order for the determination module 1710 of the display controller 240 to determine a control timing based on the first determination method, referring to FIG. 17, the display controller 240 of the display device 100 may further include a conversion module 1730.

The conversion module 1730 can convert input signals (R, G, and B) including a red signal value, a green signal value, and a blue signal value into a visual perception characteristic signal including a hue value (or a lightness value), a saturation value (or a chroma value), and a value value (or a luminance or hue value).

In one or more embodiments, when the determination module 1710 of the display controller 240 determines a control timing based on the second determination method, the determination module 1710 can directly determine the control timing based on input signals.

According to the second determination method, the determination module 1710 can determine, as a control timing, an instance where a red signal value, a green signal value, and a blue signal value satisfy a selected RGB condition based on the red signal value, the green signal value, and the blue signal value included in the input signals (R, G, and B).

The selected RGB condition may correspond to "a saturation condition in which a saturation value is greater than or equal to a selected threshold value" in the first determination method.

In one or more embodiments, when the determination module 1710 of the display controller 240 according to aspects of the present disclosure determines a control timing based on the second determination method, the display controller 240 may not include the conversion module 1730.

Figure 18:
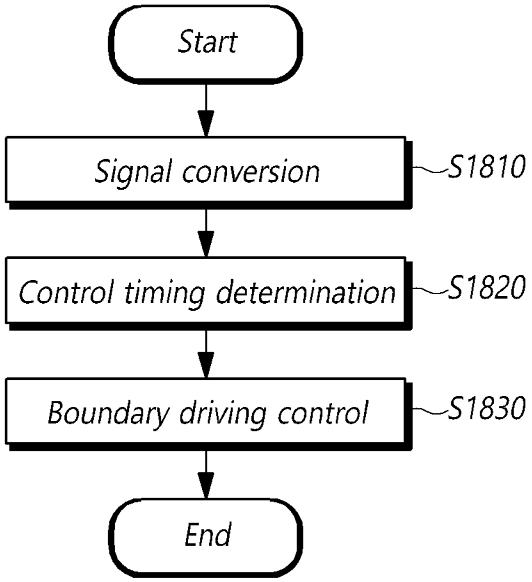
FIG. 18 is an example flow diagram of a driving method of the display device according to aspects of the present disclosure.

FIG. 18 is an example flow diagram of a driving method of the display device 100 according to aspects of the present disclosure.

Referring to FIG. 18, in one or more embodiments, the driving method of the display device 100 according to aspects of the present disclosure may include a control timing determination step S1820 and a boundary driving control step S1830.

In the control timing determination step S1820, the display controller 240 can determine, as a control timing, an instance where a saturation value of an image to be displayed in the display area including the first driving area A1 and the second driving area A2, which have different numbers of pixels per unit area, is greater than or equal to a selected threshold value.

When the control timing is determined by the display controller 240 in the control timing determination step S1820, the boundary driving control step S1830 can be performed.

When the boundary driving control step S1830 is performed, the display controller 240 can control at least one of the number of light emitting pixels, luminance, and saturation of an area BA between the first driving area A1 and the second driving area A2. For instance, the display controller 240 can control the number of light emitting pixels of the boundary driving area BA. Alternatively, the display controller 240 can control the luminance of the boundary driving area BA. Alternatively, the display controller 240 can control the saturation of the boundary driving area BA. Alternatively, the display controller 240 can control the number of light emitting pixels, luminance, and saturation the luminance of the boundary driving area BA. Further, the display controller 240 can control any combination of the number of light emitting pixels, luminance, or saturation.

In one or more embodiments, in the control timing determination step S1820, the display controller 240 can determine a control timing using one of the first determination method and the second determination method.

When the display controller 240 determines a control timing using the first determination method, the display controller 240 can determine the control timing based on a visual perception characteristic signal. More specifically, the display controller 240 can determine whether a saturation value included in the visual perception characteristic signal is greater than or equal to a selected threshold value, and if the saturation value is greater than or equal to the threshold value, determine this instance as a control timing.

The visual perception characteristic signal may be a signal converted from input signals (R, G, and B). The input signals (R, G, and B) are image signals received by the display controller 240 from the host system 250 and may include a red signal value, a green signal value, and a blue signal value. The input signals are also referred to as image signals or input image data.

The visual perception characteristic signal may include a hue value (or a lightness value), a saturation value (or a chroma value), and a value value (or a luminance or hue value). The red signal value, the green signal value, and the blue signal value may be converted into a hue value (or a lightness value), a saturation value (or a chroma value), and a value value (or a luminance or hue value) by a selected conversion equation.

Referring to FIG. 18, in one or more embodiments, in order for the display controller 240 to determine a control timing based on the first determination method, the driving method of the display device 100 may further include a signal conversion step S1810, which is performed prior to the control timing determination step S1820.

In the signal conversion step S1810, the display controller 240 can convert input signals (R, G, and B) including a red signal value, a green signal value, and a blue signal value into a visual perception characteristic signal including a hue value (or a lightness value), a saturation value (or a chroma value), and a value value (or a luminance or hue value).

For example, the visual perception characteristic signal may be one of a hue-saturation-value (HSV) signal, a hue-saturation-luminance (HSL) signal, and a lightness-chroma-hue (LCH) signal.

When the display controller 240 determines a control timing using the second determination method, the display controller 240 can directly determine the control timing based on input signals.

According to the second determination method, the display controller 240 can determine, as a control timing, an instance where a red signal value, a green signal value, and a blue signal value satisfy a selected RGB condition based on the red signal value, the green signal value, and the blue signal value included in the input signals (R, G, and B). The selected RGB condition may correspond to "a saturation condition in which a saturation value is greater than or equal to a selected threshold value" in the first determination method.

When the display controller 240 determines a control timing based on the second determination method, a signal conversion step S1810 need not be performed prior to the control timing determining step S1820.

Figure 19:
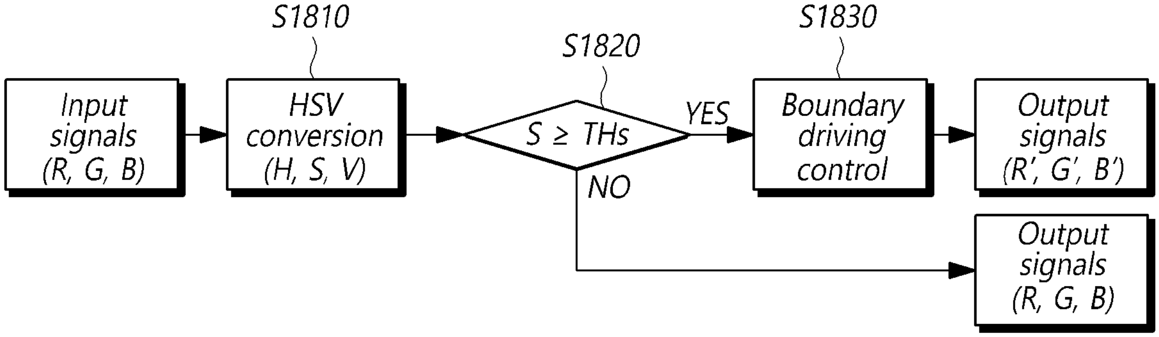
FIG. 19 is an example flow diagram of a driving method through an HSV-based control timing determination in the display device according to aspects of the present disclosure.

FIG. 19 is an example flow diagram of a driving method through a HSV-based control timing determination in the display device 100 according to aspects of the present disclosure.

In one or more embodiments, the display controller 240 according to aspects of the present disclosure can determine a control timing using the first determination method. That is, the display controller 240 can determine a control timing based on a visual perception characteristic signal.

The display controller 240 can receive input signals (R, G, and B) from the host system 250.

The input signals (R, G, and B) may include a red signal value R, a green signal value G, and a blue signal value B. The input signals are also referred to as image signals or input image data.

The display controller 240 can convert the input signals (R, G, and B) into a visual perception characteristic signal in step S1810. For example, the visual perception characteristic signal may be one of a hue-saturation-value (HSV) signal, a hue-saturation-luminance (HSL) signal, and a lightness-chroma-hue (LCH) signal.

FIG. 19 illustrates an example where the visual perception characteristic signal is based on a hue-saturation-value (HSV) signal.

The display controller 240 can convert the input signals (R, G, and B) into a HSV signal, which is one type of visual perception characteristic signal in step S1810.

The HSV signal, which is one type of visual perception characteristic signal, may include a hue value H, a saturation value S, and a value value V. The red signal value R, green signal value G, and blue signal value B included in the input signals (R, G, and B) may be converted into a hue value H, a saturation value S, and a value value V by a selected conversion equation.

Among the red signal value R, the green signal value G, and the blue signal value B included in the input signals (R, G, and B), the display controller 240 can extract the maximum value M (e.g., M=max(R, G, B)).

Among the red signal value R, the green signal value G, and the blue signal value B included in the input signals (R, G, and B), the display controller 240 can extract the minimum value m (e.g., m=min(R, G, B)).

The display controller 240 can calculate a maximum-minimum difference value D between the maximum value M and the minimum value m (e.g., D=M−m).

The display controller 240 can set the extracted maximum value M as a value value V (e.g., V=M).

The display controller 240 can set a value (e.g., D/V) obtained by dividing the calculated maximum-minimum difference value D by the set value value V as a saturation value S (e.g., S=D/V).

When the maximum value M is the red signal value R (e.g., M=R), the display controller 240 can set a value (e.g., 60°×(G−B)/D) obtained by multiplying a value, which is obtained by dividing a difference (e.g., G−B) between the green signal value G and the blue signal value B by the maximum-minimum difference value D, by 60 degrees as a hue value H (e.g., H=60°×(G−B)/D).

When the maximum value M is the green signal value G (e.g., M=G), the display controller 240 can set a value (e.g., 60°×(B−R)/D) obtained by multiplying a value, which is obtained by dividing a difference (e.g., B−R) between the blue signal value B and the red signal value R by the maximum-minimum difference value D, by 60 degrees as a hue value H (e.g., H=60°×(B−R)/D).

When the maximum value M is the blue signal value B (e.g., M=B), the display controller 240 can set a value (e.g., 60°×(R−G)/D) obtained by multiplying a value, which is obtained by dividing a difference (e.g., R−G) between the red signal value R and the green signal value G by the maximum-minimum difference value D, by 60 degrees as a hue value H (e.g., H=60°×(R−G)/D).

The display controller 240 can determine whether the saturation value S included in the HSV signal satisfies a saturation condition equal to or greater than a selected threshold value THs in step S1820.

For example, the saturation value S may be a value between 0% and 100%. In this example, the saturation value S of 0% may be the lowest saturation value, and the saturation value S of 100% may be the highest saturation value. A color with the saturation value S of 100% may be referred to as a pure color.

For example, the threshold value THs may be 70%. In another example, the threshold value THs may be a value belonging to a range of 60% to 80%.

When it is determined that the saturation value S included in the HSV signal satisfies the saturation condition greater than or equal to the selected threshold value THs, the display controller 240 can determine that this instance (e.g., the current situation) is a control timing. Accordingly, the display controller 240 can perform a selected boundary driving control in step S1830, and supply output signals (R', G', and B') resulting from the boundary driving control.

The output signals (R', G', and B') resulting from the boundary driving control may be signals obtained by changing the input signals (R, G, and B). For example, according to the output signals (R', G', and B') resulting from the boundary driving control, at least one of the number of light emitting pixels, luminance, and saturation of a boundary driving area BA (e.g., the boundary driving area BA in the figures discussed above) may be changed.

As the number of light emitting pixels of the boundary driving area BA is changed, a light emitting area ratio may be changed. Accordingly, a change in the number of light emitting pixels of the boundary driving area BA may correspond to a change in the light emitting area ratio.

When it is determined that the saturation value S included in the HSV signal does not satisfy the saturation condition greater than or equal to the selected threshold value THs, the display controller 240 can determine that this instance (e.g., the current situation) is not a control timing. Accordingly, the display controller 240 can supply output signals (R, G, and B) corresponding to the input signals (R, G, and B) without performing the boundary driving control.

The display driving method according to embodiments of the present disclosure described with reference to FIG. 19 will be briefly described as follows.

The display controller 240 according to aspects of the present disclosure can convert input signals (R, G, and B) into a visual perception characteristic signal (e.g., a HSV signal) including a hue value H, a saturation value S, and a value value V in step S1810, determine whether the saturation value S included in the visual perception characteristic signal (e.g., the HSV signal) is greater than or equal to a threshold value THs in step S1820, and when it is determined that the saturation value S included in the visual perception characteristic signal (e.g., the HSV signal) is greater than or equal to the threshold value THs, determine that this instance (e.g., the current situation) is a control timing in step S1820. When the control timing is determined, the display controller 240 can perform the boundary driving control in step S1830.

Figure 20:
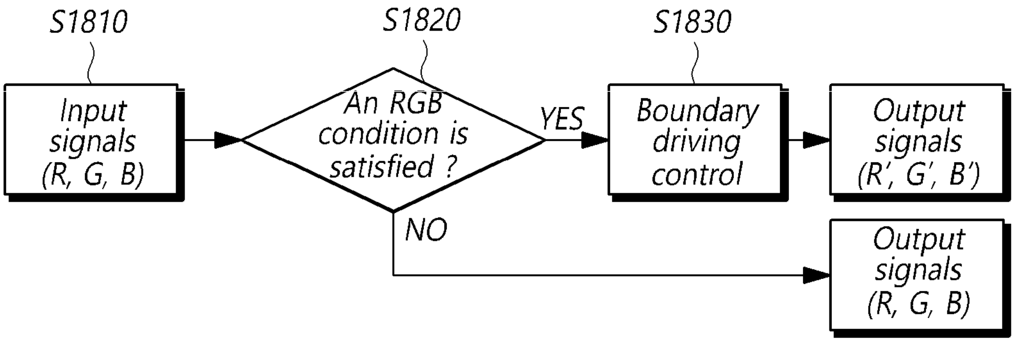
FIG. 20 is an example flow diagram of a driving method through an RGB-based control timing determination in the display device according to aspects of the present disclosure.

FIG. 20 is an example flow diagram of a driving method through a RGB-based control timing determination in the display device 100 according to aspects of the present disclosure.

In one or more embodiments, the display controller 240 according to aspects of the present disclosure can determine a control timing using the second determination method. That is, the display controller 240 can determine a control timing by using input signals (R, G, and B) itself without converting the input signals into a visual perception characteristic signal.

Referring to FIG. 20, the display controller 240 can determine whether a red signal value R, a green signal value G, and a blue signal value B satisfy a selected RGB condition based on the red signal value R, the green signal value G, and the blue signal value B included in the input signals (R, G, and B) in step S1820.

The selected RGB condition may have a meaning in terms of image corresponding to "a saturation condition in which a saturation value is greater than or equal to a selected threshold value" in the first determination method.

For example, the selected RGB condition may be, but not limited to, a case where the green signal value G exceeds 192, the red signal value R is less than 64, and the blue signal value B is less than 64.

When it is determined that the selected RGB condition is satisfied, the display controller 240 can determine that this instance (e.g., the current situation or a point in time) is a control timing. Accordingly, the display controller 240 can perform a selected boundary driving control, and supply output signals (R', G', and B') resulting from the boundary driving control.

The output signals (R', G', and B') resulting from the boundary driving control may be signals obtained by changing the input signals (R, G, and B). For example, according to the output signals (R', G', and B') resulting from the boundary driving control, at least one of the number of light emitting pixels, luminance, and saturation of a boundary driving area BA (e.g., the boundary driving area BA in the figures discussed above) may be changed.

As the number of light emitting pixels of the boundary driving area BA is changed, a light emitting area ratio may be changed. Accordingly, a change in the number of light emitting pixels of the boundary driving area BA may correspond to a change in the light emitting area ratio.

When it is determined that the selected RGB condition is not satisfied, the display controller 240 can determine that this instance (e.g., the current situation) is not a control timing. Accordingly, the display controller 240 can supply output signals (R, G, and B) corresponding to the input signals (R, G, and B) without performing boundary driving control.

The display driving method according to aspects of the present disclosure described above with reference to FIG. 20 will be briefly described as follows.

That is, when it is determined that a red signal value R, a green signal value G, and a blue signal value B, which are included in input signals (R, G, and B), satisfy a selected RGB condition, the display controller 240 according to aspects of the present disclosure can determine this instance (e.g., the current situation) to be a control timing, and perform the boundary driving control in step S1830.

In the foregoing discussions, in the display driving method according to aspects of the present disclosure, two methods (e.g., the determination method based on a visual perception characteristic signal and the determination method based on input signals) for determining a control timing have been described with reference to FIGS. 19 and 20.

Hereinafter, two methods of performing boundary driving control in the display driving method according to aspects of the present disclosure will be described. In one or more embodiments, the method of performing the boundary driving control in the display driving method according to aspects of the present disclosure may include at least one of "a first boundary driving control in which the number of light emitting pixels and luminance of a boundary driving area BA are changed" and "a second boundary driving control in which the luminance and saturation of the boundary driving area BA are changed".

Hereinafter, a display driving method based on the first boundary driving control in the display device 100 according to aspects of the present disclosure will be described first with reference to FIGS. 21 to 23. Thereafter, a display driving method based on the second boundary driving control in the display device 100 according to aspects of the present disclosure will be described with reference to FIG. 24.

Figure 21:
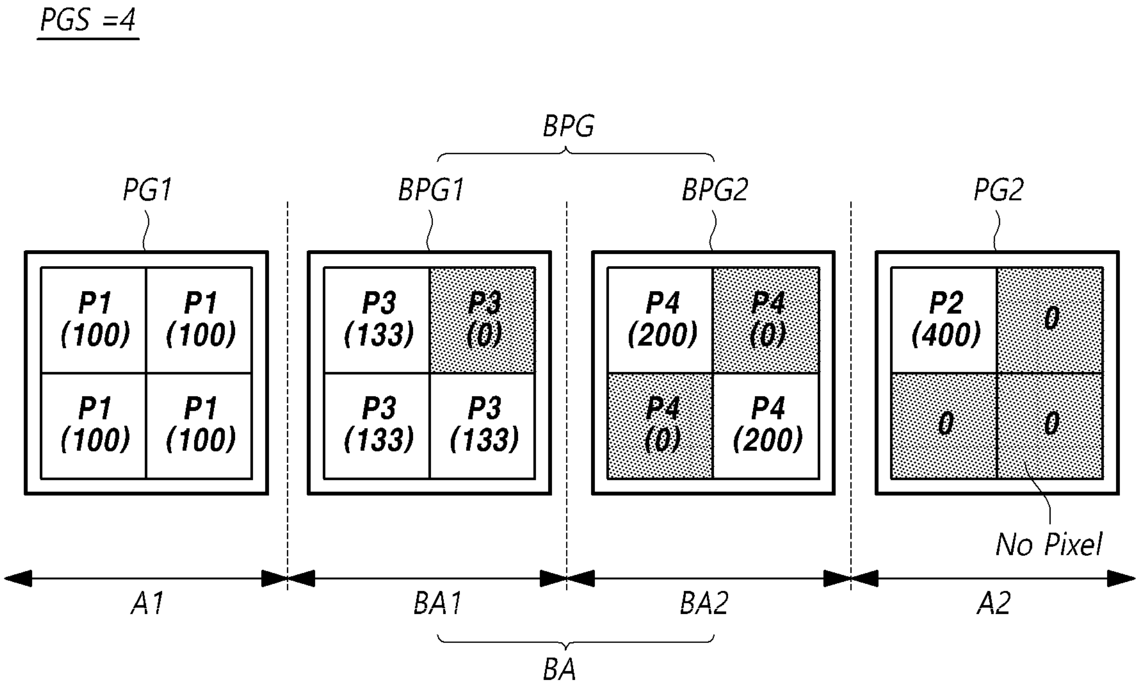
FIGS. 21 to 23 illustrate example display driving methods based on a first boundary driving control for changing the number of light emitting pixels and luminance of a boundary driving area in examples where pixel group sizes are 4, 8, and 16 in the display device according to aspects of the present disclosure.
Figure 22:
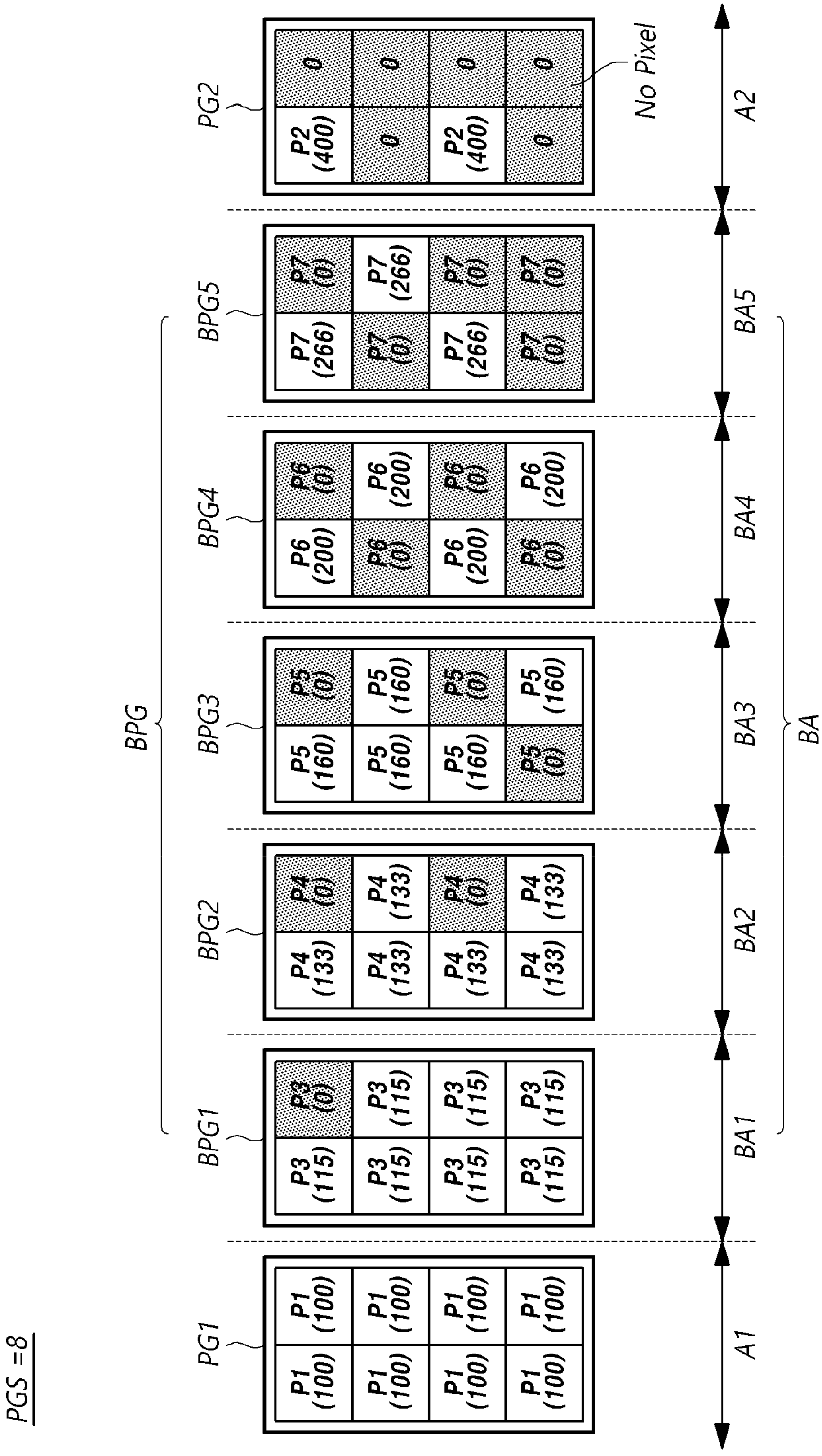
Figure 23:
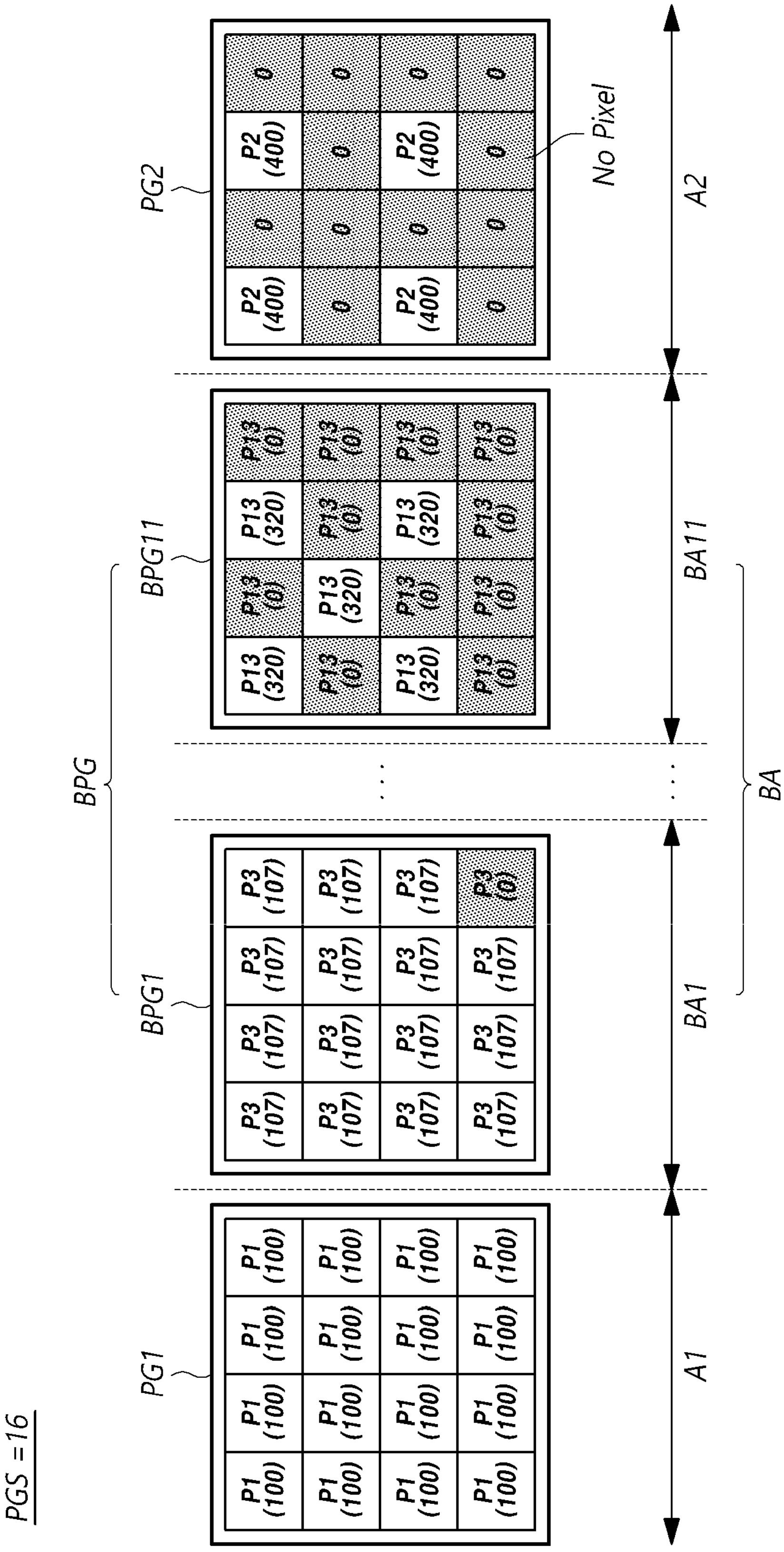

FIGS. 21 to 23 illustrate example display driving methods based on the first boundary driving control for changing the number of light emitting pixels and luminance of a boundary driving area BA in examples where pixel group sizes are 4, 8, and 16 in the display device 100 according to aspects of the present disclosure.

In one or more embodiments, the display controller 240 of the display device 100 according to aspects of the present disclosure can perform the first boundary driving control for changing the number of light emitting pixels and luminance of a boundary driving area BA between a first driving area A1 and a second driving area A2, when a saturation value of an image to be currently displayed is greater than or equal to a threshold value (e.g., the highly saturated image).

Hereinafter, the first boundary driving control will be described with reference to FIGS. 21 to 23.

In one or more embodiments, the display panel 110 according to aspects of the present disclosure may include a substrate SUB including a display area DA for displaying an image, and a plurality of pixels P disposed on the substrate SUB. The display area DA may include a first driving area A1, a second driving area A2, and a first boundary driving area BA1 between the first driving area A1 and the second driving area A2.

The second driving area A2 may include one or more transmissive areas TA allowing light to be transmitted and located between a plurality of second pixels P2. The first driving area A1 and the first boundary driving area BA1 may not include a transmissive area TA. The first driving area A1 and the first boundary driving area BA1 may be included in the normal area NA, and the second driving area A2 may be included in the optical area OA.

The plurality of pixels P may include a plurality of first pixels P1 disposed in the first driving area A1, a plurality of second pixels P2 disposed in the second driving area A2, and a plurality of third pixels P3 disposed in the first boundary driving area BA1.

The number of pixels per unit area in the second driving area A2 may be less than the number of pixels per unit area in the first driving area A1. The number of pixels per unit area in the first boundary driving area BA1 may be equal to the number of pixels per unit area in the first driving area A1.

The number of light emitting pixels per unit area in the second driving area A2 may be less than the number of light emitting pixels per unit area in the first driving area A1.

According to the boundary driving control according to embodiments of the present disclosure, when an image having a saturation value equal to or greater than a selected threshold value is displayed in the display area DA, the number of light emitting pixels per unit area of the first boundary driving area BA1 may be greater than the number of light emitting pixels per unit area of the second driving area A2 and be less than the number of light emitting pixels per unit area of the first driving area A1.

In an instance where an image having a saturation value equal to or greater than a selected threshold value is displayed on the display area DA, users can greatly notice a colorfulness perception difference between the normal area NA and the optical area OA. In one or more embodiments, the display device 100 according to aspects of the present disclosure can determine an instance where an image having a saturation value equal to or greater than a selected threshold value is displayed in the display area DA as a control timing, and perform the boundary driving control.

In one or more embodiments, as the display device 100 according to aspects of the present disclosure performs the boundary driving control, the number of light emitting pixels per unit area of the first boundary driving area BA1 included in the normal area NA and adjacent to the optical area OA may be controlled to be greater than the number of light emitting pixels per unit area of the second driving area A2 included in the optical area OA and be less than the number of light emitting pixels per unit area of the first driving area A1 included in the normal area NA.

Accordingly, the number of light emitting pixels per unit area of the first boundary driving area BA1, which greatly affects luminance, can be adjusted so that a difference in the numbers of light emitting pixels per unit area between the normal area NA and the optical area OA can be made gradually. Therefore, a change in images perceived by the user between the normal area NA and the optical area OA can be controlled so as not to be noticed rapidly.

In the boundary driving control according to embodiments of the present disclosure, the number of light emitting pixels per unit area, luminance and saturation of the first boundary driving area BA1 may not be controlled when an image having a saturation value less than a threshold value is displayed in the display area DA.

In the boundary driving control according to embodiments of the present disclosure, when an image having a saturation value less than a threshold value is displayed in the display area DA, all of the plurality of third pixels P3 disposed in the first boundary driving area BA1 emit light, or the number of light emitting pixels per unit area of the first boundary driving area BA1 may be equal to the number of light emitting pixels per unit area of the first driving area A1.

In one or more embodiments, locations of light emitting pixels among the plurality of third pixels P3 disposed in the first boundary driving area BA1 may be changed as time passes. For example, locations of light emitting pixels among the plurality of third pixels P3 disposed in the first boundary driving area BA1 may be changed regularly or randomly as time passes.

Referring to FIGS. 21 to 23, according to the first boundary driving control, the number of light emitting pixels and luminance of the first boundary driving area BA1 may be changed.

Referring to FIGS. 21 to 23, as the number of light emitting pixels of the first boundary driving area BA1 is changed by the first boundary driving control, the number of light emitting pixels per unit area of the first boundary driving area BA1 may be greater than the number of light emitting pixels per unit area of the second driving area A2 and be less than the number of light emitting pixels per unit area of the first driving area A1.

Referring to FIGS. 21 to 23, as the luminance of the first boundary driving area BA1 is changed the first boundary driving control, a respective driving luminance of each of light emitting pixels among the plurality of third pixels P3 of the first boundary driving area BA1 may be higher than a respective driving luminance of each of the plurality of first pixels P1 of the first driving area A1 and be lower than a respective driving luminance of each of the plurality of second pixels P2 of the second driving area A2.

Referring to FIGS. 21 to 23, the display area DA may further include a second boundary driving area BA2 between the first boundary driving area BA1 and the second driving area A2. The plurality of pixels P may further include a plurality of fourth pixels P4 disposed in the second boundary driving area BA2. The number of pixels per unit area in the second boundary driving area BA2 may be equal to the number of pixels per unit area in the first driving area A1.

According to the boundary driving control according to embodiments of the present disclosure, when an image having a saturation value equal to or greater than a selected threshold value is displayed in the display area DA, the number of light emitting pixels per unit area of the second boundary driving area BA2 may be greater than the number of light emitting pixels per unit area of the second driving area A2 and be less than the number of light emitting pixels per unit area of the first boundary driving area BA1.

In one or more embodiments, locations of light emitting pixels among the plurality of fourth pixels P4 disposed in the second boundary driving area BA2 may be changed as time passes.

Referring to FIGS. 21 to 23, according to the first boundary driving control, the number of light emitting pixels and luminance of the second boundary driving area BA2 may be changed.

Referring to FIGS. 21 to 23, as the number of light emitting pixels of the second boundary driving area BA2 is changed by the first boundary driving control, when an image having a saturation value higher than or equal to a selected threshold value is displayed in the display area DA, the number of light emitting pixels per unit area of the second boundary driving area BA2 may be greater than the number of light emitting pixels per unit area of the second driving area A2 and be less than the number of light emitting pixels per unit area of the first boundary driving area BA1.

Referring to FIGS. 21 to 23, as the luminance of the second boundary driving area BA2 is changed by the first boundary driving control, a respective driving luminance of each of the plurality of fourth pixels P4 of the second boundary driving area BA2 may be higher than a respective driving luminance of each of the plurality of third pixels P3 of the first boundary driving area BA1 and be lower than a respective driving luminance of each of the plurality of second pixels P2 of the second driving area A2.

Referring to FIGS. 21 to 23, a value obtained by dividing the number of pixels per unit area in the first driving area A1 by the number of pixels per unit area in the second driving area A2 may be referred to as a light emitting area ratio m. Herein, for convenience of description, discussions are provided based on an example where the light emitting area ratio m is 4.

The number of pixels per unit area in the first boundary driving area BA1 may be equal to the number of pixels per unit area in the first driving area A1. Accordingly, the light emitting area ratio m may be a value obtained by dividing the number of pixels per unit area in the first boundary driving area BA1 by the number of pixels per unit area in the second driving area A2.

The number of pixels per unit area in the second boundary driving area BA2 may be equal to the number of pixels per unit area in the first driving area A1. Accordingly, the light emitting area ratio m may be a value obtained by dividing the number of pixels per unit area in the second boundary driving area BA2 by the number of pixels per unit area in the second driving area A2.

All of the plurality of first pixels P1 of the first driving area A1 can emit light, and all of the plurality of second pixels P2 of the second driving area A2 can emit light. Accordingly, the light emitting area ratio m may be a value obtained by dividing the number of light emitting pixels per unit area in the first driving area A1 by the number of light emitting pixels per unit area in the second driving area A2.

Referring to FIGS. 21 to 23, in the boundary driving control according to embodiments of the present disclosure, a driving control unit may be a pixel group including one or more pixels P. A plurality of pixels P disposed in the display panel 110 may be allocated to a plurality of pixel groups. All of the plurality of pixel groups disposed in the display panel 110 may have a same size.

Referring to FIGS. 21 to 23, the first driving area A1 may include a plurality of first pixel groups PG1. The second driving area A2 may include a plurality of second pixel groups PG2. The first boundary driving area BA1 may include a plurality of first boundary pixel groups BPG1. The second boundary driving area BA2 may include a plurality of second boundary pixel groups BPG2.

In examples of FIGS. 21 to 23, related discussions are provided based on: one first pixel group PG1 among the plurality of first pixel groups PG1 of the first driving area A1; one second pixel group PG2 among the plurality of second pixel groups PG2 of the second driving area A2; one first boundary pixel group BPG1 among the plurality of first boundary pixel groups BPG1 of the first boundary driving area BA1; and one second boundary pixel group BPG2 among the plurality of second boundary pixel groups BPG2 of the second boundary driving area BA2.

Referring to FIGS. 21 to 23, each of the plurality of second pixel groups PG2 may include n second pixels P2. That is, the number of pixels of each of the plurality of second pixel groups PG2 may be n.

Referring to FIGS. 21 to 23, considering the light emitting area ratio m, the number of pixels of each of the plurality of first pixel groups PG1 may be (m*n). Accordingly, each of the plurality of first pixel groups PG1 may include (m*n) first pixels P1.

The number of pixels of each of the plurality of first boundary pixel groups BPG1 may be equal to the number of pixels of each of the plurality of first boundary pixel groups PG1. Accordingly, each of the plurality of first boundary pixel groups BPG1 may include (m*n) third pixels P3.

The number of pixels of each of the plurality of second boundary pixel groups BPG2 may be equal to the number of pixels of each of the plurality of first pixel groups PG1. Accordingly, each of the plurality of second boundary pixel groups BPG2 may include (m*n) fourth pixels P4.

Referring to FIGS. 21 to 23, respective pixel group sizes PGS of the first pixel group PG1 of the first driving area A1, the second pixel group PG2 of the second driving area A2, the first boundary pixel group BPG1 of the first boundary driving area BA1, and the second boundary pixel group BPG2 of the second boundary driving area BA2 may have a same value.

Referring to FIGS. 21 to 23, the pixel group size PGS may be, for example, the number of pixels (m*n) of the plurality of first pixel groups PG1.

The pixel group size PGS in the example of FIG. 21 may be 4, the pixel group size PGS in the example of FIG. 22 may be 8, and the pixel group size PGS in the example of FIG. 23 may be 16.

Referring to FIGS. 21 to 23, the number NBA of boundary driving areas BA between the first driving area A1 and the second driving area A2 may be a value obtained by subtracting, from the pixel group size PGS, by subtracting the number of pixels n of the second pixel group PG2 and then subtracting 1. That is, NBA=PGS−n−1.

Referring to FIGS. 21 to 23, for discussions, it is assumed that respective driving luminance of each of the plurality of first pixels P1 of the first driving area A1 is L1, respective driving luminance of each of the plurality of second pixels P2 of the second driving area A2 is L2, and respective driving luminance of each of the light emitting pixels among the plurality of third pixels P3 of the first boundary driving area BA1 is L3.

Referring to FIGS. 21 to 23, the number of light emitting pixels Nbep1 among the plurality of third pixels P3 included in the first boundary pixel group BPG1 of the first boundary driving area BA1 may be a value obtained by subtracting 1 from the pixel group size PGS (e.g., Nbep1=PGS−1). For example, respective driving luminance L1 of each of the plurality of first pixels P1 of the first driving area A1 included in the normal area NA may be respective driving luminance L1 of each of light emitting pixels P1 in the first pixel group PG1.

Respective driving luminance of each of light emitting pixels among the plurality of third pixels P3 of the first boundary driving area BA1 may be a value obtained by dividing (e.g., PGS/Nbep1) the pixel group size PGS by the number Nbep1 of light emitting pixels P3 of the first boundary pixel group BPG1, and then by multiplying (e.g., L1×(PGS/Nbep1)) respective driving luminance L1 of each of light emitting pixels P1 of the first pixel group PG1.

Respective driving luminance of each of light emitting pixels among the plurality of third pixels P3 of the first boundary driving area BA1 may be respective driving luminance of each of light emitting pixels P3 of the first boundary pixel group BPG1.

Referring to FIGS. 21 to 23, the number of light emitting pixels Nbep2 among the plurality of fourth pixels P4 included in the second boundary pixel group BPG2 of the second boundary driving area BA2 may be a value obtained by subtracting 2 from the pixel group size PGS (e.g., Nbep2=PGS-2).

Respective driving luminance of each of light emitting pixels among the plurality of fourth pixels P4 of the second boundary driving area BA2 may be a value obtained by dividing (e.g., PGS/Nbep2) the pixel group size PGS by the number Nbep2 of light emitting pixels P4 of the second boundary pixel group BPG2, and then by multiplying (e.g., L1×(PGS/Nbep2)) respective driving luminance L1 of each of light emitting pixels P1 of the first pixel group PG1.

Respective driving luminance of each of light emitting pixels among the plurality of fourth pixels P4 of the second boundary driving area BA2 may be respective driving luminance of each of light emitting pixels P4 of the second boundary pixel group BPG2.

In an area occupied by the second pixel group PG2 of the second driving area A2, the remaining areas except for one or more second pixels P2 are indicated as “0” in the examples of FIGS. 21 to 23. In the examples of FIGS. 21 to 23, areas labeled “0” in the second pixel group PG2 of the second driving area A2 mean that a pixel P is not located, and thus, light emitting luminance is 0.

Referring to FIGS. 21 to 23, the areas in which a pixel P is not located in the second pixel group PG2 of the second driving area A2 may be transmissive areas TA.

Referring to FIG. 21, the light emitting area ratio m is 4. The first pixel group PG1 may include four first pixels P1. Therefore, the pixel group size PGS is 4. Since the pixel group size PGS is m*n, n is 1. Thus, the second pixel group PG2 may include one second pixel P2.

Since the number of boundary driving areas BA is a value obtained by subtracting, from the pixel group size PGS, the number of pixels n of the second pixel group PG2 and then subtracting 1 (e.g., NBA=4−1−1=2), the number of boundary driving areas BA may be therefore 2. Accordingly, in the example of FIG. 21, two boundary driving areas (BA1 and BA2) may be located between the first driving area A1 and the second driving area A2.

Referring to the example of FIG. 21, the number of light emitting pixels in the first boundary pixel group BPG1 of the first boundary driving area BA1 (e.g., Nbep1=PGS−1) may be 3, and the number of light emitting pixels in the second boundary pixel group BPG2 of the second boundary driving area BA2 (e.g., Nbep2=PGS−2) may be 2.

Respective driving luminance L2 of each of light emitting pixels P2 of the second pixel group PG2 may be 400. Since the number of light emitting pixels in the second pixel group PG2 is 1, the total driving luminance of the second pixel group PG2 may be 400.

Respective driving luminance L1 of each of light emitting pixels P1 of the first pixel group PG1 may be 100. The total driving luminance of the first pixel group PG1 may be 400 (=L1×PGS=100*4), and equal to the total driving luminance of the second pixel group PG2. Accordingly, a difference in luminance between the normal area NA and the optical area OA can be reduced or eliminated.

Referring to the example of FIG. 21, respective driving luminance (L1×(PGS/Nbep1)) of each of three light emitting pixels P3 in the first boundary pixel group BPG1 of the first boundary driving area BA1 may be approximately 133 (=100×(4/3)).

Respective driving luminance (L1×(PGS/Nbep2)) of each of two light emitting pixels P2 in the second boundary pixel group BPG2 of the second boundary driving area BA2 may be 200 (=100×(4/2)).

Referring to FIG. 22, the light emitting area ratio m is 4. The first pixel group PG1 may include eight first pixels P1. Therefore, the pixel group size PGS is 8. Since the pixel group size PGS is m*n, n is 2. Thus, the second pixel group PG2 may include two second pixels P2.

Since the number of boundary driving areas BA is a value obtained by subtracting, from the pixel group size PGS, the number of pixels n of the second pixel group PG2 and then subtracting 1 (e.g., NBA=8−1−1=2), the number of boundary driving areas BA may be therefore 5. Accordingly, in the example of FIG. 22, five boundary driving areas (BA1, BA2, BA3, BA4, and BA5) may be located between the first driving area A1 and the second driving area A2.

Referring to the example of FIG. 22, the number of light emitting pixels in the first boundary pixel group BPG1 of the first boundary driving area BA1 (e.g., Nbep1=PGS−1) may be 7, and the number of light emitting pixels in the second boundary pixel group BPG2 of the second boundary driving area BA2 (e.g., Nbep2=PGS−2) may be 6. The number of light emitting pixels in a third boundary pixel group BPG3 of a third boundary driving area BA3 (e.g., Nbep3=PGS−3) may be 5, and the number of light emitting pixels in a fourth boundary pixel group BPG4 of a fourth boundary driving area BA4 (e.g., Nbep4=PGS−4) may be 4. The number of light emitting pixels in a fifth boundary pixel group BPG5 of a fifth boundary driving area BA5 (e.g., Nbep5=PGS−5) may be 3.

Respective driving luminance L2 of each of light emitting pixels P2 of the second pixel group PG2 may be 400. Since the number of light emitting pixels in the second pixel group PG2 is 2, the total driving luminance of the second pixel group PG2 may be 800.

Respective driving luminance L1 of each of light emitting pixels P1 of the first pixel group PG1 may be 100. The total driving luminance of the first pixel group PG1 may be 800 (=L1×PGS=100*8), and equal to the total driving luminance of the second pixel group PG2. Accordingly, a difference in luminance between the normal area NA and the optical area OA can be reduced or eliminated.

Referring to the example of FIG. 22, respective driving luminance (L1×(PGS/Nbep1)) of each of seven light emitting pixels P3 in the first boundary pixel group BPG1 of the first boundary driving area BA1 may be approximately 115 (=100×(8/7)). Respective driving luminance (L1×(PGS/Nbep2)) of each of six light emitting pixels P4 in the second boundary pixel group BPG2 of the second boundary driving area BA2 may be approximately 133 (=100×(8/6)). Respective driving luminance (L1×(PGS/Nbep3)) of each of five light emitting pixels P5 in the third boundary pixel group BPG3 of the third boundary driving area BA3 may be 160 (=100×(8/5)).

Respective driving luminance (L1×(PGS/Nbep4)) of each of four light emitting pixels P6 in the fourth boundary pixel group BPG4 of the fourth boundary driving area BA4 may be 200 (=100×(8/4)). Respective driving luminance (L1×(PGS/Nbep5)) of each of three light emitting pixels P7 in the fifth boundary pixel group BPG5 of the fifth boundary driving area BA5 may be approximately 266 (=100×(8/3)).

Referring to FIG. 23, the light emitting area ratio m is 4. The first pixel group PG1 may include sixteen first pixels P1. Therefore, the pixel group size PGS is 16. Since the pixel group size PGS is m*n, n is 4. Thus, the second pixel group PG2 may include four second pixels P2.

Since the number of boundary driving areas BA is a value obtained by subtracting, from the pixel group size PGS, the number of pixels n of the second pixel group PG2 and then subtracting 1 (e.g., NBA=18−4−1=11), the number of boundary driving areas BA may be therefore 11. Accordingly, in the example of FIG. 23, eleven boundary driving areas (BA1 to BA11) may be located between the first driving area A1 and the second driving area A2.

Referring to the example of FIG. 23, the number of light emitting pixels in the first boundary pixel group BPG1 of the first boundary driving area BA1 (e.g., Nbep1=PGS−1) may be 15. The number of light emitting pixels in an eleventh boundary pixel group BPG11 of an eleventh boundary driving area BA11 (e.g., Nbep11=PGS−11) may be 5.

Respective driving luminance L2 of each of light emitting pixels P2 of the second pixel group PG2 may be 400. Since the number of light emitting pixels in the second pixel group PG2 is 4, the total driving luminance of the second pixel group PG2 may be 1600.

Respective driving luminance L1 of each of light emitting pixels P1 of the first pixel group PG1 may be 100. The total driving luminance of the first pixel group PG1 may be 1600 (=L1×PGS=100*16), and equal to the total driving luminance of the second pixel group PG2. Accordingly, a difference in luminance between the normal area NA and the optical area OA can be reduced or eliminated.

Referring to the example of FIG. 23, respective driving luminance (L1×(PGS/Nbep1)) of each of fifteen light emitting pixels P3 in the first boundary pixel group BPG1 of the first boundary driving area BA1 may be approximately 107 (=100×(16/15)). Respective driving luminance (L1×(PGS/Nbep11)) of each of five light emitting pixels P13 in the eleventh boundary pixel group BPG11 of the eleventh boundary driving area BA11 may be 320 (=100×(16/5)).

Figure 24:
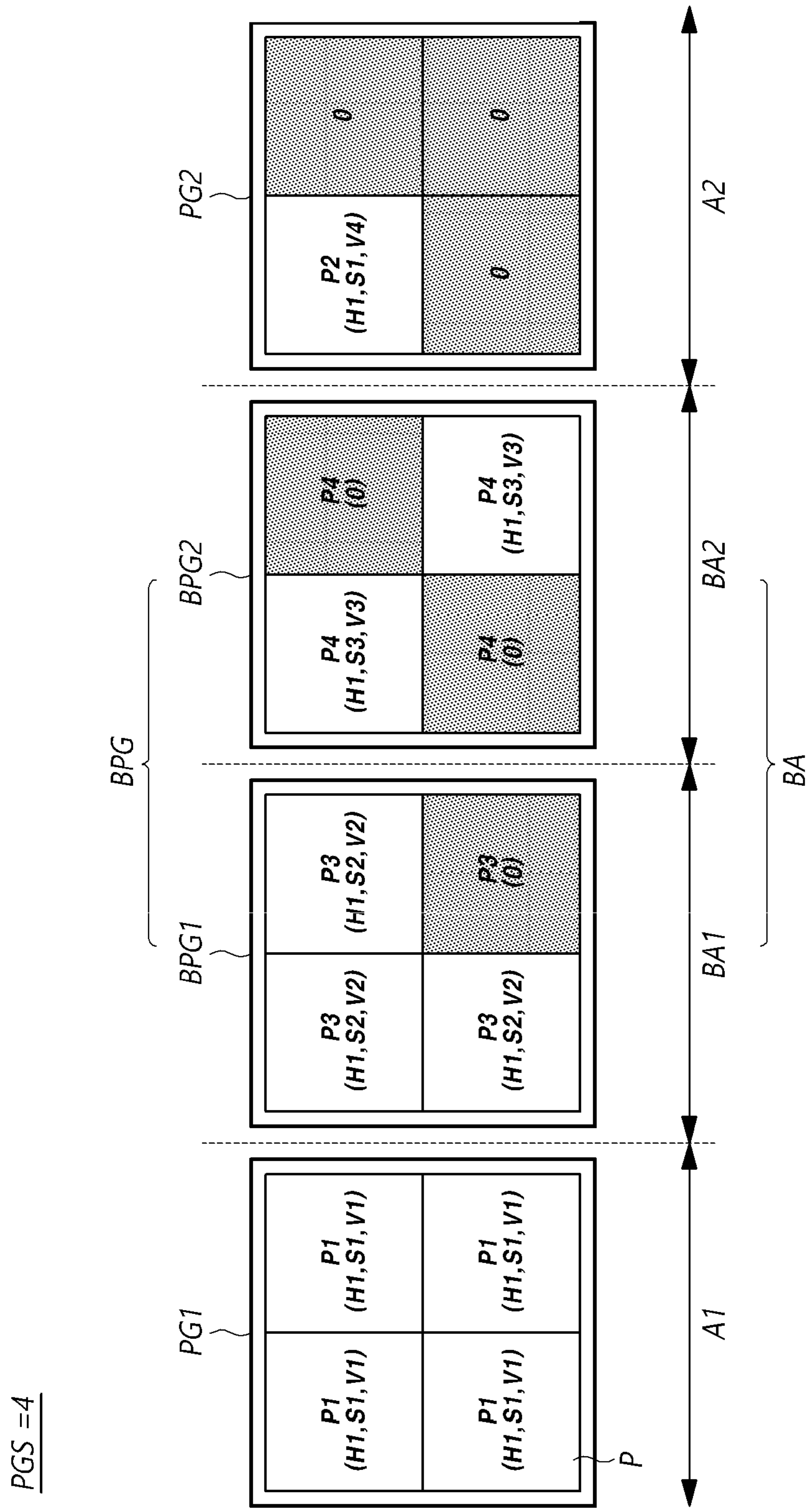
FIG. 24 illustrates an example display driving method based on a second boundary driving control for changing luminance and saturation of a boundary driving area in the display device according to aspects of the present disclosure.

FIG. 24 illustrates an example display driving method based on the second boundary driving control for changing the luminance and saturation of a boundary driving area BA in the display device 100 according to aspects of the present disclosure. It should be noted that FIG. 24 illustrates based on a hue-saturation-value (HSV) signal as a visual perception characteristic signal.

Referring to FIG. 24, the display controller 240 of the display device 100 according to aspects of the present disclosure can perform the second boundary driving control by changing the luminance and saturation of a boundary driving area BA.

As in the example of FIG. 21, FIG. 24 illustrates an example where: the pixel group size PGS is 4; the number of light emitting pixels of a first boundary pixel group BPG1 of a first boundary driving area BA1 is 3; and the number of light emitting pixels in a second boundary pixel group BPG2 of a second boundary driving area BA2 is 2.

Referring to FIG. 24, a respective hue value of each of four first pixels P1 in a first pixel group PG1, a hue value of one second pixel P2 in a second pixel group PG2, a respective hue value of each of three third pixels P3 in the first boundary pixel group BPG1, and a respective hue value of each of two fourth pixels P4 in the second boundary pixel group BPG2 may be the same, for example, H1.

Referring to FIG. 24, a respective saturation value of each of the four first pixels P1 in the first pixel group PG1 and a saturation value of the one second pixel P2 in the second pixel group PG2 may be the same, for example, S1.

A respective saturation value S2 of each of the three third pixels P3 in the first boundary pixel group BPG1 may be different from the respective saturation value S1 of each of the four first pixels P1 in the first pixel group PG1 and the saturation value S1 of the one second pixel P2 in the second pixel group PG2.

A respective saturation value S3 of each of the tow fourth pixels P4 in the second boundary pixel group BPG2 may be different from the respective saturation value S1 of each of the four first pixels P1 in the first pixel group PG1 and the saturation value S1 of the one second pixel P2 in the second pixel group PG2.

Referring to FIG. 24, saturation S2 of an image portion displayed by light emitting pixels among a plurality of third pixels P3 in the first boundary driving area BA1 may be lower than saturation S1 of an image portion displayed by a plurality of first pixels P1 in the first driving area A1 and be lower than saturation S1 of an image portion displayed by a plurality of second pixels P2 in the second driving area A2 (e.g., S2<S1).

Referring to FIG. 24, saturation S3 of an image portion displayed by light emitting pixels among a plurality of fourth pixels P4 in the second boundary driving area BA2 may be lower than saturation S1 of an image portion displayed by a plurality of first pixels P1 in the first driving area A1 and be lower than saturation S1 of an image portion displayed by a plurality of second pixels P2 in the second driving area A2 (e.g., S3<S1).

Referring to FIG. 24, for example, saturation S2 of an image portion displayed by light emitting pixels among a plurality of third pixels P3 in the first boundary driving area BA1 may be higher than saturation S3 of an image portion displayed by light emitting pixels among a plurality of fourth pixels P4 in the second boundary driving area BA2 (e.g., S2>S3).

For example, saturation S3 of an image portion displayed by light emitting pixels among a plurality of fourth pixels P4 in the second boundary driving area BA2 may be a first constant (α) times of saturation S1 of an image portion displayed by a plurality of first pixels P1 in the first driving area A1.

For example, saturation S2 of an image portion displayed by light emitting pixels among a plurality of third pixels P3 in the first boundary driving area BA1 may be a second constant (β) times of saturation S1 of an image portion displayed by a plurality of first pixels P1 in the first driving area A1.

The first constant α and the second constant β may be rational numbers between 0 and 1. The second constant β may be a rational number greater than the first constant α. For example, the second constant β may be 0.7 and the first constant α may be 0.5.

Referring to FIG. 24, a respective value value V1 of each of the four first pixels P1 in the first pixel group PG1, a respective value value V2 of each of the three third pixels P4 in the first boundary pixel group BPG1, a respective value value V3 of each of the two fourth pixels P2 in the second boundary pixel group PG2, and a value value V4 of the one second pixel P2 in the second pixel group PG2 may be different from each other.

Referring to FIG. 24, the value value V2 of the one second pixel P2 in the second pixel group PG2 may be the highest, the respective value value V3 of each of the two fourth pixels P2 in the second boundary pixel group PG2 may be the next highest, the respective value value V1 of each of the four first pixels P1 in the first pixel group PG1 may be the lowest, and the respective value value V2 of each of the three third pixels P4 in the first boundary pixel group BPG1 may be the next lowest (e.g., L4>L3>L2>L1).

The value value V4 of the one second pixel P2 in the second pixel group PG2 may be four times the respective value value V1 of each of the four first pixels P1 in the first pixel group PG1.

The respective value value V3 of each of the two fourth pixels P4 in the second boundary pixel group BPG2 may be two times the respective value value V1 of each of the four first pixels P1 in the first pixel group PG1.

The respective value value V2 of each of the three third pixels P3 in the first boundary pixel group BPG1 may be (4/3) times the respective value value V1 of each of the four first pixels P1 in the first pixel group PG1.

In one or more embodiments, the data driving circuit 120 can be configured to output data voltages Vdata for displaying an image having a saturation value equal to or greater than a threshold value to a plurality of data lines DL in the display area DA.

The data driving circuit 120 can be configured to output data voltages Vdata for enabling subpixels SP included in light emitting pixels among the plurality of third pixels P3 disposed in the first boundary driving area BA1 to emit light to data lines DL connected to the subpixels SP included in the light emitting pixels.

The display controller 240 can determine, as a control timing, an instance where an image having a saturation value equal to or higher than a threshold value is to be displayed in the display area DA.

When the control timing is determined, the display controller 240 can change input signals corresponding to the plurality of third pixels P3 disposed in the first boundary driving area BA1 to output signals for allowing only one or more of the plurality of third pixels P3 to emit light, and output image data based on the changed output signals to the data driving circuit 120.

Figure 25:
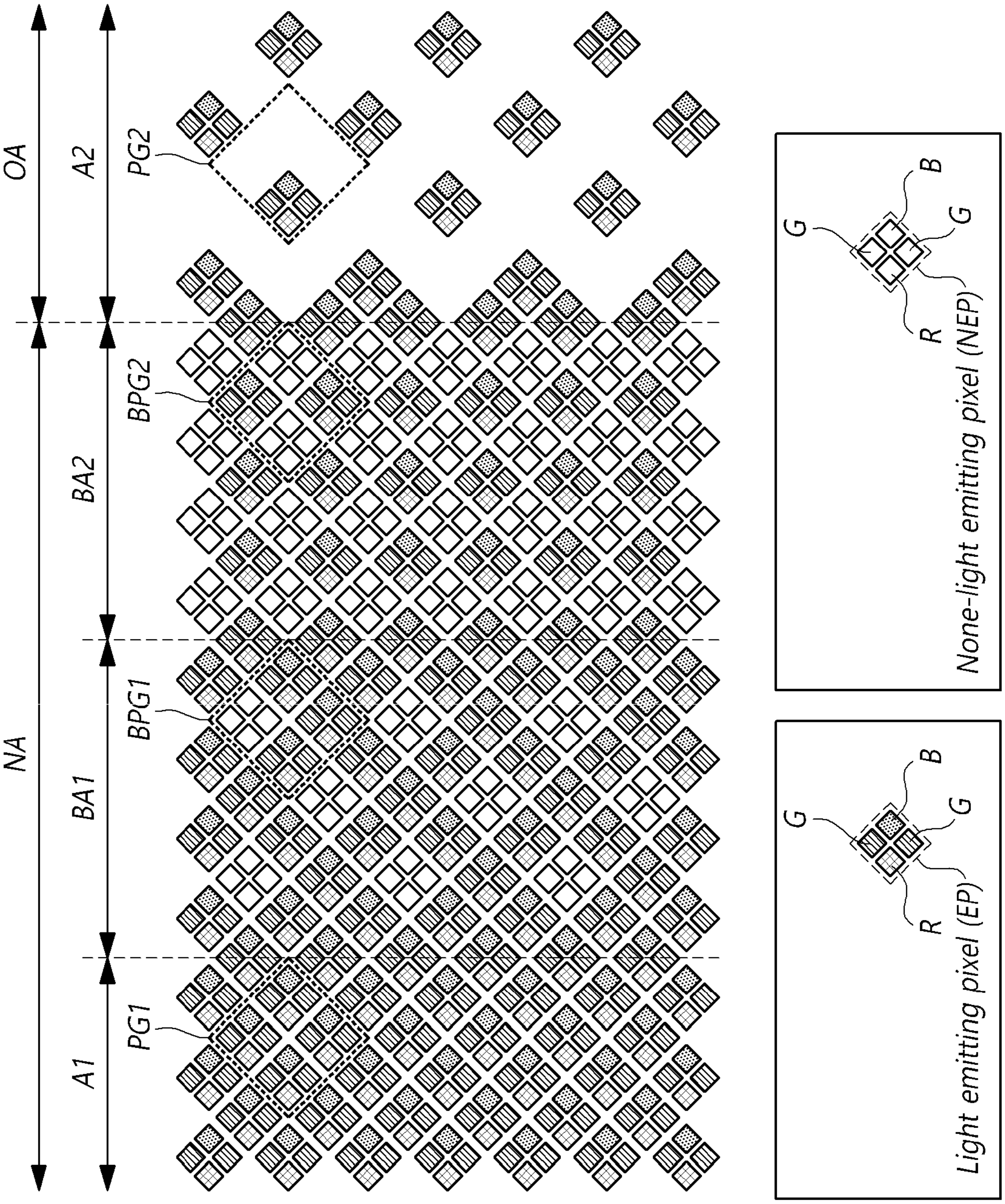
FIG. 25 illustrates an example situation where pixels emit light by the driving method of the display device according to example embodiments.

FIG. 25 illustrates an example situation where pixels emit light by the driving method of the display device 100 according to aspects of the present disclosure.

Referring to FIG. 25, the display area DA may include an optical area OA allowing light to be transmitted and a normal area NA, which is an area different from the optical area OA.

A first driving area A1 may be included in the normal area NA. A second driving area A2 may be included in the optical area OA.

For example, a first boundary driving area BA1 and a second boundary driving area BA2 may be included in the normal area NA. In this example, the second boundary driving area BA2 may be an area closest to the optical area OA in the normal area NA.

In another example, the first boundary driving area BA1 may be included in the normal area NA, and the second boundary driving area BA2 may be included in an optical bezel area OBA between the normal area NA and the optical area OA.

In further another example, the first boundary driving area BA1 and the second boundary driving area BA2 may be included in the optical bezel area OBA between the normal area NA and the optical area OA.

The first driving area A1 may include a plurality of first pixel groups PG1. Each of the plurality of first pixel groups PG1 may include four light emitting pixels EP. The four light emitting pixels EP may include one red subpixel R, two green subpixels G, and one blue subpixel B.

The second driving area A2 may include a plurality of second pixel groups PG2. Each of the plurality of second pixel groups PG2 may include one light emitting pixel EP. The one light emitting pixel EP may include one red subpixel R, two green subpixels G, and one blue subpixel B.

The light emitting area ratio may be a value obtained by dividing the number of pixels per unit area in the first driving area A1 by the number of pixels per unit area in the second driving area A2 (e.g., 4/1=4). The light emitting area ratio may be a value obtained by dividing the number of light emitting pixels per unit area in the first driving area A1 by the number of light emitting pixels per unit area in the second driving area A2 (e.g., 4/1=4).

The first boundary driving area BA1 may include a plurality of first boundary pixel groups BPG1. Each of the plurality of first pixel groups BPG1 may include four pixels P. It should be noted that only three pixels P among the four pixels P included in each of the plurality of first boundary pixel groups BPG1 may be light emitting pixels EP.

The second boundary driving area BA2 may include a plurality of second boundary pixel groups BPG2. Each of the plurality of second boundary pixel groups BPG2 may include four pixels P. It should be noted that only two pixels P among the four pixels P included in each of the plurality of second boundary pixel groups BPG2 may be light emitting pixels EP.

As described above with reference to FIG. 14, due to the structure in which one or more transmissive areas TA are located in the optical area OA included in the display area DA of the display panel 110, a black mixing phenomenon may occur when an image is displayed in the optical area OA before the boundary driving control is applied.

Due to this phenomenon, an image of the optical area OA may be perceived as a low saturation situation by users. Accordingly, a colorfulness perception difference between the optical area OA and the normal area NA may occur, resulting in a reduction in image quality perceived by users.

In examples where the boundary driving control according to the embodiments of the present disclosure is applied, a colorfulness perception difference between the optical area OA and the normal area NA can be reduced, and thus, a reduction in image quality perceived by users can be improved.

The above-described boundary driving control according to embodiments of the present disclosure may be applied to all of a case in which the optical area OA is implemented in the first type (e.g., the anode extension type) and another case in which the optical area OA is implemented in the second type (e.g., the hole type). When the optical area OA is implemented in the first type (e.g., the anode extension type), the first driving area may be included in the normal area, the second driving area may be included in the optical area, and the first boundary driving area may be included in the normal area or be included in the optical bezel area between the normal area and the optical area. When the optical area OA is implemented in the second type (e.g., the hole type), the first driving area may be included in the normal area, the second driving area may be included in the optical area, and the first boundary driving area may be included in the normal area.

According to the embodiments described herein, the display device 100, the display controller 240, and the display driving method may be provided that are capable of reducing a degree of image disparity by enabling users to notice less colorfulness perception difference (saturation difference) by controlling at least one of the number of light emitting pixels, luminance, and saturation of an area between the normal area and then optical area.

According to the embodiments described herein, the display device 100, the display controller 240, and the display driving method may be provided that employ a driving technique capable of reducing or minimizing a degree of image disparity by allowing saturation between the normal area and the optical area to be changed to improve colorfulness perception difference due to the optical area having a transmission and display structure.

According to the embodiments described herein, the display device 100, the display controller 240, and the display driving method may be provided that are capable of improving perceptual image quality by controlling at least one of the number of light emitting pixels, luminance, and saturation of an area between the normal area and the optical area, and thereby enabling users not to recognize the optical area.

According to the embodiments described herein, the display device 100, the display controller 240, and the display driving method may be provided that are capable of reducing a luminance difference between the normal area and the optical area by employing a configuration in which one or more pixels disposed in an area between the normal area and the optical area are not allowed to emit light.

According to the embodiments described herein, the display device 100, the display controller 240, and the display driving method may be provided that enable a low-power design for reducing power consumption to be implemented by employing a configuration in which one or more pixels disposed in an area between the normal area and the optical area are not allowed to emit light to reduce a luminance difference between the normal area and the optical area.

According to the embodiments described herein, the display device 100, the display controller 240, and the display driving method may be provided that enable light emitting elements of pixels disposed in an area between the normal area and the optical area to have an emission time and a degradation level similar to each other by allowing one or more pixels configured not to emit light in the area between the normal area and the optical area to be changed or randomly selected to reduce a luminance difference between the normal area and the optical area. Thereby, the average lifetime of the light emitting elements of the pixels disposed in the area between the normal area and the optical area can be increased.

Additional features and aspects will be set forth in part in the description which follows and in part will become apparent from the description or may be learned by practice of the inventive concepts provided herein. Other features and aspects of the inventive concepts may be realized and attained by the structure particularly pointed out in, or derivable from, the written description, the claims hereof, and the appended drawings.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the appended claims. Nothing in this section should be taken as a limitation on those claims.

It is to be understood that both the foregoing general description and the following detailed description of the present disclosure are exemplary and explanatory and are intended to provide further explanation of the inventive concepts as claimed.

The above description has been presented to enable any person skilled in the art to make, use and practice the technical features of the present disclosure, and has been provided in the context of a particular application and its requirements as examples. Various modifications, additions and substitutions to the described embodiments will be readily apparent to those skilled in the art, and the principles described herein may be applied to other embodiments and applications without departing from the scope of the present disclosure. The above description and the accompanying drawings provide examples of the technical features of the present disclosure for illustrative purposes only. That is, the disclosed embodiments are intended to illustrate the scope of the technical features of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel including a display area that allows images to be displayed, the display area including a first driving area and a second driving area, each of the first and second driving areas having a different number of light emitting pixels per unit area from each other;

a plurality of pixels including a plurality of first pixels disposed in the first driving area and a plurality of second pixels disposed in the second driving area; and a display controller operatively coupled to the display panel, wherein when an image having a saturation value equal to or greater than a selected threshold value is displayed in the display area, the display controller varies at least one of the following parameters: a number of light emitting pixels per unit area, a luminance, and saturation of a first boundary driving area between the first driving area and the second driving area, wherein when an image having a saturation value equal to or greater than the selected threshold value is displayed in the display area, only one or more of a plurality of third pixels disposed in the first boundary driving area emit light, and wherein the number of light emitting pixels per unit area of the first boundary driving area is greater than a number of light emitting pixels per unit area of the second driving area and is less than a number of light emitting pixels per unit area of the first driving area.

2. The display device of claim 1, wherein the second driving area comprises one or more transmissive areas allowing light to be transmitted and located between the plurality of second pixels, and wherein the first driving area does not comprise a transmissive area.

3. The display device of claim 1, wherein a location of at least one light emitting pixel among a plurality of third pixels disposed in the first boundary driving area is changed as time passes or is randomly selected.

4. The display device of claim 1, wherein saturation of an image portion displayed by light emitting pixels among the plurality of third pixels disposed in the first boundary driving area is lower than saturation of an image portion displayed by the plurality of first pixels in the first driving area and is lower than saturation of an image portion displayed by the plurality of second pixels in the second driving area.

5. The display device of claim 1, wherein the display area further comprises a second boundary driving area between the first boundary driving area and the second driving area, and the plurality of pixels further comprises a plurality of fourth pixels disposed in the second boundary driving area, and wherein, when an image having a saturation value equal to or greater than the selected threshold value is displayed in the display area, the display controller controls the variation of at least one of the following parameters: a number of light emitting pixels per unit area, a luminance, and saturation of the second boundary driving area differently from at least a corresponding one of the number of light emitting pixels per unit area, luminance, and saturation of the first boundary driving area.

6. The display device of claim 5, wherein the number of light emitting pixels per unit area of the second boundary driving area is greater than a number of light emitting pixels per unit area of the second driving area and is less than the number of light emitting pixels per unit area of the first boundary driving area.

7. The display device of claim 5, wherein respective driving luminance of each of the plurality of fourth pixels disposed in the second boundary driving area is higher than respective driving luminance of each of a plurality of third pixels in the first boundary driving area and is lower than respective driving luminance of each of the plurality of second pixels in the second driving area.

8. The display device of claim 5, wherein saturation of an image portion displayed by light emitting pixels among the plurality of fourth pixels disposed in the second boundary driving area is lower than saturation of an image portion displayed by the plurality of first pixels in the first driving area and is lower than saturation of an image portion displayed by the plurality of second pixels in the second driving area, and wherein saturation of an image portion displayed by light emitting pixels among a plurality of third pixels disposed in the first boundary driving area is higher than saturation of an image portion displayed by light emitting pixels among the plurality of fourth pixels in the second boundary driving area.

9. The display device of claim 1, wherein when an image having a saturation value less than the selected threshold value is displayed in the display area, all of a plurality of third pixels disposed in the first boundary driving area emit light, or the number of light emitting pixels per unit area of the first boundary driving area is equal to a number of light emitting pixels per unit area of the first driving area.

10. The display device of claim 1, further comprising:

a plurality of data lines; and a data driving circuit for driving the plurality of data lines, wherein the display controller controls the data driving circuit, wherein the display controller determines, as a control timing, an instance when an image has a saturation value equal to or greater than the threshold value in the display area, and wherein, based on the determination of the control timing, the display controller:

changes input signals corresponding to a plurality of third pixels disposed in the first boundary driving area into output signals and causes only one or more of the plurality of third pixels to emit light, and outputs image data based on the changed output signals to the data driving circuit.

11. The display device of claim 10, wherein the display controller:

converts the input signals into a visual perception characteristic signal including any one of a hue value, a lightness value, a saturation value, or a chroma value, determines whether the saturation value or chroma value included in the visual perception characteristic signal is greater than or equal to the threshold value, and determines, as the control timing, an instance in which the saturation or chroma value is greater than or equal to the threshold value, or wherein the display controller:

determines, as the control timing, an instance where a red signal value, a green signal value, and a blue signal value included in the input signals satisfy a selected RGB condition.

12. A display device comprising:

a display panel including a display area that allows images to be displayed, the display area including a first driving area and a second driving area, each of the first and second driving areas having a different number of light emitting pixels per unit area from each other;

a plurality of pixels including a plurality of first pixels disposed in the first driving area and a plurality of second pixels disposed in the second driving area; and a display controller operatively coupled to the display panel, wherein when an image having a saturation value equal to or greater than a selected threshold value is displayed in the display area, the display controller varies at least one of the following parameters: a number of light emitting pixels per unit area, a luminance, and saturation of a first boundary driving area between the first driving area and the second driving area, and wherein respective driving luminance of each of light emitting pixels among a plurality of third pixels disposed in the first boundary driving area is higher than respective driving luminance of each of the plurality of first pixels in the first driving area and is lower than respective driving luminance of each of the plurality of second pixels in the second driving area.

13. The display device of claim 12, wherein saturation of an image portion displayed by light emitting pixels among a plurality of third pixels disposed in the first boundary driving area is lower than saturation of an image portion displayed by the plurality of first pixels in the first driving area and is lower than saturation of an image portion displayed by the plurality of second pixels in the second driving area.

14. A display device comprising:

a display panel including a display area having a first driving area, a second driving area, and a boundary driving area between the first and second driving areas the display panel being configured to receive an optical electronic device to be disposed within the second driving area;

a display controller operatively coupled to the display panel, the display controller configured to:

determine a point in time when a saturation value of an image to be displayed in the display area of the display panel is greater than or equal to a selected threshold value, the point in time being defined as a control time; and control at least one of a number of light emitting pixels per unit area, luminance, or saturation of the boundary driving area at the control time.

15. The display device of claim 14, wherein a number of light emitting pixels per unit area of the boundary driving area is greater than a number of light emitting pixels per unit area of the second driving area and is less than a number of light emitting pixels per unit area of the first driving area.

16. The display device of claim 14, wherein the saturation value includes visual perception characteristic signals, wherein the display controller is configured to convert image signals received by the display controller from a host system to the visual perception characteristic signals.

17. The display device of claim 14, wherein, when the saturation value of the image is less than the selected threshold value, the display controller is configured to not control a number of light emitting pixels, luminance, and saturation of the boundary driving area.

18. The display device of claim 14, wherein determine a point in time when a saturation value of an image to be displayed in the display area of the display panel is greater than or equal to a selected threshold value includes:

determine a point in time where a red signal value, a green signal value, and a blue signal value satisfy a selected RGB condition, wherein the selected RGB condition is based on the selected threshold value for each red signal value, green signal value, and blue signal value included in image signals received by the display controller from a host system, and wherein the point in time is defined as a control timing.

19. The display device of claim 18, wherein when the display controller determines that the selected RGB condition is satisfied, the display controller performs a selected boundary driving control, and supply output signals resulting from the boundary driving control, wherein the output signals resulting from the boundary driving control include signals obtained by changing the image signals, and wherein the display controller changes at least one of the number of light emitting pixels, luminance, and saturation of the boundary driving area based on the output signals resulting from the boundary driving control.

20. The display device of claim 18, wherein the display controller determines that the selected RGB condition is not satisfied, the display controller supplies output signals corresponding to the image signals without performing boundary driving control.

* * * * *